May 8, 1945.  P. SPURLINO ET AL  2,375,594
ACCOUNTING MACHINE
Filed Jan. 30, 1941  20 Sheets-Sheet 1

Pascal Spurlino
William M. Carroll
Arthur R. Colley
and Alfred G. Kibler
Inventors By Earl Beust
Their Attorney May 8, 1945.   P. SPURLINO ET AL   2,375,594
ACCOUNTING MACHINE
Filed Jan. 30, 1941   20 Sheets-Sheet 2

FIG. 2

John Doe
10 Main St. Anywhere. O.

IN ACCOUNT WITH
ANY BANK & TRUST CO.
ANYWHERE OHIO.

Statement.

| 1 DEBITS. | 2 | CREDITS. 3 | 4 BALANCE | 5 |
|---|---|---|---|---|
| | | BALANCE FORWARD | JAN 1-40 | 5,000.00 F |
| 25.00 | 25.00 | | | |
| 50.00 | | 100.00 | JAN 2-40 | 5,000.00 * |
| | | 100.00 | | |
| | | 100.00 EC | | |
| | | 300.00 | | |
| 35.00 | 35.00 EC | | JAN 3-40 | 5,300.00 * |
| 25.00 | 50.00 LS | | | |
| 50.00 LS | 50.00 | | JAN 4-40 | 5,125.00 |
| .50 SC | 50.00 | 10.00 | JAN 15-40 | 5,044.00 * |
| 25.00 | 15.50 | | JAN 20-40 | 4,500.00 * |
| 544.00 LS | | | JAN 27-40 | 4,400.00 S |
| 100.00 | | | | |

John Doe.
10 Main St. Anywhere, O.

ANY BANK & TRUST CO.
Ledger.

| 6 | 7 BALANCE. 8 | |
|---|---|---|
| JAN 1-40 | | 5,000.00 F — 1 / 2 / 3 / 4 |
| JAN 2-40 | 3 | 5,000.00 * — 5 / 6 / 7 / 8 |
| JAN 3-40 | 12 | 5,300.00 * |
| JAN 4-40 | | 5,125.00 |
| JAN 15-40 | 2 | 5,044.00 * — 35 / 36 |
| JAN 20-40 | 36 | 4,500.00 * — 37 / 38 |
| JAN 27-40 | 1 | 4,400.00 S — 39 |

FIG. 3

John Doe
10 Main ST. Anywhere .O.

IN ACCOUNT WITH
ANY BANK & TRUST CO.
ANYWHERE . OHIO.

Statement.

| DEBIT. | CREDITS | BALANCE | |
|---|---|---|---|
| | BALANCE FORWARD | JAN 27-40 | 4,400.00 S |
| 4,500.00 | 500.00 | JAN 28-40 | 100.00 OD* |
| | | JAN 29-40 | 400.00 |

John Doe.
10 Main ST. Anywhere .O.

ANY BANK & TRUST CO.
Ledger.

| | BALANCE. | |
|---|---|---|
| JAN 27-40 | 4,400.00 S — 1 / 2 |
| JAN 28-40 | 100.00 OD* — 3 |
| JAN 29-40 | 400.00 — 4 |

Pascal Spurlino
William M. Carroll
Arthur R. Colley
and Alfred G. Kibler
Inventors By *Earl Beust*
Their Attorney May 8, 1945.　　　　P. SPURLINO ET AL　　　　2,375,594
ACCOUNTING MACHINE
Filed Jan. 30, 1941　　　　20 Sheets-Sheet 5

Pascal Spurlino
William M. Carroll
Arthur R. Colley
and Alfred G. Kibler
Inventors By Carl Beust
Their Attorney

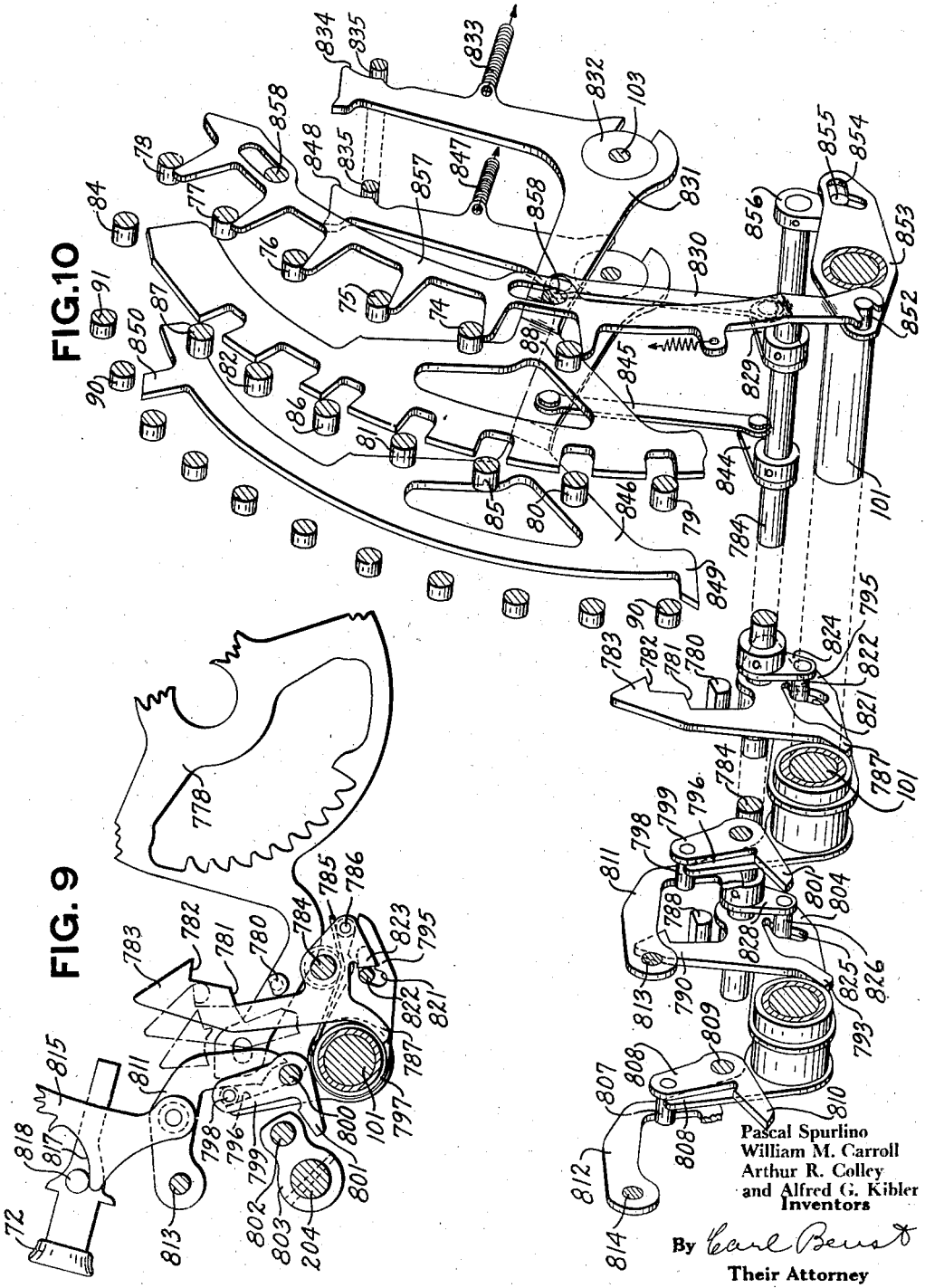

May 8, 1945.  P. SPURLINO ET AL  2,375,594
ACCOUNTING MACHINE
Filed Jan. 30, 1941  20 Sheets-Sheet 7

Pascal Spurlino
William M. Carroll
Arthur R. Colley
and Alfred G. Kibler
Inventors By Earl Benst
Their Attorney

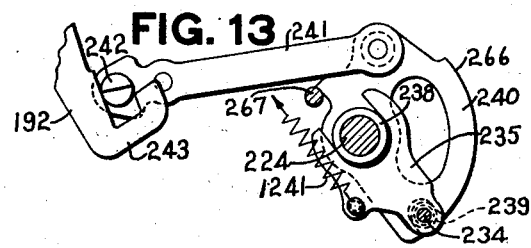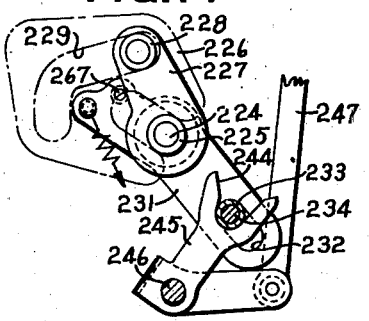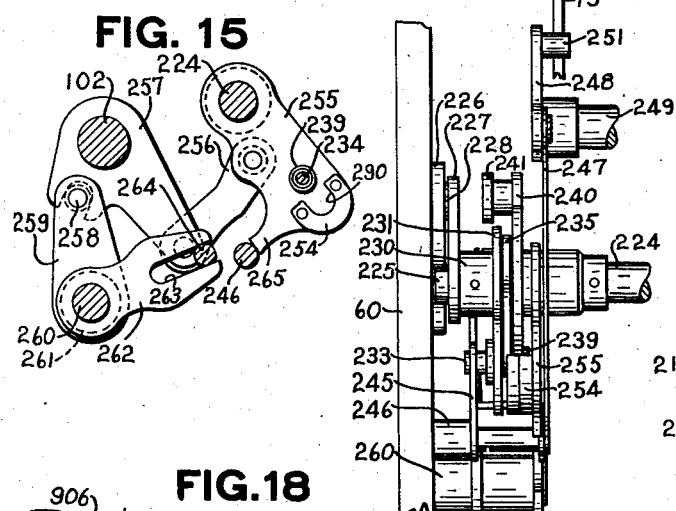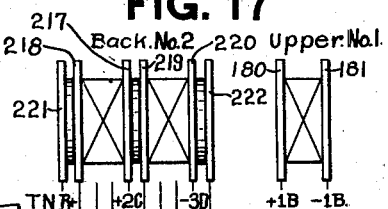

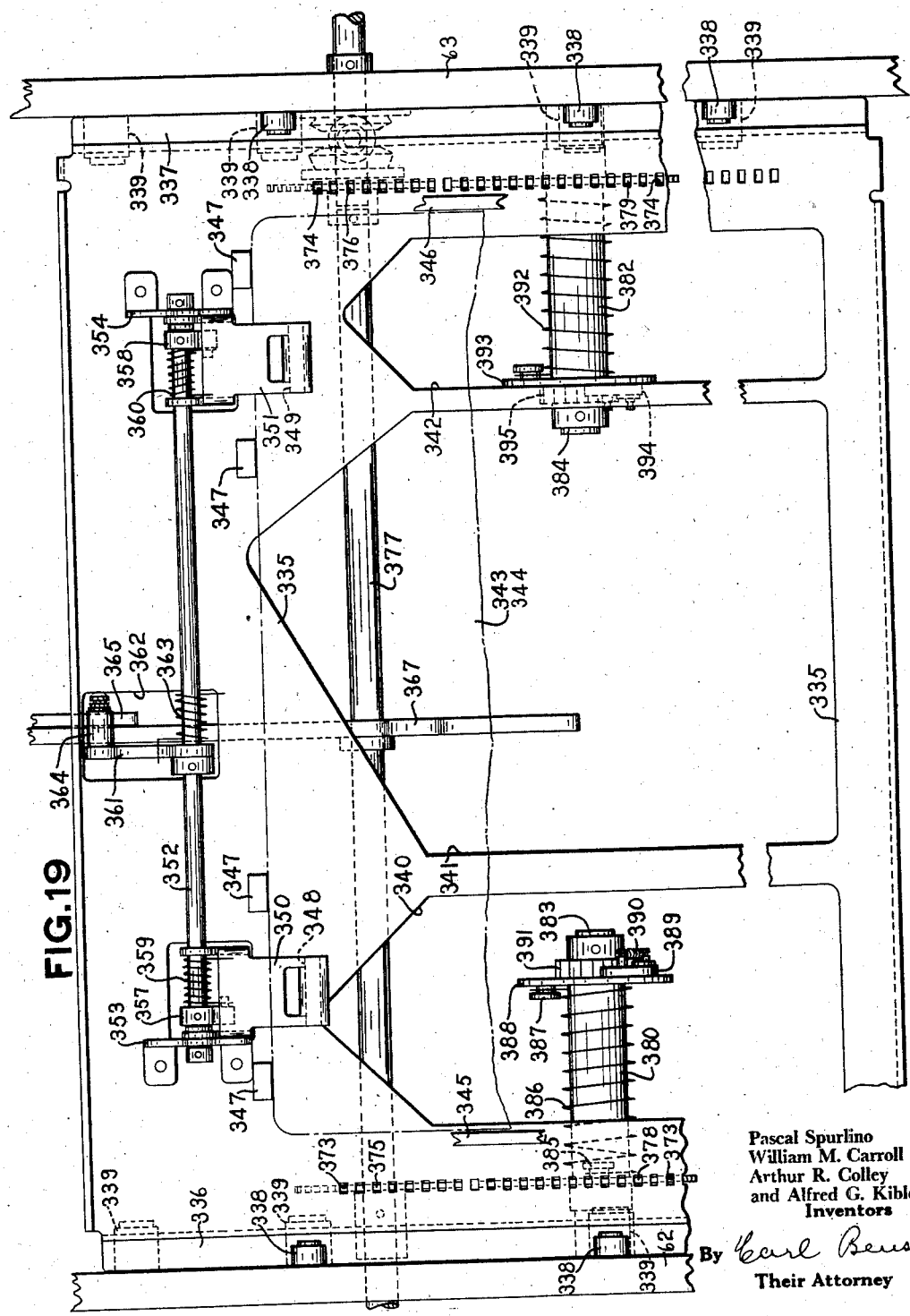

May 8, 1945.　　　P. SPURLINO ET AL　　　2,375,594
ACCOUNTING MACHINE
Filed Jan. 30, 1941　　　20 Sheets-Sheet 10
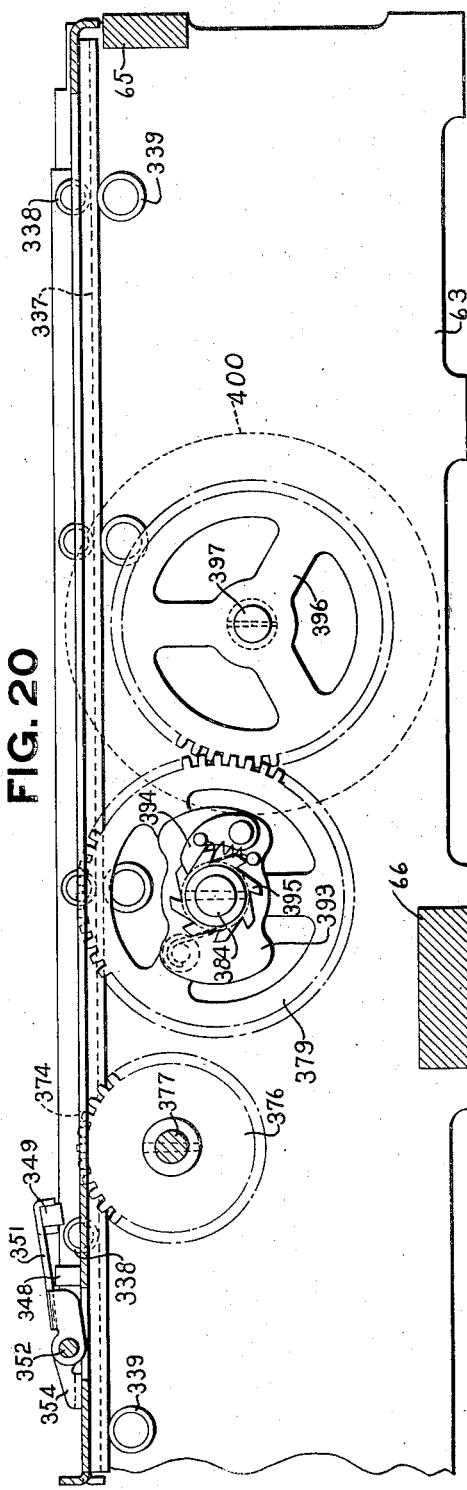
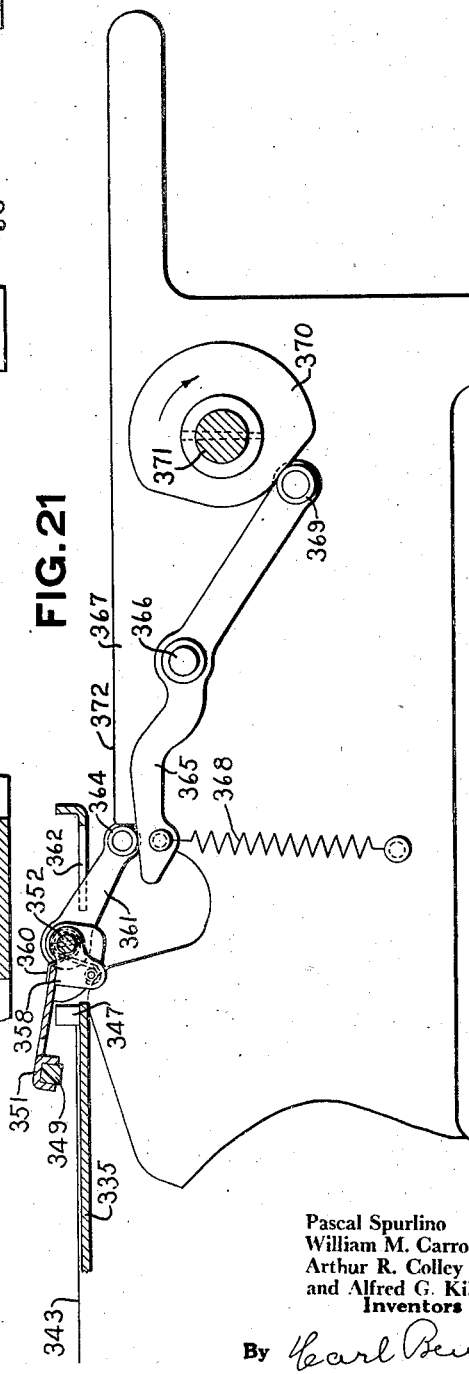
Pascal Spurlino
William M. Carroll
Arthur R. Colley
and Alfred G. Kibler
Inventors
By *Karl Beust*
Their Attorney May 8, 1945.　　　P. SPURLINO ET AL　　　2,375,594
ACCOUNTING MACHINE
Filed Jan. 30, 1941　　　20 Sheets-Sheet 11
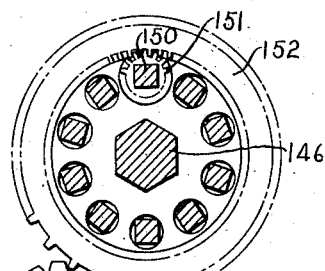
FIG. 22
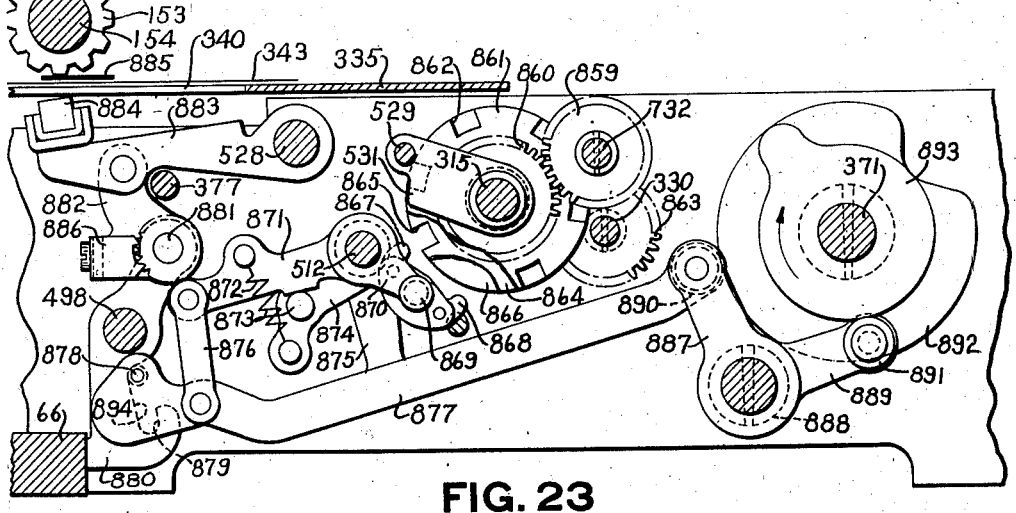
FIG. 23
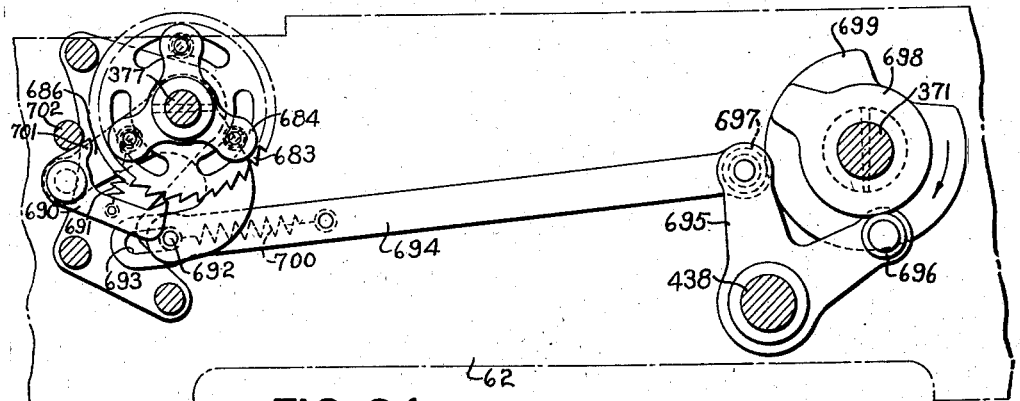
FIG. 24
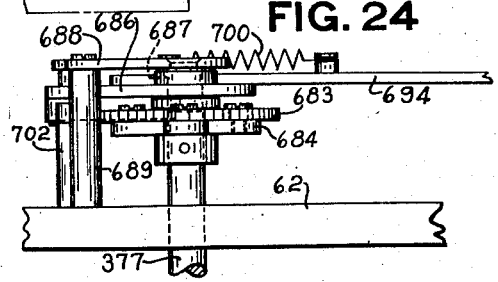
Pascal Spurlino
William M. Carroll
Arthur R. Colley
and Alfred G. Kibler
Inventors
By Carl Benst
Their Attorney May 8, 1945. P. SPURLINO ET AL 2,375,594
ACCOUNTING MACHINE
Filed Jan. 30, 1941 20 Sheets-Sheet 12

Pascal Spurlino
William M. Carroll
Arthur R. Colley
and Alfred G. Kibler
Inventors By *Their Attorney*

Pascal Spurlino
William M. Carroll
Arthur R. Colley
and Alfred G. Kibler
Inventors By Earl Benet
Their Attorney

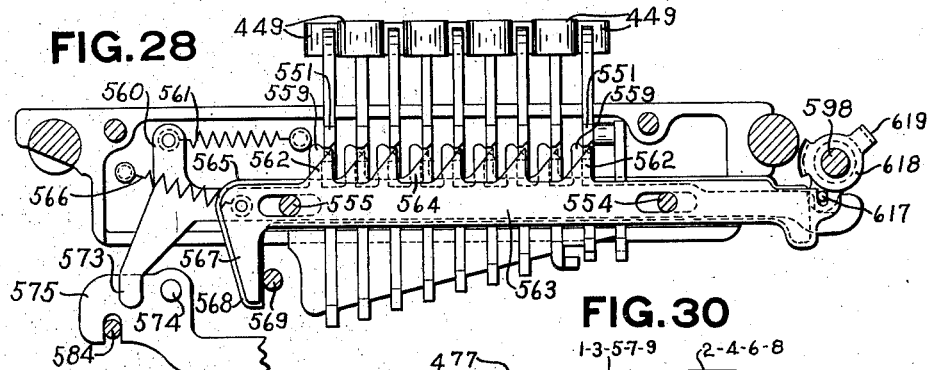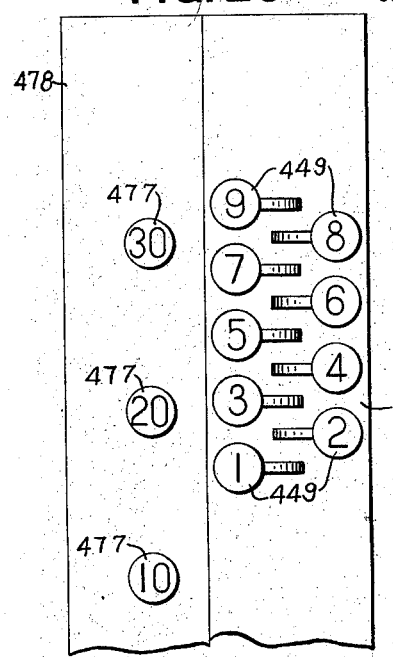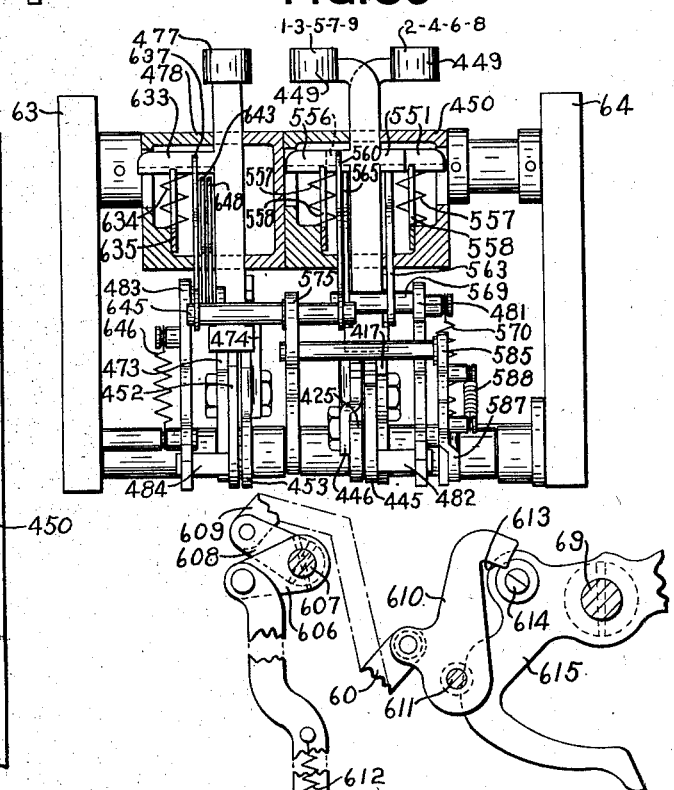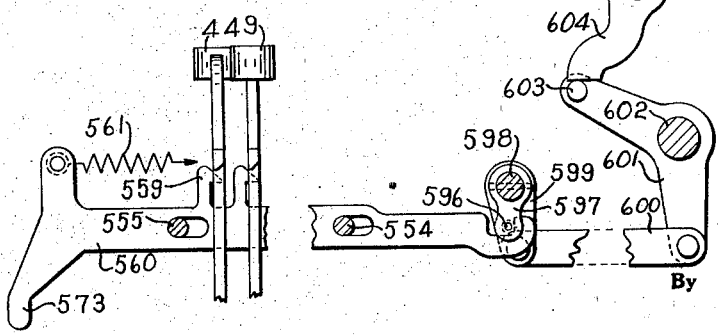

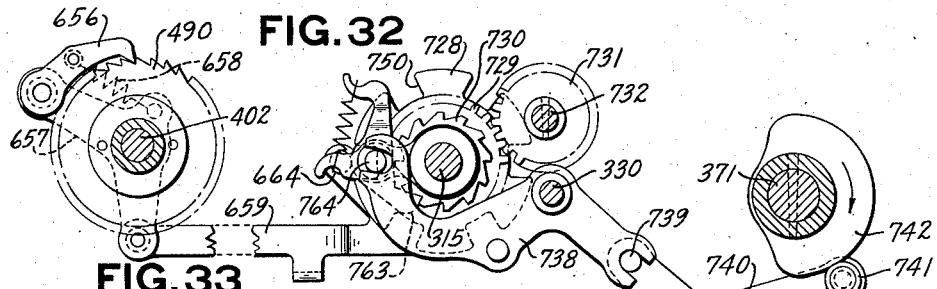
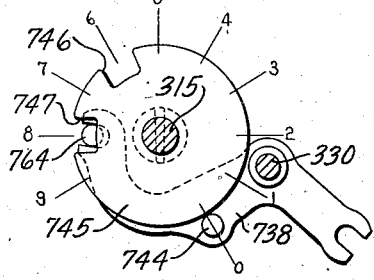
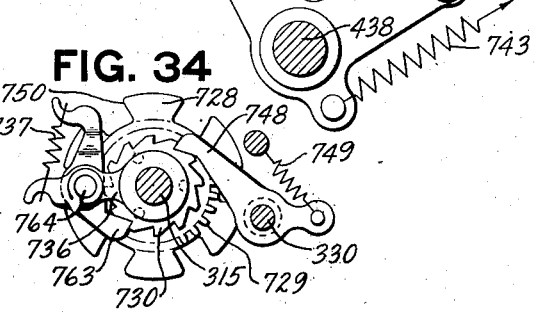
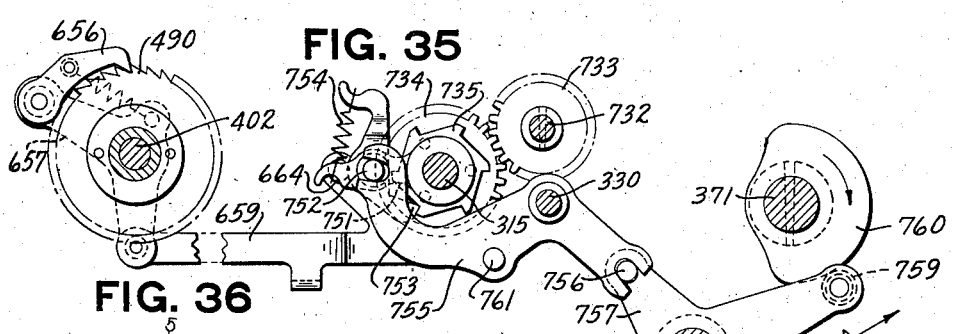
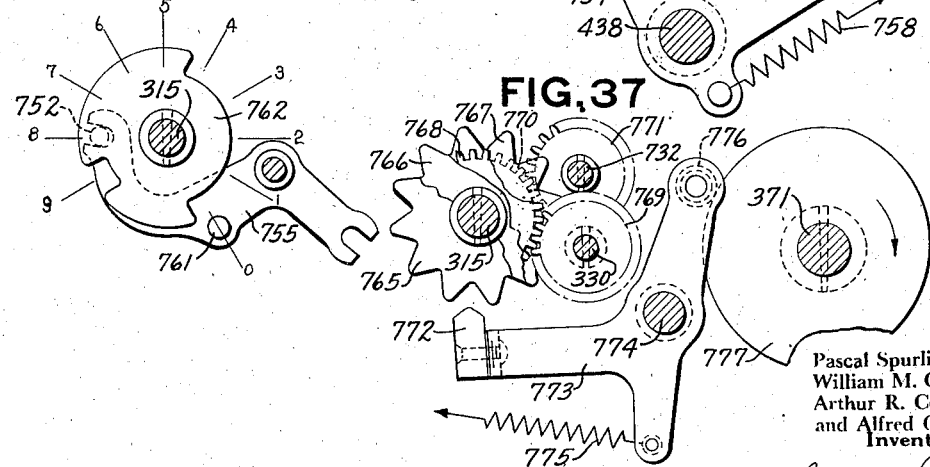

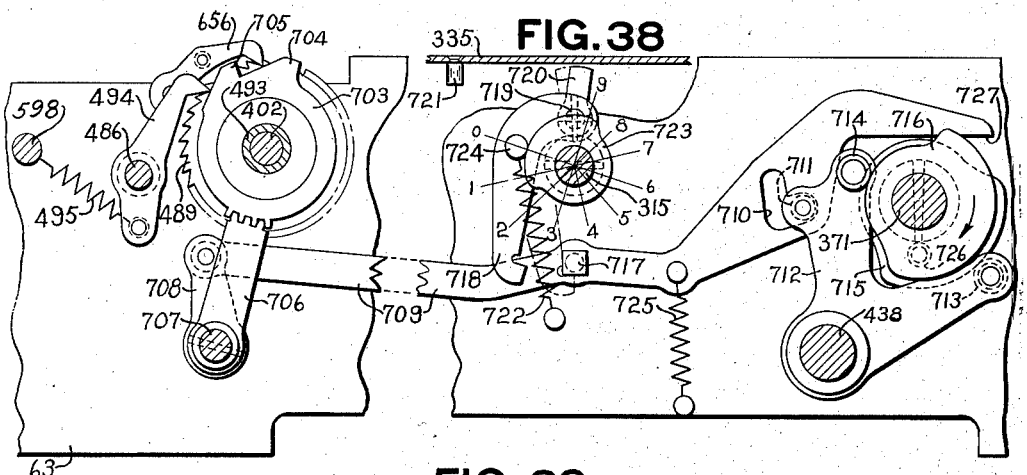
FIG. 38
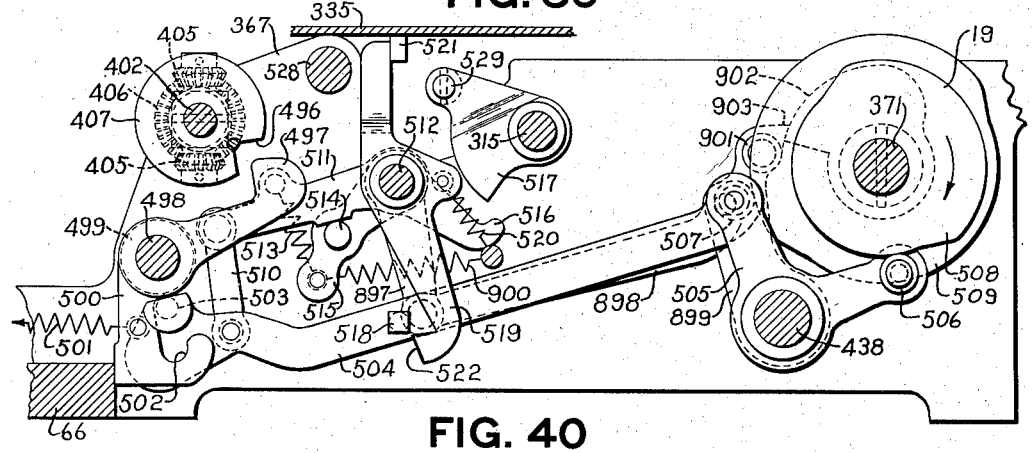
FIG. 39
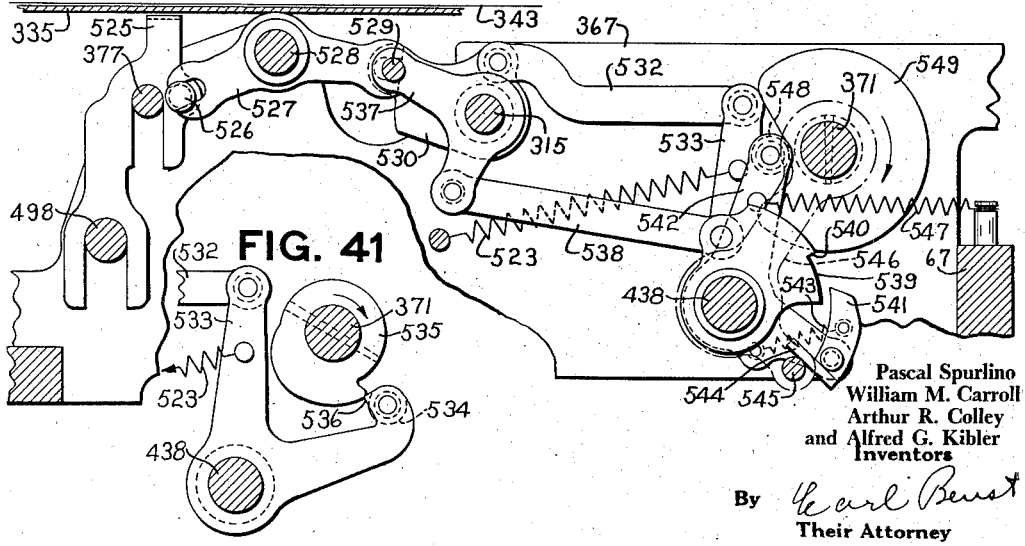
FIG. 40
FIG. 41
Pascal Spurlino
William M. Carroll
Arthur R. Colley
and Alfred G. Kibler
Inventors
By *Earl Benst*
Their Attorney May 8, 1945.　　P. SPURLINO ET AL　　2,375,594
ACCOUNTING MACHINE
Filed Jan. 30, 1941　　20 Sheets-Sheet 17

Pascal Spurlino
William M. Carroll
Arthur R. Colley
and Alfred G. Kibler
Inventors By Earl Beust
Their Attorney

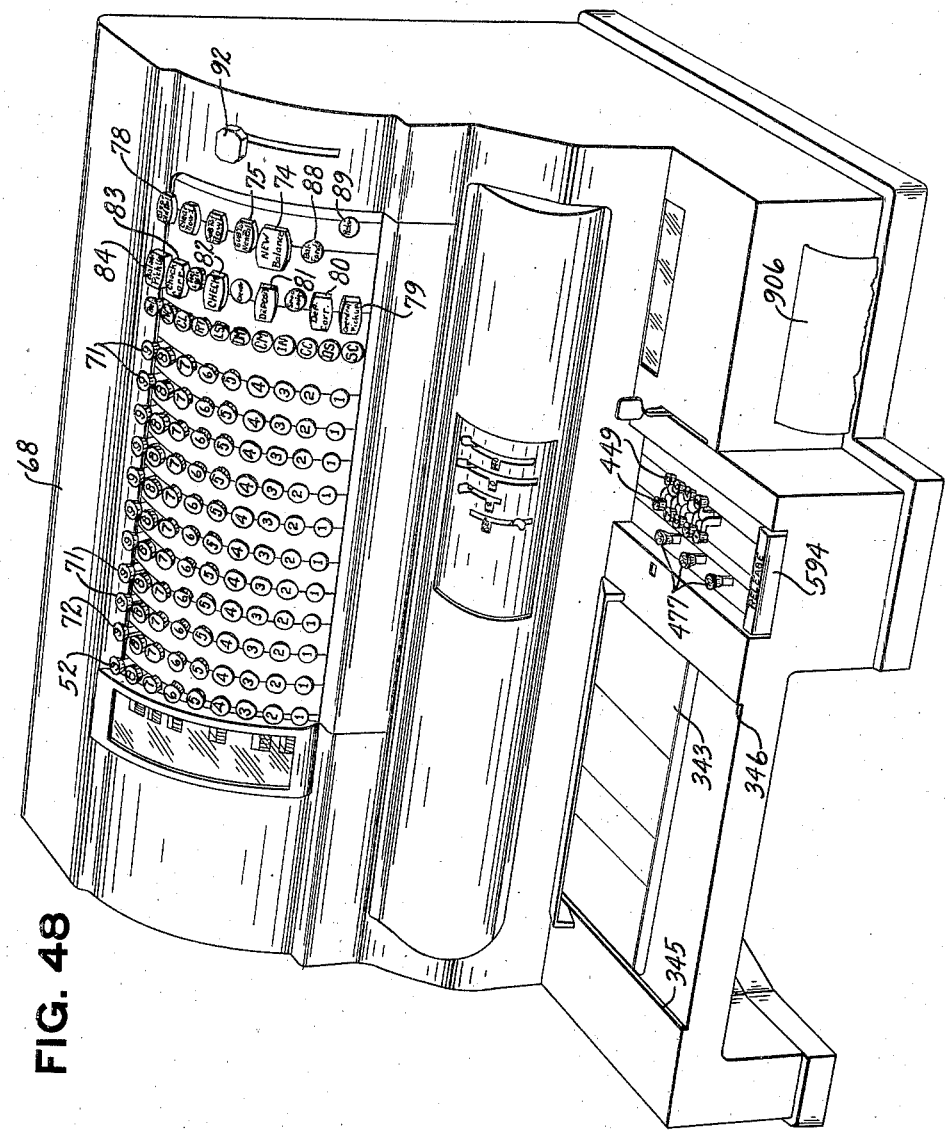

Patented May 8, 1945

2,375,594

UNITED STATES PATENT OFFICE 2,375,594

ACCOUNTING MACHINE

Pascal Spurlino, William M. Carroll, Arthur R. Colley, and Alfred G. Kibler, Dayton, Ohio, assignors to The National Cash Register Company, Dayton, Ohio, a corporation of Maryland Application January 30, 1941, Serial No. 376,670

25 Claims. (Cl. 101—93)

The present invention relates to accounting and similar business machines and is particularly directed to the record material feeding means of such machines.

The present invention is embodied in a machine of the general type disclosed in the following United States patents, to which reference may be had for a complete showing and description of standard mechanism not fully disclosed herein: United States Patents No. 1,619,796, No. 1,747,397, and No. 1,761,542, issued respectively March 1, 1927, February 18, 1930, and June 3, 1930, to Bernis M. Shipley; Patent No. 2,175,346, issued October 10, 1939, to Maximilian M. Goldberg; Patent No. 2,141,332, issued December 27, 1938, to Charles H. Arnold; and Patent No. 1,693,279, issued November 27, 1928, to Walter J. Kreider. The machine embodying the instant invention as presently constructed is commonly referred to as a "commercial posting" or "bank service" machine and is used by banks and similar institutions for the posting of individual checking accounts.

It is common practice to post each individual checking account daily, provided said individual accounts remain active every day, and this posting includes the picking up of old balances; the subtracting of debits, generally in the nature of checks drawn against said account from said old balance; the addition of credits, generally in the nature of deposits to said account; and the performing of a total-taking operation to arrive at a new balance.

While the machine of this invention is arranged for use by banks in the posting of individual checking accounts, it is not the desire to limit said machine to such use, as, with minor alterations and adjustments, it may be arranged for use in connection with numerous other types of business systems, all coming within the scope of this invention.

One object of this invention is to provide an accounting machine capable of balancing accounts in an efficient and speedy manner, said balancing including the picking up of old balances, the subtraction of debit items therefrom, the addition of credit items thereto, and the taking and transferring of totals to arrive at new balances.

Another object of this invention is to provide a machine for use by banks and analogous business institutions for use in the preparation of periodical statements of their customers' accounts.

Still another object is to provide a column-printing accounting machine with means for selectively printing on the various lines of a statement and/or ledger sheet.

A further object is to provide an accounting machine adapted to record entries on the various lines of a statement and/or ledger sheet with means to select any desired line for the recording of the first entry, and means effective after the desired line has been selected to automatically control the feeding of the statement and/or ledger sheet to record subsequent entries.

A still further object is to supply an accounting machine, adapted to record a plurality of different items on the various lines of record material, with manually controlled means to select any desired line of the record material for the recording of the first item, and to provide said machine with automatically controlled means, effective after the first item is recorded, to cause a plurality of different items to be recorded on the same line of the record material, or a plurality of like items to be recorded on different lines of said record material.

A still further object is to provide an accounting machine, having a positionable table for presenting the various lines of record material to the recording means, for the recording of various items, with manually controlled means to position the table to select the desired line of the record material for the recording of the first item and to provide automatically controlled means to position the table after the first item is recorded, to record subsequent items.

Another object is to provide means for counting the number of a certain item recorded during the balancing of one account.

Another object is to supply means to automatically count "one" when the amount of a certain item is recorded, said means also adapted to be manually controlled to count a plurality of items when the total amount of said items is recorded.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 2 is a fragmentary view of a facsimile of a combined statement and ledger sheet prepared on the machine of this invention.

Fig. 3 is a facsimile of a fragmentary portion of another combined statement and ledger sheet prepared on the present machine.

Fig. 9 is a detail view of one of the keys in the units check-counting bank and a portion of the mechanism associated therewith.

Fig. 10 is a perspective view of the mechanism for controlling the automatic check-counting mechanism.

Figure 12:
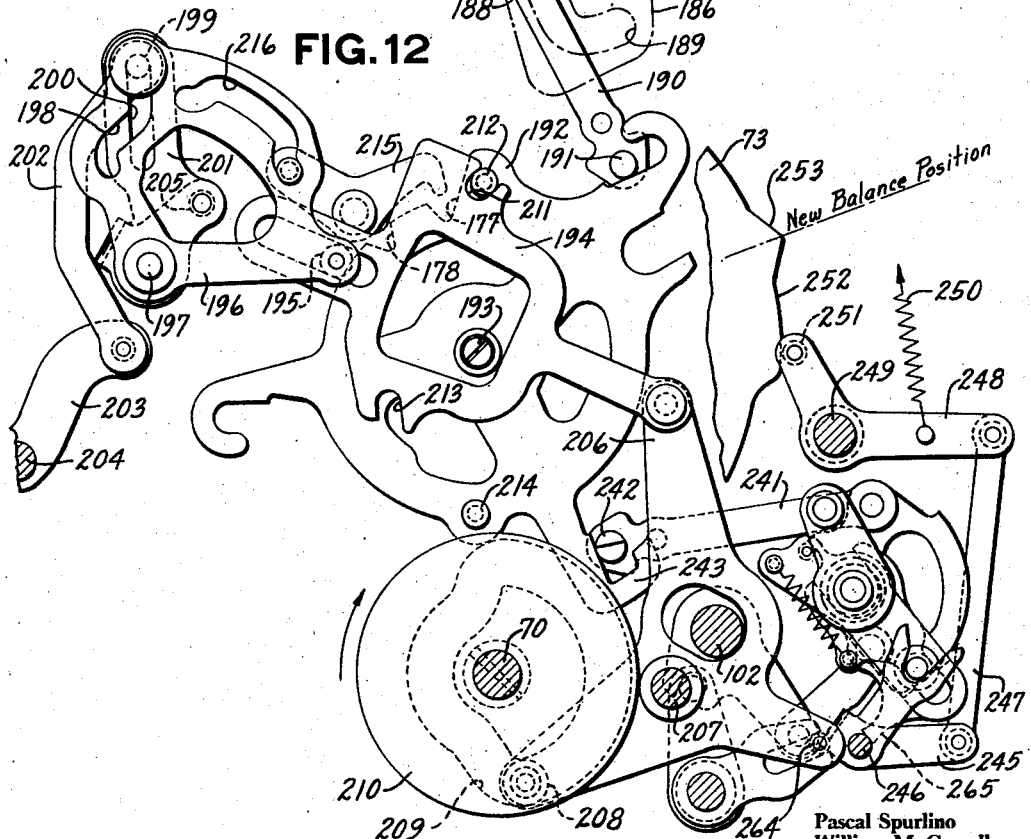
Fig. 12 is a side elevation as observed from the right of the machine, showing the totalizer-engaging mechanism and the transfer total mechanism.

Figs. 13, 14, and 15 are details of a portion of the mechanism of the transfer total mechanism shown in Fig. 12.

Fig. 16 is a side-spacing view of the mechanisms shown in Figs. 13, 14, and 15.

Fig. 17 is a diagrammatical view of the shifting cam and one denominational order or totalizer wheels for the No. 1 balance totalizer or crossfooter and the shifting cam and one denominational order of wheels for the No. 2 or back totalizer.

Fig. 18 is a facsimile of a fragmentary portion of the journal sheet, prepared by the machine of this invention, upon which a duplicate recording is made of every item recorded upon the statement sheet.

Fig. 19 is a plan view of the table mechanism for presenting the statement sheet to the printing mechanism.

Fig. 20 is a side elevation as observed from the left of the machine, showing a portion of the mechanism for positioning the movable table.

Fig. 21 is a side elevation, as observed from the right of the machine, of the gripping mechanism effective upon machine operation for holding the statement slip in place upon the movable table.

Fig. 22 is a right elevation showing one of the check hammers and the operating and controlling mechanisms associated therewith.

Fig. 23 is a right side view of the mechanism for insuring that the table is in proper position before impression takes place.

Fig. 24 is a side-spacing view of a part of the mechanism shown in Fig. 23.

Figure 25A:
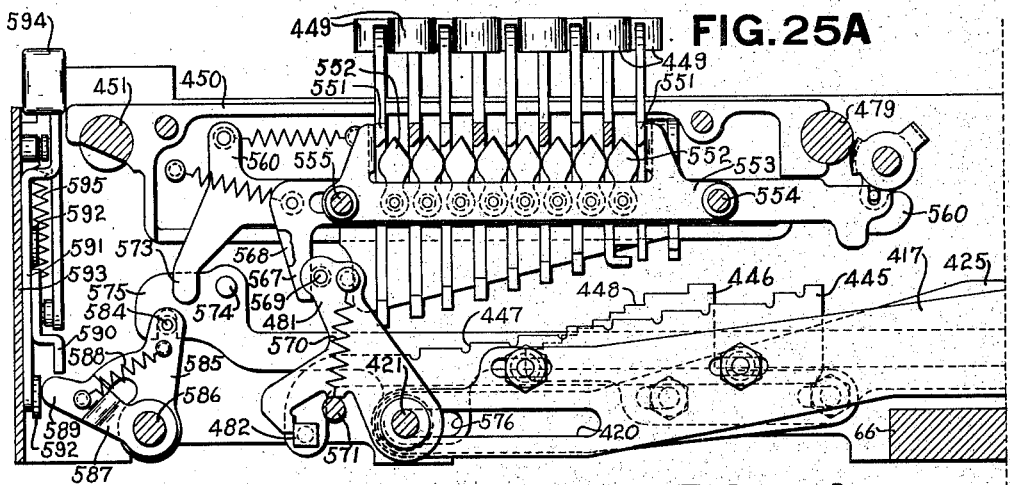
Figure 25B:
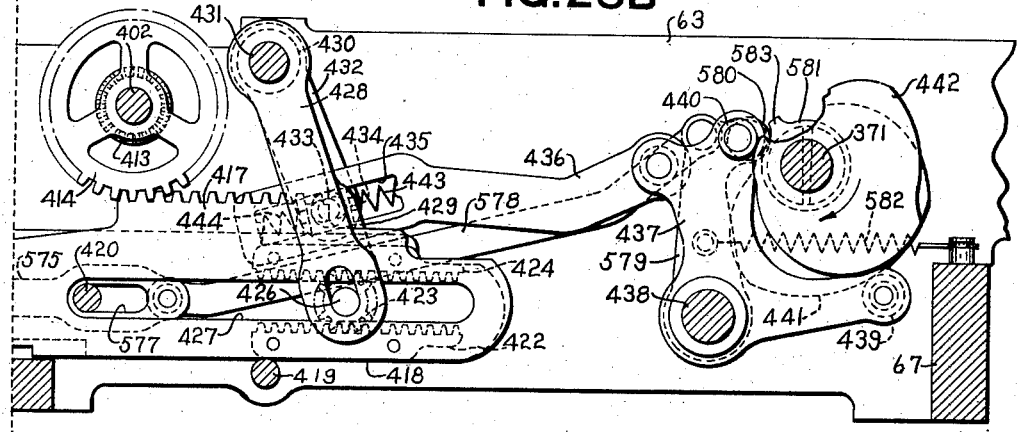

Figs. 25A and 25B together constitute a right side elevation of the units line-selecting keys and the table-positioning mechanism associated therewith.

Figure 26A:
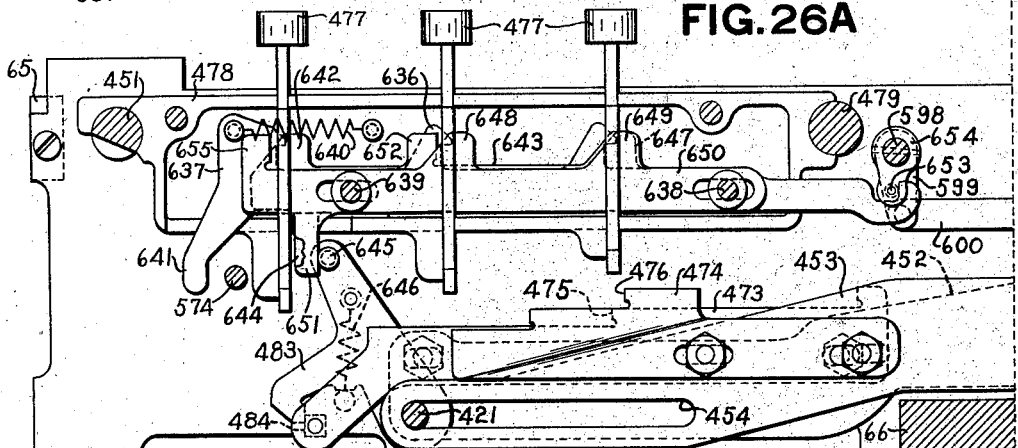
Figure 26B:
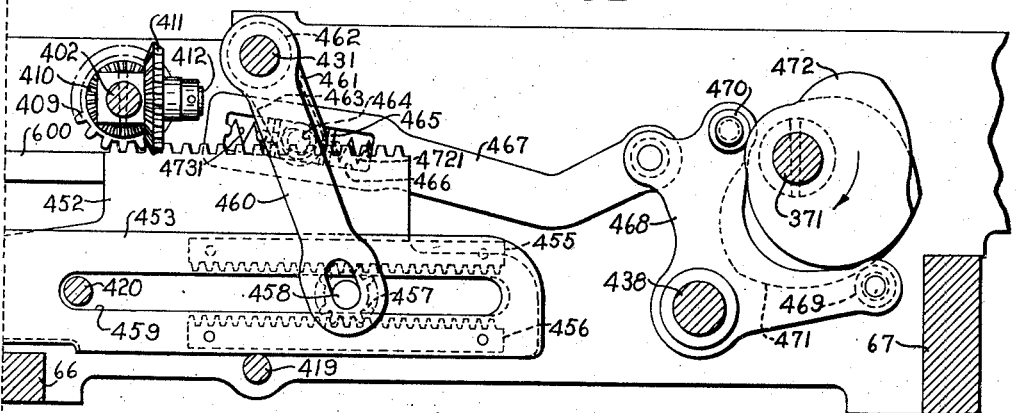

Figs. 26A and 26B together constitute a right side elevation of the tens line-selecting keys and the table-positioning mechanism associated therewith.

Figure 27A:
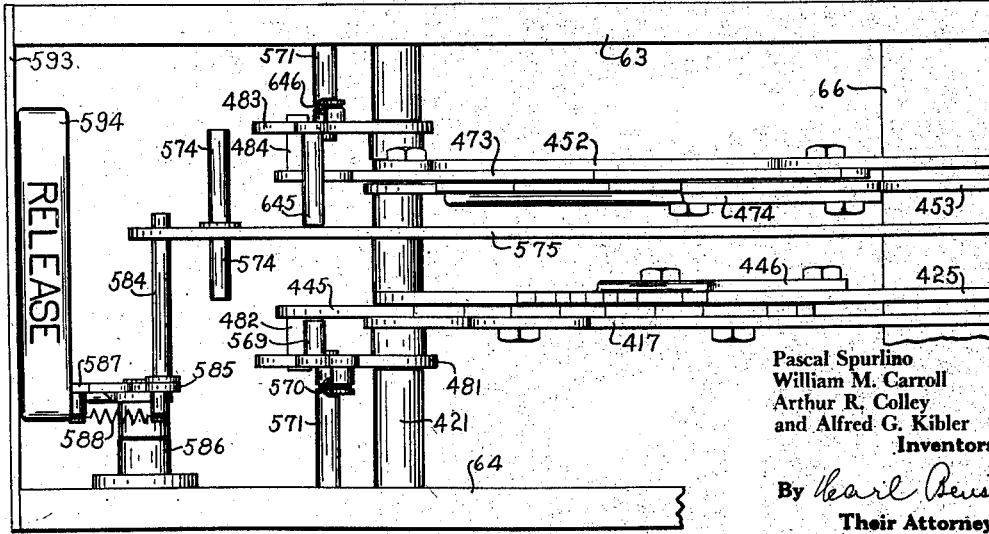
Figure 27B:
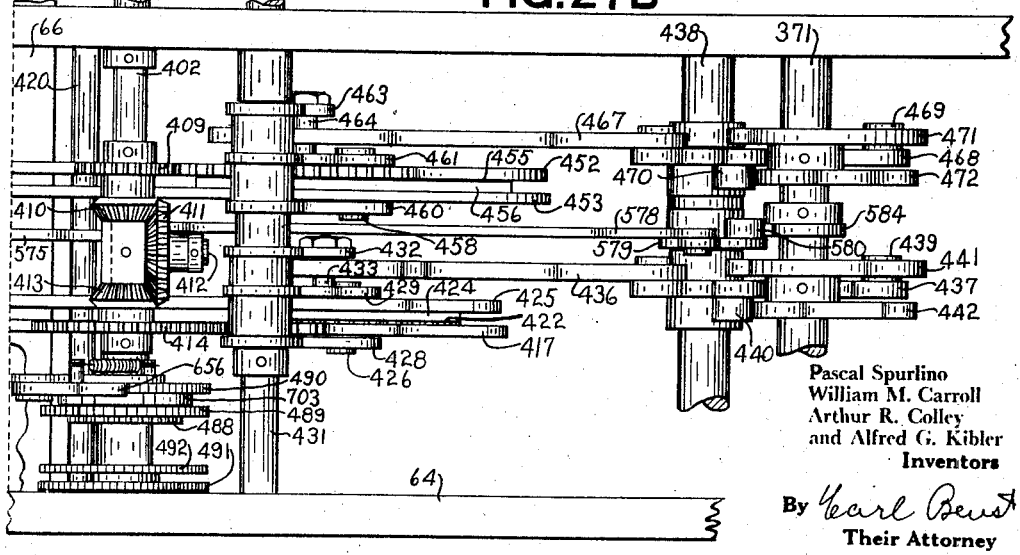

Figs. 27A and 27B together form a top plan view of a portion of the table-positioning mechanism shown in Figs. 25A, 25B, 26A, and 26B.

Fig. 28 is a right side view of the units bank of line-selecting keys, with the cover plate of the key frame removed to better show the construction of the control plates and detent associated with said keys.

Fig. 29 is a plan view of two banks of line-finding keys.

Fig. 30 is a sectional view of the two banks of line-finding keys as observed from the front of the machine, showing in particular the releasing mechanism for said keys.

Fig. 31 is a fragmentary side elevation showing the interlocking mechanism between the line-selecting keys and the machine-releasing mechanism.

Figs. 32, 33, and 34 are detail views or portions of the mechanism for controlling the automatic positioning of the statement slips during check-posting operations.

Figs. 35 and 36 are detail views of a portion of the mechanism for controlling the positioning of the statement slips during other than check-posting operations.

Fig. 37 is a detail view of the mechanism for alining the control disks.

Fig. 38 is a right side elevation of the mechanism for effecting the restoring of the statement slip table to initial or home position.

Figs. 39 and 40 are right side elevations of the mechanisms controlled by the statement slips feeler mechanism for preventing operation of the table-positioning mechanism and the statement slip printing hammers when no slip is placed on the table.

Fig. 41 is detail view of the cam and associated cam lever for operating the slip feeler.

Figure 42:
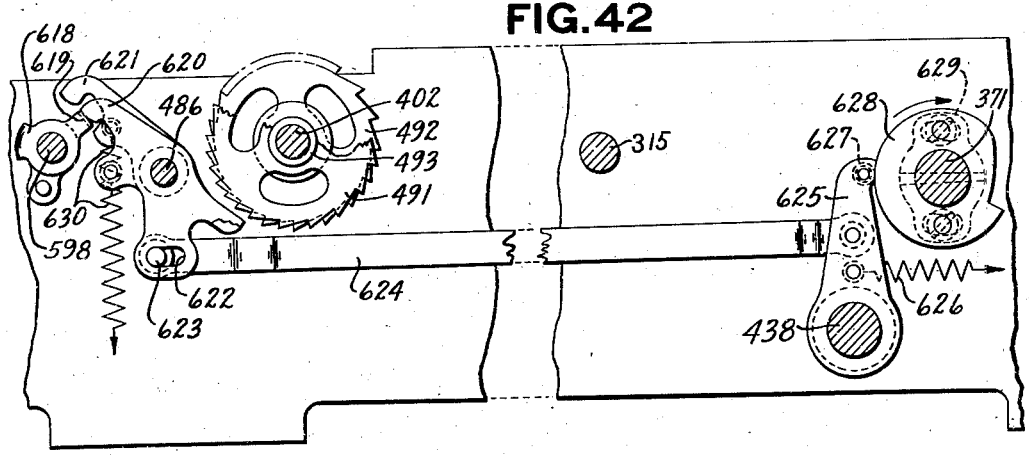

Fig. 42 is a right side elevation of the mechanism for preventing overdrive of the slip table when moved through several line positions or upon rapid operation of the machine.

Figure 43:
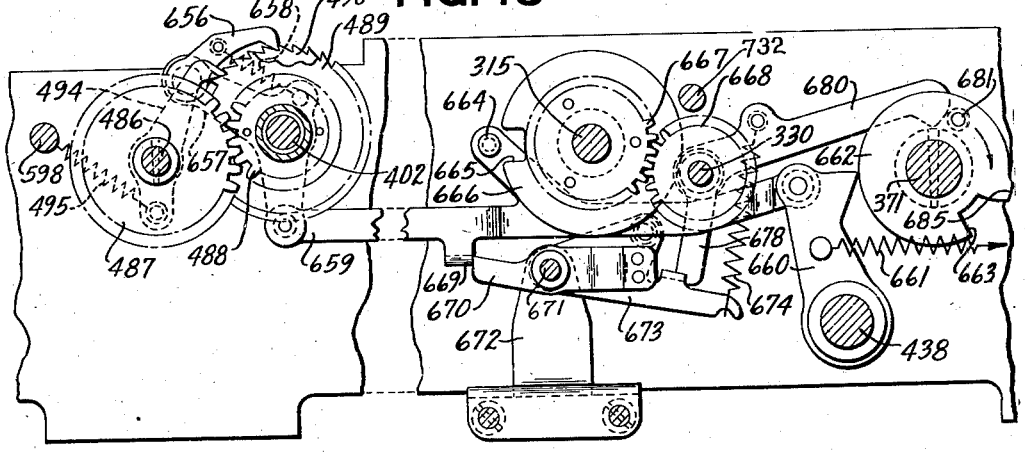

Fig. 43 is a right side elevation of the automatic table-positioning mechanism and a part of the controlling mechanism associated therewith.

Figure 44:
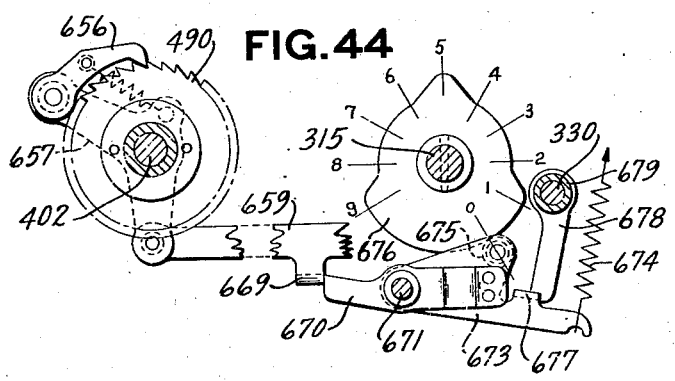

Fig. 44 is a detail fragmentary view of the automatic table-positioning mechanism and part of the controlling mechanism associated therewith.

Figure 45:
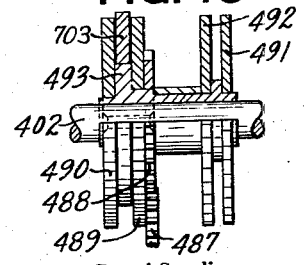
Figure 46:
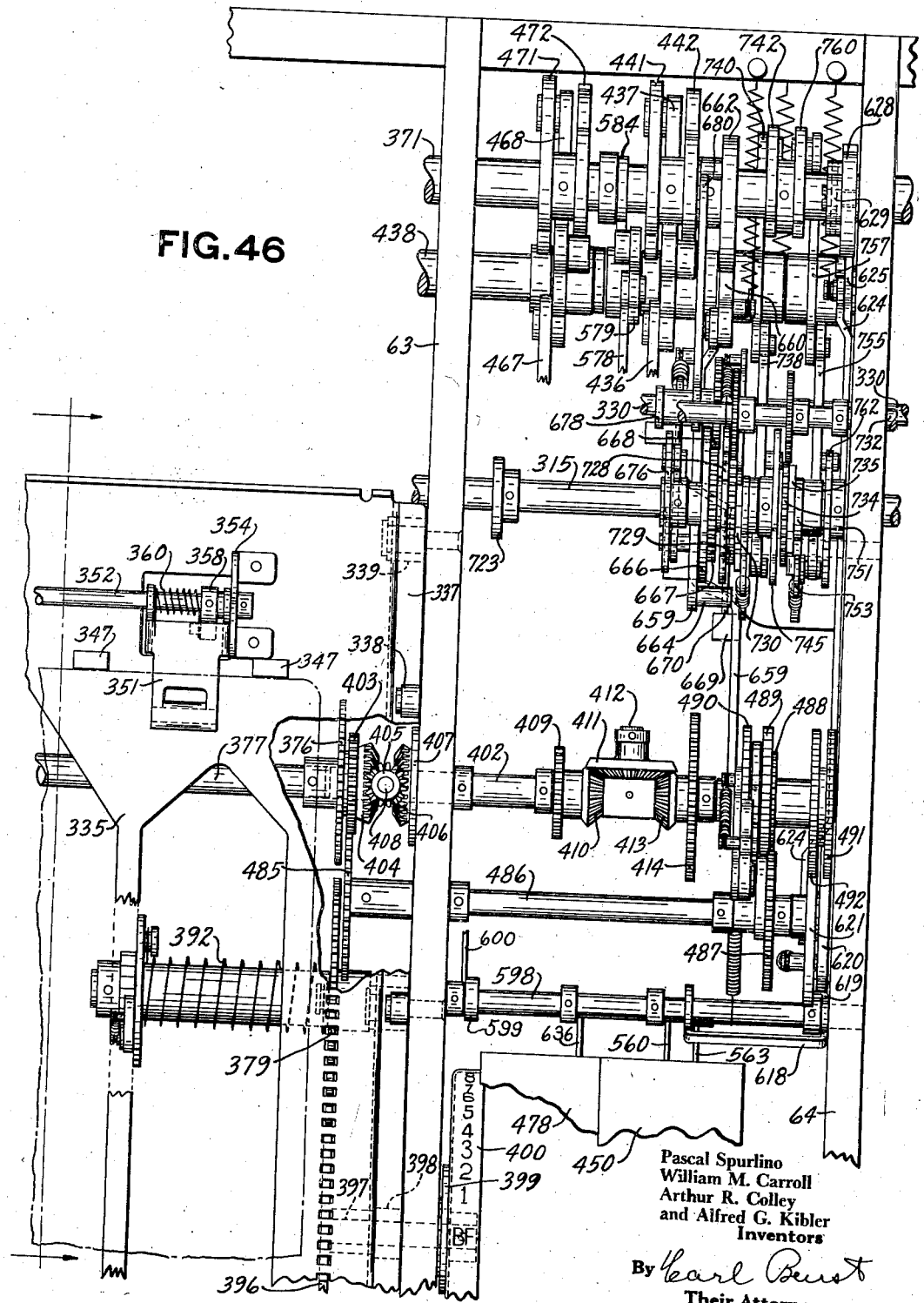

Fig. 45 is a partially sectioned side-spacing view of the cam assembly shown in Fig. 46.

Fig. 46 is a plan view of the table-positioning mechanism.

Figure 47:
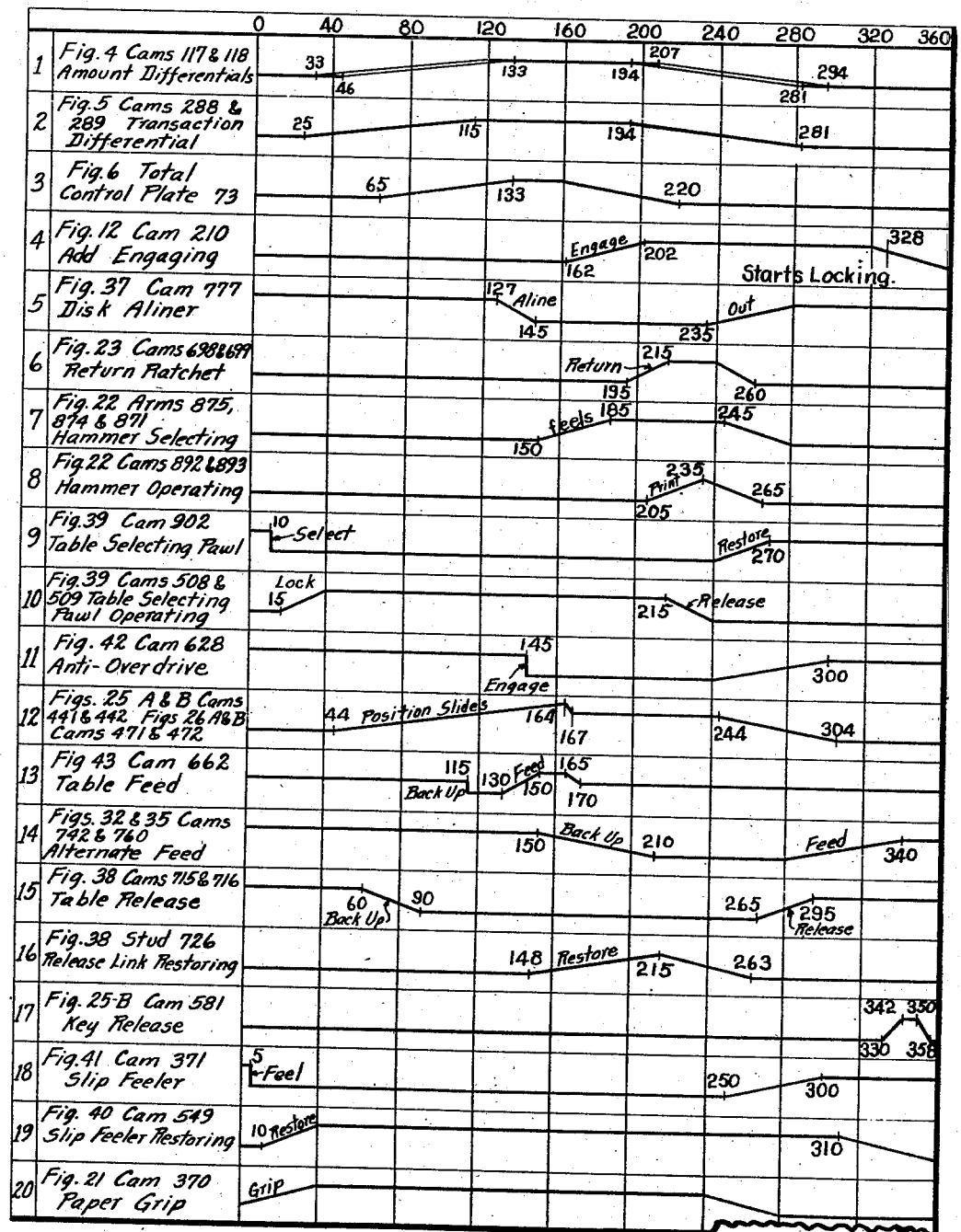

Fig. 47 is a time chart giving in graphic form the movements of the important mechanisms of the present machine.

Fig. 48 is a perspective view of the complete machine.

GENERAL DESCRIPTION

The machine embodying the instant invention is of the general type disclosed in the Arnold Patent No. 2,141,332, referred to hereinbefore, and is provided with a column-printing mechanism located at the front of the machine for simultaneously recording identical data in one or more columns of an insertable slip or bill during one operating cycle of the printing mechanism. Machines of this character are useful in the preparation of bills or statements by banks, public utility companies, and the like, said bills or statements being provided with a plurality of vertical columns either for the printing of the same data in the several columns, or for the printing of different data in said columns. Likewise, the statements or bills may be provided with two separable portions containing identical data, one for the customer and one to be retained as a file copy.

In the present case, the specific example chosen to illustrate the system used in connection with the machine of this invention is the preparation, by a banking institution, of statement slips of the individual checking accounts of a plurality of customers of said institution. However, it is not the desire or intention to limit this machine to the banking system outlined above, for, as previously stated, with minor alterations and adjustments, said machine may readily be adapted for use in connection with many business systems.

The main portion of the machine of this invention is of standard construction, and, as this standard mechanism is fully disclosed in the patents referred to at the beginning of this specification, such mechanism will be but briefly treated herein.

The machine chosen to illustrate the present invention is provided with a plurality of rows of amount keys for entering amounts in the various totalizers with which the machine is equipped and for setting up corresponding type wheels to record the amount on record material. The machine also has a row of transaction keys for entering positive and negative items in the various totalizers and a row of symbol-printing keys for printing symbols for identifying the various items. Instead of the conventional total control lever, this machine is equipped with a row of total control keys which control the functions of the machine, including adding, subtracting, reading, and resetting operations. A key release lever, located on the right-hand side of the keyboard, is used for releasing any depressed keys.

The machine embodying this invention is provided with an automatic counting mechanism for counting "one" automatically each time a certain item key—in this case the check key—is depressed in an operation. The check-counting wheels are located in the two highest order positions on the balance totalizer line. However, these wheels are not connected with the balance totalizer in any way and automatically count up to 99 checks. A Check Correction transaction key is provided for correcting checks or other debit items which have been entered erroneously, and, when this key is depressed, it causes "one" to be subtracted from the check-counting wheels by adding the complementary figure of 99 in said wheels. In addition to the automatic counting of checks, two rows of keys are provided at the left-hand end of the keyboard for use in setting up the number of checks in a bundle when the total amount of these checks is entered as one item during one operation of the machine. Various interlocks are provided for controlling the automatic check-counting mechanism.

The present machine is provided with two totalizer lines; namely, an upper or No. 1 totalizer line and a back or No. 2 totalizer line. The upper or No. 1 totalizer line supports the balance totalizer, often referred to as a crossfooter, which is used for computing positive and negative amounts to arrive at new balances. The back or No. 2 totalizer line has thereon four totalizers, two of which are add-subtract totalizers, one for keeping a total of the debit or check items and the other for keeping a total of the credit or deposit items. The reason add and subtract totalizers are used for totals of checks and deposits is that, in check correction and deposit correction operations, it is necessary to subtract in these totalizers in order to secure a correct total.

One of the adding totalizers on the No. 2 totalizer line is for storing a grand total of positive new balances, and the other adding totalizer is for storing a grand total of negative new balances. These grand totals are transferred from the balance totalizer to the corresponding adding wheels on the No. 2 totalizer line during new balance operations.

The computations in connection with the posting of individual checking accounts is recorded on a combination statement and ledger sheet similar to those shown in Figs. 2 and 3. The statement portion of the combined statement and ledger sheet is divided into three vertical sections headed, respectively, "Debits," "Credits," and "Balance," and the ledger portion of the sheet comprises one section headed "Balance," in which a duplicate printing of the balances takes place. The "Debit" section of the statement sheet is divided into two columns for the recording of debit items, such as checks, service charges, and the like; the "Credit" section comprises one column for the recording of credits or deposits; and the "Balance" column of the statement sheet comprises two vertical columns for the recording of the date and the recording of new balances. The ledger portion of the sheet is divided into three vertical columns, the first of which is for the recording of the date, the second for the recording of the total number of checks entered in each periodical posting, and the third for the recording of the new balances.

In addition to the recordings on the statement sheet, a duplicate recording of all transactions takes place on a detail or journal strip, shown in Fig. 18. The journal strip is divided into four vertical columns, the first of which is for the recording of debit or check items, the second for the recording of credit or deposit items, the third for recording the total number of checks listed in each periodical posting, and the fourth for the recording of the new balances. It will be noted that the items are posted on the journal strip in a reverse direction; that is, the item corresponding to the first item on the statement sheet is located at the bottom of the journal strip, and so on.

By referring to Figs. 2 and 3, it will be noted that each of the combined statements and ledger sheets contains 39 horizontal lines for the entering of items, said lines being indicated by numerals on the right-hand margin of the ledger portion of said sheet. It will likewise be noted that a space is provided above the first line for the recording of the Balance Forward.

A horizontally shiftable table located at the front of the machine is provided for presenting the combined statement and ledger sheets to the recording mechanism. The statement sheet table has 39 line positions, corresponding to the 39 lines of the statement sheet, and a normal or home position, which corresponds to the Balance Forward position on the statement sheet. A full complement of units line-selecting keys and three tens line-selecting keys—namely, 10, 20, and 30—are provided for manually selecting the first line of the statement slip upon which a recording is to be made. After this initial selection of the desired line, the consecutive feeding of the table and the statement sheet is entirely automatic and is controlled by the transaction keys and the total keys.

In a Balance Forward operation, the old balance is picked up from a previous statement sheet, and, as the Balance Forward key has been depressed prior to this operation, positioning of the table and the statement sheet under the influence of the line-finding keys is prevented, and consequently the Balance Forward item is posted in the line space reserved therefor, located just above the first line. After the Balance Forward operation, the No. 1 line-finding key is depressed to select the first line of the statement sheet, after which the posting of the account proceeds. As a rule, the debit items or checks are posted first, and it will be noted that the "Debit" section of the statement slip is divided into two vertical columns and that the first debit item prints in the first or left-hand column and the second debit item prints in the second column on the same line as the first item, and, if there is a third debit item, this prints on the next line in the first column, and so on, until all the debit items are listed.

Next, the credit or deposit items are listed in the "Credit" section of the statement sheet, and, if there are more than one deposit item, the table line-spaces automatically so that these items are printed in consecutive order.

After all the debt and credit items have been posted, a new balance operation is performed, in which a recording of the date and the new balance takes place in the "Balance" section of the statement sheet and in the corresponding section of the ledger portion of said sheet.

In subsequent posting operations, the line-finding keys corresponding to the next available line of the statement sheet are depressed to select the next available line for the entry of the first item, after which the spacing of the statement sheet is entirely automatic, as explained above. At the end of a new balance operation, the statement sheet table is returned forwardly to normal or home position, so that the combined statement and ledger sheets may be removed from said table and a new one placed thereon.

By referring to Fig. 2, it will be noted that the machine as presently constructed is arranged to print on 39 lines of the statement and ledger sheet. Immediately after the first item is recorded on the 39th line, the table is automatically returned to starting position to call the operator's attention to the fact that the last line of the statement sheet is being used. If the operator wishes to enter more items on line 39, it is necessary to depress the "39" line-finding keys for each item entered on said line, as the table will be returned to starting position automatically after each entry.

By referring to line 37 of Fig. 2, it will be noted that two debit items, a credit item and a new balance, will be printed on one horizontal line of the combined statement and ledger sheets. As previously explained, if there are more than two debit items to be posted, the statement sheet will be line-spaced, and likewise, if there are more than one credit item to be posted, said sheet will also be line-spaced.

The Balance Pick-Up key, the Overdraft Pick-Up key, the New Balance key, and the Sub-Total New Balance key cause the table to be automatically returned to starting position. When either the Balance Pick-Up key or the Overdraft Pick-Up key is used in connection with the Balance Forward key, which is a printing key, the amount of the previous balance is printed in the "Balance Forward" position on the statement sheet. The Balance Pick-Up key and the Overdraft Pick-Up key also cause the table to be automatically returned to starting position, which is the proper position for the recording of the previous balance. When either the Balance Pick-Up key or the Overdraft Pick-Up key is used to pick up old balances which are not to be printed on a new statement sheet, the Balance Forward key is not depressed in conjunction therewith, and consequently the old balance is entered in the balance totalizer without being printed on the statement sheet. In other words, the Balance Forward key (Fig. 1) is the printing key for the Balance Pick-Up key and the Overdraft Pick-Up key, and use thereof in conjunction with these keys causes the old balance to be printed on the "Balance Forward" line of the statement sheet.

When an account is overdraw, the New Balance key is locked against depression, thus bringing the operator's attention to the fact that the account is overdrawn. In the case of an overdraft, the operator has several alternatives. If it is desired to clear the overdraft from the balance totalizer and print the overdraft on the statement sheet, the Overdraft key (Fig. 1) is first depressed to unlock the New Balance key, after which said New Balance key may be depressed to initiate a new balance operation, or, if it is desired to take a sub-total of the overdraft, the Overdraft key is first depressed to unlock the Sub-Total New Balance key, after which said key may be depressed. Another alternative is to notify the depositor that his account is overdrawn and ask him to bring or send in a deposit sufficiently large to overcome this overdraft; or previously-posted checks of sufficient amount to overcome the overdraft may be withdrawn from the posting by using the Check Correction key.

A statement sheet feeler mechanism is provided for preventing movement of the table out of the normal or home position under the influence of the line-finding keys unless a statement sheet is properly placed on said table. An interlocking mechanism is provided between the line-finding keys and the machine-releasing mechanism to prevent operation of the machine when a line-finding key is partially depressed.

In the ensuing pages, mechanism pertinent to the present invention will be described in detail.

DETAILED DESCRIPTION

*Framework and operating mechanism*

Figure 4:
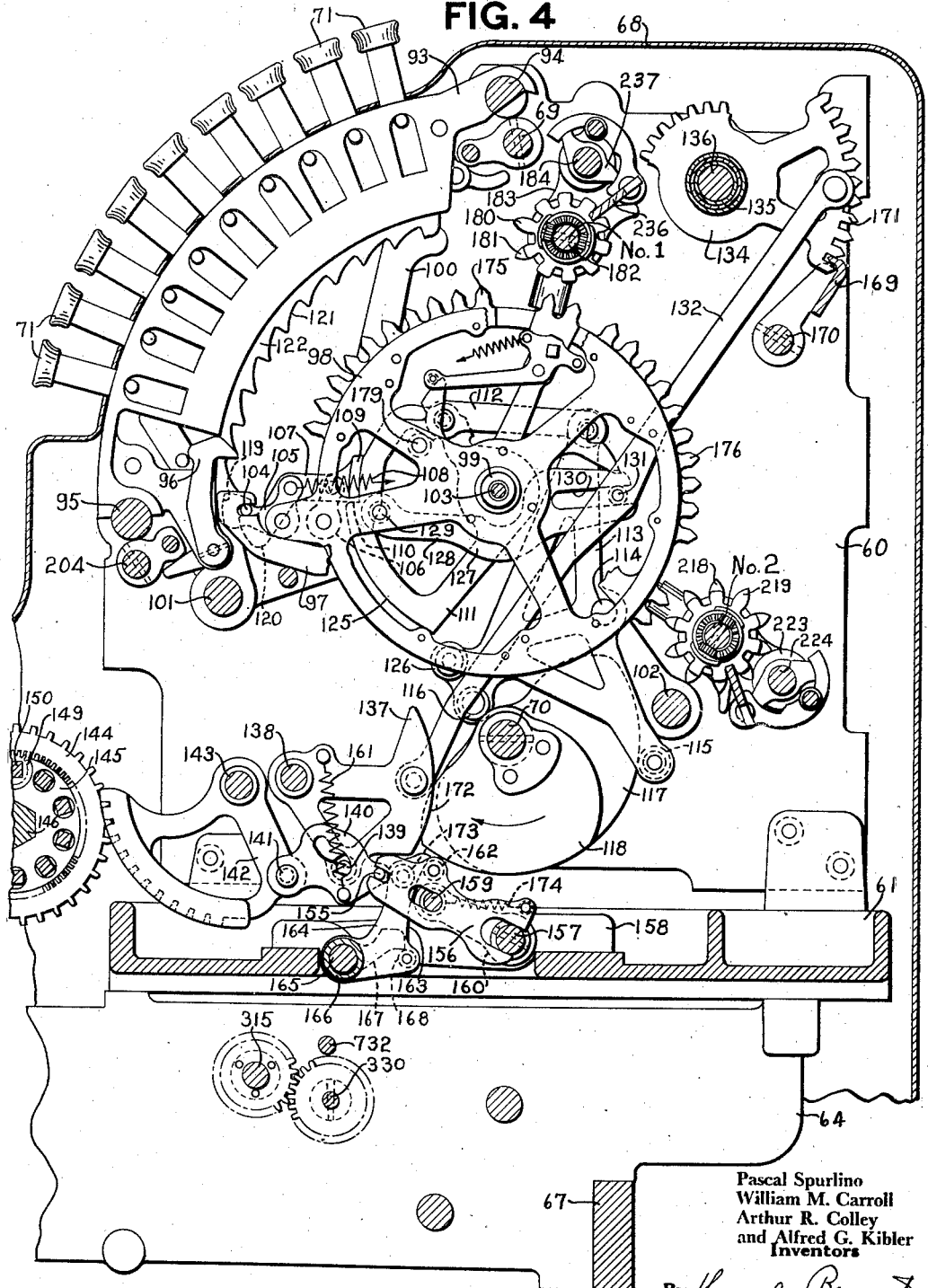
Fig. 4 is a sectional view taken just to the right of one of the amount banks, showing the mechanism associated therewith.

The main framework of the machine comprises a left frame 60 (Figs. 4 and 5) and a similar right frame (not shown), which support most of the machine mechanism and which are in turn secured to a machine base 61 and are further supported in relation to each other by various cross frames, rods, and bars. The base plate 61 rests on and is secured to four printer frames, three of which, 62, 63, and 64, are here shown in Figs. 4, 5, 19, and 46. The printer frames are secured in fixed relationship to each other by a front tie bar 65 (Figs. 20, 26A, and 26B), a center tie bar 66, and a rear tie bar 67, and by various other bars, rods, and shafts. The printer frames 62, 63, and 64 are in turn secured to the top surface of a sub-base (not shown), and the mechanism of the machine is enclosed in a suitable case or cabinet 68 (Figs. 4 and 48).

Normally the machine is operated electrically by a conventional type of motor in the manner disclosed in the Shipley patents referred to hereinbefore, and, in addition, a hand crank (not shown) is provided for operating the machine manually when necessary. The well-known electric starting bar used on previous machines and shown in the Shipley Patents No. 1,747,397 and No. 1,761,542, mentioned at the beginning of this specification, has been omitted from this machine, and, instead, the machine is released for operation by depression of any one of a plurality of so-called "motorized" or "operating" keys located in the total control row and in the transaction row. These keys will be explained in detail later herein.

Depression of any one of the "operating" keys releases a key lock shaft 69 (Figs. 4 and 31) to the action of a spring (not shown), which rocks said shaft a slight distance clockwise to operate the clutch mechanism which connects the operating motor to a main shaft 70 (Figs. 4 and 5) journaled in the main frame 60, and simultaneously operates the switch mechanism which closes the circuit to the operating motor, causing said motor to function. After the machine has performed the proper number of cycles to complete the type of operation being executed, the key lock shaft 69 is returned counter-clockwise to disengage the clutch mechanism and to simultaneously open the switch to the electric motor. When the machine is operated manually, the "operating" keys are used for releasing the machine in exactly the same manner as when said machine is operated electrically.

*Keyboard*

Figure 1:
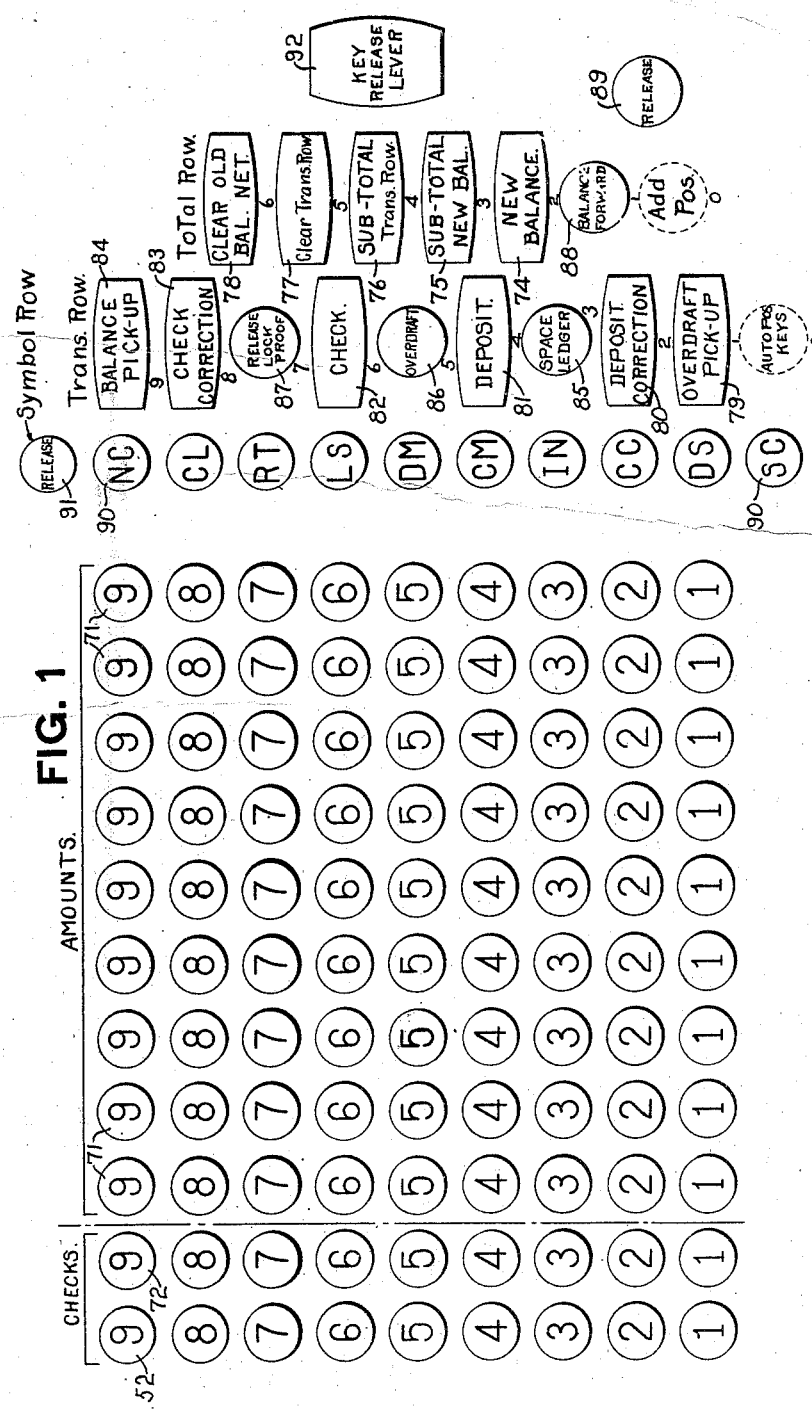
Fig. 1 is a diagrammatic plan view of the keyboard of the machine embodying the instant invention.

Referring to Fig. 1, which is a diagrammatic showing of the keyboard, it will be seen that there are nine rows of amount keys 71 and two rows of check-counting keys 52 and 72, which are similar in many respects to the amount keys 71 but have their own counting wheels on the No. 1 or upper totalizer line for counting the number of checks listed in posting an account.

The present machine is provided with a total control plate 73 (Fig. 6) for controlling the engaging and disengaging movements of the two totalizer lines in adding, subtracting, total-printing, and sub-total-printing operations. The positioning of the total control plate 73 is controlled by a plurality of total control keys (Fig. 1) numbered 74 to 78 inclusive and located near the right-hand side of the keyboard. The total control keys 74, 75, and 78 are motorized or operating keys and are used to initiate operation of the machine.

The present machine is provided with two lines of totalizers which are selected for engagement with the amount actuators by the use of keys in a transaction row (Figs. 1 and 5) located adjacent the total control keys and numbered 79 to 84 inclusive, all of which are operating keys. In addition to the operating keys 79 to 84, the transaction row also contains a Space Ledger key 85 for spacing the combined statement and ledger sheet table; an Overdraft key 86, which is used to unlock the New Balance key 74 when the balance totalizer contains an overdraft; and a Release Lock-Proof key 87, which is used to unlock the Overdraft Pick-Up key 79 and the Balance Pick-Up key 84 when there is an amount in the balance totalizer. After an old balance is picked up and entered in the machine by the use of either the Overdraft Pick-Up key 79 or the Balance Pick-Up key 84, these keys are then locked against depression until a new balance is taken, thus insuring that the old balance is not picked up more than once. The Release Lock-Proof key 87 is used to unlock these keys in case it is desired to use the keys 79 and 84 more than once.

Normally the Overdraft Pick-Up key 79 and the Balance Pick-Up key 84 do not print upon the statement sheet; however, when it is desired to have the old balance recorded, a Balance Forward key 88, located in the total row, is depressed in conjunction with these keys and causes the amount of the old balance to be printed on the "Balance Forward" line of the statement sheet. A Release key 89 is provided for releasing the Balance Forward key, which is not released automatically at the end of machine operations. The Space Ledger key 85, like the transaction keys 79 to 84 inclusive, is an operating key.

Located to the left of the transaction keys is a symbol row containing ten keys for printing identifying symbols adjacent items listed under the influence of the transaction keys. The symbol keys 80 are normally stay-down keys; however, a release key 91, located at the top of this row of keys, is provided for releasing the symbol keys when desired. The NC symbol key is depressed in conjunction with the Check key 82 when it is desired not to have the debit item being posted counted by the automatic check-counting mechanism. In other words, the NC symbol key, which signifies "non-count," disables the automatic check-counting mechanism. The NC key, in addition to disabling the automatic check-counting mechanism, also causes the symbol NC to be printed opposite the debit item or check which was not counted.

The monthly bookkeeping or service charge is deducted from the customer's account by setting up the amount on the amount keys 71 and using the Check key 82. When the service charge is posted, the SC symbol key 90 is depressed in conjunction with the Check key 82 to cause the symbol for service charge ("SC") to be printed opposite the amount of the service charge, and the depression of the SC key also disables the automatic check-counting mechanism, so that the service charge item will not be counted.

All of the symbol keys 90, with the exception of the NC and the SC keys, are simply printing keys and cause identifying symbols to be printed opposite the corresponding items. For example, the IN key is an Interest key and causes the symbol IN to be printed opposite the amount of an interest item. The LS or List symbol key is used when it is desired to list the total amount of a bunch of checks in one check operation, and this type of operation is identified as such by the symbol LS printed opposite the amount. When the total amount of a bunch of checks is listed in this manner, the number of checks in the bunch is set up on the check-counting keys 52 and 72, thus causing the total number of checks to be entered in the check-counting wheels. The use of the check-counting keys 52 and 72 to list the number of checks in a bunch or bundle renders the automatic check-counting mechanism inoperative during such listing.

The position occupied by the symbol Release key 91 (Fig. 1) is also an automatic position for automatically printing the symbol EC for Error Correction and is rendered effective by depression of either the Deposit Correction key 80 or the Check Correction key 83.

A Key Release Lever 92 (Fig. 1), located at the extreme right-hand side of the keyboard, is provided for releasing any of the keys with the exception of the stay-down keys, which include the Symbol keys 90 and the Balance Forward key 88. The manner in which the transaction keys 79 to 84 inclusive control the selection of the different totalizers will be explained more in detail later herein, in connection with the description of the totalizers.

The manner in which the total control keys 74 to 78 inclusive and the total control plate 73 (Figs. 1 and 6) control the engaging and disengaging movements of the two totalizer lines is fully explained in the Shipley patents referred to previously and in the United States Patent No. 2,262,258, issued to Shipley et al. on November 11, 1941, to which reference may be had for a more detailed description of this mechanism.

*Amount banks and amount differentials*

The nine banks of amount keys and their associated differential mechanisms are alike in every respect and are similar in construction to those shown in the patents to Shipley and Goldberg referred to hereinbefore. Inasmuch as the amount banks are alike, it is believed that a description of one of said banks and the differential mechanism associated therewith will be sufficient.

Fig. 4 is a transverse sectional view of the machine taken just to the right of one of the amount banks, showing said bank and its associated differential mechanism, which will be considered as representative of all the amount banks.

The amount keys 71 are mounted in a key bank framework 93 supported by rods 94 and 95 extending between the main frames 60 of the machine. The depression of any one of the amount keys 71 rocks a zero stop pawl 96, for this particular denomination, counter-clockwise out of the path of a reset spider 97 free on a hub of an amount differential actuator 98 rotatably supported on a bushing 99 extending between two similar support plates 100 (only one here shown), said plates in turn supported by rods 101 and 102 extending between the main frames 60. There is a pair of supporting plates 100 for each amount differential mechanism, and a tie rod 103 extends through holes in the center of the bushings 99 to secure all of the amount differentials in a compact unit.

A slot in the forward end of the spider 97 engages a stud 104 in a forward extension of a bell crank 105 pivoted on an extension of the actuator 98. The bell crank 105 and a companion crank 106, likewise pivoted on the extension of the actuator 98, together support a differential latch 107 for horizontal shifting movement. A spring 108 urges the cranks 105 and 106 and the latch 107 rearwardly to normally hold a foot-shaped projection 109 of said latch in engagement with a shoulder 110 on a differential driving segment 111 rotatably supported on the hub of the actuator 98. A link 112 pivotally connects the driving segment 111 to a cam lever 113 pivoted on a stud 114 in the left-hand one of the plates 100, and said lever 113 carries rollers 115 and 116, which cooperates respectively with the peripheries of companion plate cams 117 and 118 secured on the main shaft 70. Depression of any one of the amount keys 71 moves the lower end of the stem thereof into the path of a rounded surface 119 on an extension of one arm of the bell crank 105.

In adding operations, the main shaft 70 and the cams 117 and 118 make one clockwise revolution, causing the lever 113 to rock the driving segment 111 first clockwise and then back to normal position, according to the time given in space 1 of the chart (Fig. 47). Clockwise movement of the segment 111 causes the shoulder 110 thereon, in cooperation with the extension 109 of the latch 107, to carry said latch and the amount actuator 98 clockwise in unison therewith until the rounded surface 119 contacts the stem of the depressed amount key 71. This rocks the bell crank 105 and its companion crank 106 counter-clockwise to disengage the projection 109 from the shoulder 110 to interrupt the clockwise movement of the actuator 98 and to position said actuator in proportion to the depressed amount key 71. Disengaging movement of the latch 107 moves a rounded extension 120 thereof into engagement with the corresponding one of a series of locating notches 121 in a plate 122 secured between the rod 101 and an upward extension of the left-hand support plate 100.

After the latch 107 is disengaged from the shoulder 110, an arcuate surface 125 on the segment 111 moves opposite the projection 109 to retain said latch in set position.

When the lever 113 reaches the terminus of its clockwise movement, a roller 126 carried thereby engages an arcuate surface 127 on a beam 128 pivoted on a stud 129 in the actuator 98 and forces a concave surface on the upper edge of said beam into contact with the hub of the actuator 98 to position said beam in proportion to the depressed amount key.

The beam 128 (Fig. 4) has therein a slot 130, which engages a stud 131 in a link 132, the upper end of which link is pivoted to a totalizer-selecting segment 134 mounted on one of a series of nested tubes 135 supported by a shaft 136 journaled in the main frame 60. The lower end of the link 132 is pivotally connected to a segment 137 free on a shaft 138 journaled in the frame 60. The segment 137 carries a stud 139, which engages a camming slot in a zero elimination cam plate 140 pivotally mounted on a stud 141 in a segmental gear 142 free on a shaft 143 journaled in the main frames 60.

Figure 6:
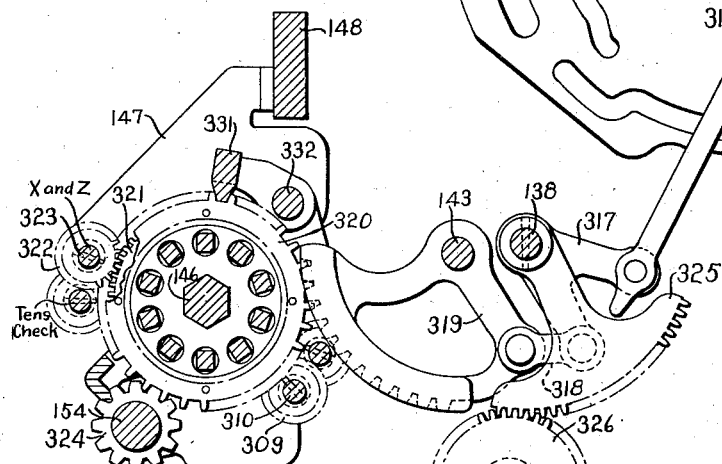
Fig. 6 is a detail view of a fragmentary portion of the total control plate and the mechanism controlled by said plate for positioning the corresponding type wheels and the corresponding control disks.

The teeth of the segmental gear 142 mesh with the external teeth of an external-internal ring gear 144 (Figs. 4, 6, and 22) having internal teeth, which, in cooperation with the periphery of a disk 145 fixed on a shaft 146 supported by brackets 147 secured to a cross bar 148 and the main framework of the machine, form a rotatable support for said gear 144. The bar 148 (Fig. 6) is secured to the main frames 60 of the machine. The internal teeth of the ring gear 144 (Fig. 22) mesh with a pinion 149 rotatably supported in a boring in the disk 145 and secured to a square shaft 150. The pinion 149 and the square shaft in turn drive pinions 151 (Fig. 22) similar to the pinion 149, which drive internal-external gears 152 for this particular denomination, the external teeth of said gears in turn driving corresponding type wheels 153 free on a shaft 154 supported by the plates 147 (Fig. 6). There is a type wheel 153 and associated driving mechanism for each column of the record material in which the amount is to be recorded.

The external-internal gear method of driving the type wheels of column-printing accounting machines is fully explained in United States Patent No. 2,141,332, issued to Charles H. Arnold, and embodies an application of the well-known principle of type wheel driving mechanism disclosed in United States Patent No. 1,693,279, issued to Walter J. Kreider.

The plate 140 (Fig. 4) carries a stud 155, which is engaged by a slot in the end of a zero elimination operating slide 156 having parallel slots which engage respectively a shaft 157 journaled in brackets 158 secured to the base 61, and a rod 159 supported by arms 160 (only one here shown) secured on the shaft 157. A spring 161, tensioned between the segment 137 and the plate 140, normally maintains the lower end of the cam slot in said plate 140 in engagement with the stud 139, as here shown.

Inasmuch as the zero elimination mechanism here shown is similar to and functions precisely like the zero elimination mechanism disclosed in United States Patent No. 2,141,333, issued December 27, 1938, to Charles H. Arnold, it is believed that a brief description of this mechanism as shown in Fig. 4 will be sufficient.

The zero elimination slide 156 carries a roller 162, which cooperates with an arcuate surface 163 on a slide-operating arm 164 free on a shaft 165 journaled in the brackets 158. The arm 164 is connected by a hub free on the shaft 165 to a companion arm 167, which cooperates with a stud 168 in the arm 164 for the next lower denomination. Likewise, the arm 164 for the denomination being described carries a stud 168, which cooperates with the arm 167 for the next higher denomination, and so on. The stud 168 in the arm 164 for the highest denomination cooperates with an arm similar to the arm 167, which is secured to the shaft 165, and said shaft is rocked first clockwise near the beginning of machine operations and back to normal position in the manner shown in Fig. 5 of the Arnold patent referred to above. Clockwise movement of the shaft 165 and the arm 167 for the highest denomination is transmitted through the stud 168 to the arm 164 for said highest denomination, and on down the line through all the denominations to rock the arm 164 here shown first clockwise to shift the slide 156 rearwardly to disengage the slot in said slide from the stud 155 in the cam 140.

Assuming, for example, that a key has been depressed in the amount bank shown in Fig. 4, after the slide 156 therefor has been shifted rearwardly out of engagement with the stud 155 and after the actuator 98 has been positioned under influence of the depressed key 71, the roller 126 engages the arcuate surface 127 to position the beam 128, the link 132, and the segments 134 and 137 in proportion to said depressed amount key. Prior to the positioning of the segment 134 as explained above, an aliner 169 (Fig. 4) secured on the shaft 170 journaled in the main frame 60 is rocked clockwise out of engagement with teeth 171 in the segment 134, and, after said segment is positioned under the influence of the beam 128, said aliner 169 is engaged with the teeth 171 to secure the segments 134 and 137 against displacement.

Positioning of the segment 137 moves an arcuate surface 172 thereon into the path of a roller 173 carried by the arm 164 for this particular denomination. Consequently, return movement forwardly of the slide 156 under the influence of a spring 174 is obstructed, and said slide is retained in its rearward position. The stud 168 in the arm 164 for the denomination shown in Fig. 4 obstructs return movement counter-clockwise of the arm 164 for the next lower denomination, and so on down the line, to hold the slides 156 for all lower denominations in rearward position to retain the slots in said slides out of engagement with the studs 155, so that no movement will be imparted to the cam plate 140 when the shaft 157 and the arms 160 are rocked counter-clockwise and back to normal position after the segments 137 have been positioned under the influence of the depressed amount keys, as explained above.

When no key 71 is depressed in the amount bank shown in Fig. 4 or in any of the higher order amount banks, the segment 137 is positioned at zero, as here shown, in which position a clearance portion of said segment is opposite the roller 173. This permits return movement forwardly of the arm 164 and the slide 156, under the influence of the spring 174, to cause the notch in the end of said slide to reengage the stud 155. After the notch in the slide has reengaged the stud 155, counter-clockwise movement is imparted to the shaft 157, the arms 160, and the slide 156 by mechanism similar to that shown in Fig. 4 of the Arnold Patent No. 2,141,333, referred to above. Counter-clockwise movement of the slide 156 rocks the zero elimination cam plate 140 clockwise, causing the cam slot therein, in cooperation with the stud 139, which is held stationary at this time, to rock the segment 142 counter-clockwise against the action of the spring 161 to move the ring gear 144 clockwise from zero position, as here shown, to one position beyond zero, which in this case is a blank or non-printing position. Clockwise movement of the ring gear 144 (Figs. 4 and 22) imparts, through the pinions 149, the shaft 150, and the pinions 151, similar movement to the ring gears 152 for this particular denomination to move the type wheels 153 counter-clockwise from zero position, as shown in Fig. 22, to non-printing position, so that the zeros in the amount bank shown in Fig. 4 will not print. Obviously, zero printing will be eliminated in a like manner in all higher denominations. In other words, the zero elimination mechanism functions when a key 71 is depressed in row five of the amount keys (Fig. 1) to cause the zeros to print in the four lower denominations and to eliminate the printing of zeros in the four higher denominations.

After the amount actuator 98 (Fig. 4) has been positioned under the influence of the depressed amount key 71, as explained above, the wheels of the selected totalizer are engaged with the corresponding one of two sets of teeth 175 and 176 thereon, after which return movement of the cam lever 113 and the segment 111 causes the arcuate surface 125 on said segment to move beyond the sole of the projection 109 on the latch 107 to permit said latch, under the influence of the spring 108, to drop behind the shoulder 110 to disengage the rounded nose 120 of said latch from the notch 121 in the plate 122. At the same time, an enlarged surface on the segment 111 engages a stud 179 carried by the actuator 98 and returns said actuator counter-clockwise in unison with said segment to zero position. This return movement counter-clockwise of the actuator 98 rotates the wheels of the engaged totalizer or totalizers in proportion to the value of the depressed amount key 71 to add or subtract in said totalizer or totalizers the amount represented by the depressed amount key 71.

If no amount key 71 is depressed, the zero stop pawl 96 remains in the path of the spider 97 and, upon initial movement of said spider and the actuator 98, engages an extension of said spider and breaks the latch 107 in zero position, after which the roller 126, in cooperation with the beam 128, positions the segments 134 and 137 and associated mechanism in proportion thereto to position the type wheels 153 (Fig. 22) for this particular amount bank in zero position.

At the end of any type of operation, the actuator 98 (Fig. 4) is always returned to home position, as here shown; however, the link 132 and the segments 134 and 137 and the printing mechanism controlled thereby remain in set position at the end of the machine operation and are moved directly from this set position to their new position in the succeeding machine operation. The usual transfer mechanism is provided for transferring tens digits from lower to higher denominations in adding and subtracting operations.

*Totalizers*

As previously explained, the machine embodying this invention has two lines of totalizers, including an upper or No. 1 totalizer line and a back or No. 2 totalizer line. The No. 1 totalizer is a balance totalizer, often referred to as a crossfooter, and comprises denominational sets of plus wheels 180 (Figs. 4 and 17) and denominational sets of minus wheels 181, said plus and minus wheels of each denominational order being reversely geared together, so that when one wheel is turned in one direction the other turns in the opposite direction and vice versa. The balance totalizer is supported in a shiftable framework 183 (Fig. 4) in turn supported between the main frames 60. The shiftable framework 183 for the balance totalizer includes a shaft 184 (Figs. 4 and 12) having mounted on opposite ends thereof rollers 185 which engage similar guide slots in two shifting cam plates 186 (only one here shown) (Fig. 12) secured respectively to the right and left main frames 60. Secured on opposite ends of the shaft 184 are similar cranks 187 having rollers 188, which engage respectively similar camming slots 189 in the two cam plates 186. The right-hand crank 187 has pivotally connected thereto one end of an engaging link 190 having in the other end thereof a stud 191, which cooperates with a corresponding hook in an engaging spider 192 rotatably supported by a stationary stud 193.

Movement is imparted to the engaging spider 192 by a totalizer-engaging slide 194 having a slot in a forward extension thereof, which engages a stud 195 in a cam plate 196 free on a stationary stud 197. The cam plate 196 has therein a cam slot 198, which is connected by a stud 199 to a substantially vertical slot 200 in one arm of a yoke 201 also rotatably supported on the stud 197. The stud 199 is secured in the upper end of a link 202, the lower end of which is pivotally connected to a crank 203 secured on a zero throwout shaft 204. Another arm of the yoke 201 carries a stud 205, which engages a camming slot in the total control plate 73 (Fig. 6), said slot not being shown here.

The manner in which the total control plate 73 controls the movement of the yoke 201 and the manner in which the zero throwout shaft 204 controls the movement of the crank 203 to in turn control engaging of the slide 194 with the spider 192 are fully described in the Shipley and Goldberg patents referred to at the beginning of this specification; therefore only a general description will be given of this mechanism herein.

A rearward extension of the slide 194 is pivoted to the upper end of a cam lever 206 free on a stationary stud 207. The lever 206 (Fig. 12) carries a roller 208, which engages a camming groove 209 in one face of a cam 210 secured on the main shaft 70.

The shifting of the link 190 to control the engaging of the stud 191 with the hook in the spider 192 is controlled in adding operations by the usual and well-known mutilated control disks, which are in turn controlled by the transaction keys, and the engaging movement of said link is controlled in sub-total and total-printing operations by a slot in the total control plate 73 (Fig. 6) in the well-known manner.

When the total control plate 73 (Fig. 6) is in adding position, a notch 211 in the slide 194 is engaged with a stud 212 in the spider 192, as shown in Fig. 12, and when the stud 191 is engaged with the hook of said spider 192, the lever 206, under the influence of the cam groove 209, shifts the slide 194 rearwardly or to the right, as here observed, according to the time given in space 4 of the chart (Fig. 47) to impart clockwise movement to the spider 192. Clockwise movement of the spider 192 through the link 190 rocks the crank 187 and the shaft 184 also counter-clockwise, causing the rollers 188, in cooperation with the cam slots 189, to shift the shaft 184 and the totalizer framework 183 (Fig. 4) to engage the selected set of wheels 180 or 181 on the balance totalizer with the amount actuators 98.

As previously explained, in adding and subtracting operations, the engaging of the selected set of wheels with the actuators occurs after said actuators have been positioned by the depressed amount key 71, and return movement counter-clockwise of said actuators rotates said selected wheels in proportion to the value of the depressed keys to enter the amount set up on the keyboard therein. After the actuators 98 have completed their return movement counter-clockwise, the cam 210 (Fig. 12) returns the slide 194 forwardly to return the spider 192 counter-clockwise to disengage the wheels of the balance totalizer from the amount actuators 98.

In sub-total printing operations, movement of the total control plate 73 (Figs. 6 and 12) away from adding position to sub-total position, according to the time given in space 3 of the chart (Fig. 47), imparts an initial movement clockwise to the zero throwout shaft 204 and sets up a condition which causes added clockwise movement to be imparted to said shaft later in the sub-total printing operation. Initial movement clockwise of the shaft 204 shifts the stud 199 downwardly in relation to the slots 198 and 200; however, this downward movement of the stud 199 is confined to the straight portion of the slot 198, and consequently the notch 211 in the slide 194 remains in engagement with the stud 212, as here shown.

It will be recalled that, in sub-total and total-printing operations, the main shaft 70 and the cams secured thereon receive two clockwise revolutions instead of one, as in adding and subtracting operations. During the first revolution of the cam 210, the groove 209 rocks the lever 206 clockwise to shift the slide 194 rearwardly to engage the wheels of the selected totalizer with the amount actuators prior to their initial movement clockwise, as said actuators are retained in zero position during the first cycle of a sub-total or a total-printing operation. The first cycle of a sub-total or a total-printing operation is utilized to shift the totalizer lines laterally to select the desired set of totalizer wheels thereon for reading or resetting, as the case may be. During the second cycle of a sub-total or total-printing operation, the actuators 98, in their initial movement clockwise, reversely rotate the wheels of the selected totalizer until the long teeth on said wheels locate said wheels in zero position to position the amount actuators 98 in proportion to the amount on said wheels. After the amount actuators 98 are thus positioned in proportion to the amount standing on the wheels of the selected totalizer, the roller 126 (Fig. 4) engages the beam 128 to position the segment 137 and the printing mechanism in proportion to the amount on the totalizer wheels.

In sub-total printing operations, after the slide 194 has completed its initial movement rearwardly to engage the selected totalizer wheels with the amount actuators, additional movement is imparted to the shaft 204 to cause the stud 199, in cooperation with the camming slots 198 and 200, to impart clockwise movement to the plate 196 to disengage the notch 211 from the stud 212, so that the wheels of the selected totalizer will not be disengaged from the amount actuators 98 at the end of the first cycle of operation. In sub-total printing operations, the notch 211 remains thus disengaged from the stud 212 until near the end of the second cycle of operation; consequently, the selected totalizer wheels remain in engagement with the amount actuators during their return movement counter-clockwise, and, as a result, said totalizer wheels are restored to their original positions. After the totalizer wheels have been returned to their original positions, and near the end of the second cycle of operation, the shaft 204 is returned counter-clockwise to engage the notch 211 with the stud 212, so that return movement forwardly of the slide 194 near the end of the second cycle of operation will impart return movement counter-clockwise to the engaging spider 192 to disengage the wheels of the selected totalizer from the amount actuators 98.

In total-printing or clearing operations, movement of the total control plate from adding position to total or clearing position imparts initial movement clockwise to the shaft 204 exactly as in sub-total printing operations, and, in addition, said total control plate, in cooperation with the stud 205, rocks the yoke 201 and the plate 196 clockwise, which, through the stud 195, rocks the slide 194 counter-clockwise to disengage the notch 211 therein from the stud 212. Near the end of the first cycle of the total-printing operation and after the slide 194 has been shifted rearwardly under the influence of the cam 210, additional clockwise movement of the shaft 204 causes the stud 199, in cooperation with the cam slots 198 and 200, to rock the plate 196 a further distance clockwise to engage a notch 213 in the slide 194 with a stud 214 in the spider 192. Immediately after the notch 213 is engaged with the stud 214, return movement of the lever 206 shifts the slide 194 forwardly to impart clockwise movement to the engaging spider 192 to cause the wheels of the selected totalizer to be engaged with the amount actuators 98 at the end of the first cycle. In the second cycle, the amount actuators turn said wheels to zero in exactly the same manner as in sub-total or reading operations. While the selected totalizer wheels are thus standing at zero and prior to return movement counter-clockwise of the amount actuators 98 (Figs. 4 and 12), initial movement of the cam 210 in the second cycle of operation shifts the slide 194 rearwardly to impart counter-clockwise disengaging movement to the spider 192 to disengage the wheels of the selected totalizer from the amount actuators, thus leaving said wheels in a zeroized condition. After the spider 192 has thus been returned counter-clockwise to normal position and prior to return movement forwardly of the slide 194, the shaft 204 is partially returned counter-clockwise to cause the stud 199 to return the plate 196 a part distance counter-clockwise to disengage the notch 213 from the stud 214. While the slide 194 is thus disengaged from the engaging spider 192, the cam 210 returns said slide forwardly to normal position, after which return movement of the yoke 201 and the plate 196 counter-clockwise engages the notch 211 with the stud 212, as shown in Fig. 12.

A pawl 215 (Fig. 12), which is actuated by a camming slot 216 in the plate 196, engages notches 177 and 178 in the spider 192 in sub-total and total-printing operations to hold said spider against displacement while the slide 194 is disengaged from the studs 212 and 214. The wheels 180 and 181 of the balance totalizer (Fig. 4) are held against displacement when they are in disengaged position by an aliner 236, which is actuated by cams 237 (only one here shown) secured on the shaft 184.

The No. 2 or back totalizer line (Figs. 4 and 17) has two add-subtract totalizers thereon, one for the storing of checks and the other for the storing of deposits, the add-subtract feature being necessary in each case for the check and deposit correction features. The add-subtract totalizer for the storing of checks comprises adding wheels 217 and subtracting wheels 218, which are geared together for reverse movement in exactly the same manner as the No. 1 or balance totalizer wheels, explained above. The deposit totalizer comprises adding wheels 219 and subtracting wheels 220, which are likewise geared together for reverse movement. In addition to the two adding and subtracting totalizers, the No. 2 totalizer line includes a set of adding wheels 221 for the storing of total new balances plus and a set of adding wheels 222 for the storing of total new balances minus.

In new balance operations, if the balance totalizer contains a plus amount, the plus side of said balance totalizer will be reset and the amount thereon will be simultaneously transferred to the wheels 221, and if said balance totalizer contains a negative amount, the minus wheels 181 thereof will be reset and the amount thereon will be simultaneously transferred to the wheels 222 on the No. 2 totalizer line. The No. 2 totalizer line is mounted in a shiftable framework 223 (Figs. 4, 12, and 14) similar in every respect to the framework 183 for the balance totalizer, and this framework includes a shaft 224 similar to the shaft 184 for the balance totalizer. Mounted on each end of the shaft 224 are rollers 225 (only one here shown), which cooperate with guide slots in totalizer engaging cam plates 226 mounted on the inside of the main frames 60, as shown in Fig. 16. Secured on each end of the shaft 224 are engaging cranks 227 (only one here shown), each of which carries a roller 228, which cooperate with camming slots 229 in the plates 226.

Transfer total mechanism

Inasmuch as it is desirable to transfer amounts from the balance totalizer to the two adding totalizers on the No. 2 line in new balance operations, it is necessary to provide means different from the regular totalizer line engaging means to control the engaging and disengaging movement of the No. 2 totalizer line. Such mechanism is illustrated in Figs. 12 to 16 inclusive. In this connection, it is to be observed that Fig. 16 is not a projection of Fig. 14, and vice versa, as Fig. 16 is a view as observed from the rear of the machine and Fig. 14 is a view as observed from the right-hand side of the machine, as also are Figs. 13 and 15.

Referring now to Figs. 12 to 16 inclusive, the crank 227, which is mounted on the left-hand end of the shaft 224, as viewed in Fig. 16, is connected by a hub 230 to an arm 231 having in the lower end thereof a slot 232 (Fig. 14), through which extends a bushing 233 secured on a stud 234 in turn secured in a shifting plate 235 bifurcated to embrace a hub 238 free on the shaft 224 (Fig. 13). The stud 234 extends through the plate 235 and has mounted on the other end thereof a roller 239, which is normally maintained in engagement with a notch in a plate 240 integral with the hub 238 by a spring 1241 tensioned between said plate and a stud in the arm 231. The plate 240 has pivotally connected thereto one end of an engaging link 241 having in the other end a flattened stud 242, which cooperates with a notch in a hook-shaped projection 243 of the engaging spider 192 (Figs. 12 and 13).

The link 241 for the No. 2 totalizer is controlled in exactly the same manner as the link 190 for the No. 1 totalizer in adding and subtracting operations by means of selecting disks in turn controlled by the transaction keys, and in sub-total and total-printing operations by the total control plate 73 to control the engagement of the stud 242 with the notch in the hook 243 of the engaging spider 192. Under normal conditions, the roller 239 remains in engagement with the notch in the plate 240, thus connecting said plate to the arm 231, which in turn is connected with the crank 227 and the shaft 224, and under these conditions the No. 2 totalizer line receives its engaging and disengaging movement under control of the engaging spider 192 in exactly the same manner as described above for the No. 1 totalizer. However, in new balance operations, it is desirable to have the total being cleared from the balance totalizer entered in one of the adding totalizers 221 or 222 (Fig. 17) on the No. 2 totalizer line during this new balance operation, and, to obtain this result, means have been provided for shifting the control of the engaging and disengaging movement of the No. 2 totalizer line from the spider 192 to the cam 210 (Fig. 12), which causes said No. 2 totalizer line to be engaged and disengaged in adding time, which, it will be recalled by referring to space 4 of the chart (Fig. 47), is the timing of said cam 210.

The bushing 233 (Figs. 12 and 16) engages a V-shaped notch 244 in one arm of a yoke 245 free on a stud 246 secured in the right frame 60. Another arm of the yoke 245 has pivotally connected thereto the lower end of a link 247, the upper end of which is pivotally connected to one arm of a bell crank 248 free on a shaft 249 supported by the main frames 60. A spring 250 urges the bell crank counter-clockwise to normally maintain a roller 251, mounted on another arm thereof, in engagement with a camming surface 252 on the periphery of the total control plate 73 (see also Fig. 6).

When the total control plate 73 is in any position except new balance position, the roller 251 is maintained in engagement with a concentric portion of the camming surface 252, as shown in Fig. 12, to maintain the plate 235 in its upward position (Fig. 13), in which position the roller 239 engages the notch in the plate 240, which, as previously explained, is controlled by the engaging spider 192. Moving the total control plate 73 to new balance position causes a node 253 (Figs. 12 and 14) on the camming surface 252, in cooperation with the roller 251, to rock the bell crank 248 and the yoke 245 clockwise. Clockwise movement of the yoke 245 shifts the stud 234 and the plate 235 (Figs. 13 and 14) downwardly to disengage the roller 239 from the notch in the plate 240 and to engage said roller 239 with a U-shaped notch 290 (Figs. 12, 15, and 16) in a half-round block 254 secured to one face of an engaging arm 255 free on the shaft 224.

The arm 255 is connected by a link 256 to a crank 257 free on the rod 102, and said crank 257 has therein a notch which engages a stud 258 in a crank 259 fast to a hub 261 free on a stud 260 in the frame 60. Also fast to the hub 261 is an arm 262 having a slot 263 which engages a stud 264 secured in an extension of the cam lever 206 (Fig. 12), which cam lever, it will be recalled, is rocked clockwise and back to normal position in adding time by the cam 210. When the lever 206 is in home position, as shown in Fig. 12, an extension 265 of the arm 255 is maintained in engagement with the stud 246 to locate the U-shaped notch 290 in alinement with the roller 239.

After the roller 239 has been engaged with the notch 290, by movement of the total control plate 73 to new balance position, rotation of the cam 210 rocks the lever 206 first clockwise, which, through the mechanism shown in Figs. 15 and 16, rocks the arm 255 counter-clockwise, which movement is imparted through the stud 234 to the arm 231, the crank 227, and the shaft 224 to engage the selected set of adding wheels on the No. 2 totalizer line with the amount actuators 98 (Fig. 4) in adding time, while the balance totalizer is being engaged with said actuators in resetting time. After the amount in the balance totalizer has been transferred to the selected set of adding wheels 221 or 222 (Fig. 17), depending upon whether said balance totalizer contains a positive or a negative amount, continued rotation of the cam 210 returns the lever 206 counter-clockwise to impart disengaging movement to the No. 2 totalizer line.

Inasmuch as the main shaft 70 (Fig. 12) and the cam 210 receive two revolutions in new balance operations, it is obvious that the No. 2 totalizer line will receive engaging and disengaging movement during each revolution of said cam 210. However, this does not in any way interfere with the proper operation of the machine, as it will be recalled that the main actuators 98 remain in zero position during the first rotation of said main shaft 70 and cam 210.

When the total control plate 73 moves from new balance position to any of its other positions under the influence of the total control keys, the node 253 on the camming surface 252 of said plate moves away from the roller 251, permitting the spring 250 to return the bell crank 248 and the yoke 245 (Figs. 12 and 14) counter-clockwise to shift the plate 235 and the stud 234 upwardly to disengage the roller 239 from the notch 290 and to reengage said roller with the notch in the periphery of the plate 240. When counter-clockwise movement is imparted to the plate 235 (Figs. 13 and 14), by either the plate 240 or the arm 255 (Fig. 15), said stud 234 and the bushing 233 ride out of the V-shaped notch 244 in the arm of the yoke 245. The spring 1241 prevents the plate 235 and the stud 234 from shifting out of position when said stud is disengaged from the notch 244 in the yoke 245 and retains the roller 239 in engagement with the notch in the plate 240. When the roller 239 is in engagement with the U-shaped notch 290 in the arm 255, an arcuate surface 266 on the plate 240 prevents said roller from shifting out of engagement with said notch 290 when the bushing 233 moves out of engagement with the V-shaped notch 244 in the yoke 245. A stud 267 (Figs. 12 and 13) in the arm 231, in cooperation with a shoulder on the plate 240, assists said plate in imparting engaging movement to the shaft 224 and the No. 2 totalizer framework, and likewise assists in locating the parts associated with said plate 240 in home or normal position, as here shown.

The lateral shifting of the No. 1 or balance totalizer to select the plus or the minus side thereof for engagement with the amount actuators is controlled by a shifting cam 268, shown in diagrammatic form in Fig. 17, and the lateral shifting of the No. 2 totalizer line to select the plus or the minus side of the two add-subtract totalizers thereon and the two adding totalizers thereon is controlled by a shifting cam 269, also shown diagrammatically in Fig. 17. The two shifting cams 268 and 269 are secured in fixed relationship to each other, and the positioning of these two shifting cams is controlled by the transaction keys 79 to 84 inclusive (Fig. 1).

*Transaction keys and differential mechanism associated therewith*

The manner in which the cams 268 and 269 are positioned by the differential mechanism of the transaction keys is fully disclosed in the Shipley and Goldberg patents referred to hereinbefore. Therefore, it is believed that a brief description of this mechanism in connection with Fig. 5 will be sufficient for the purpose of this specification.

Figure 5:
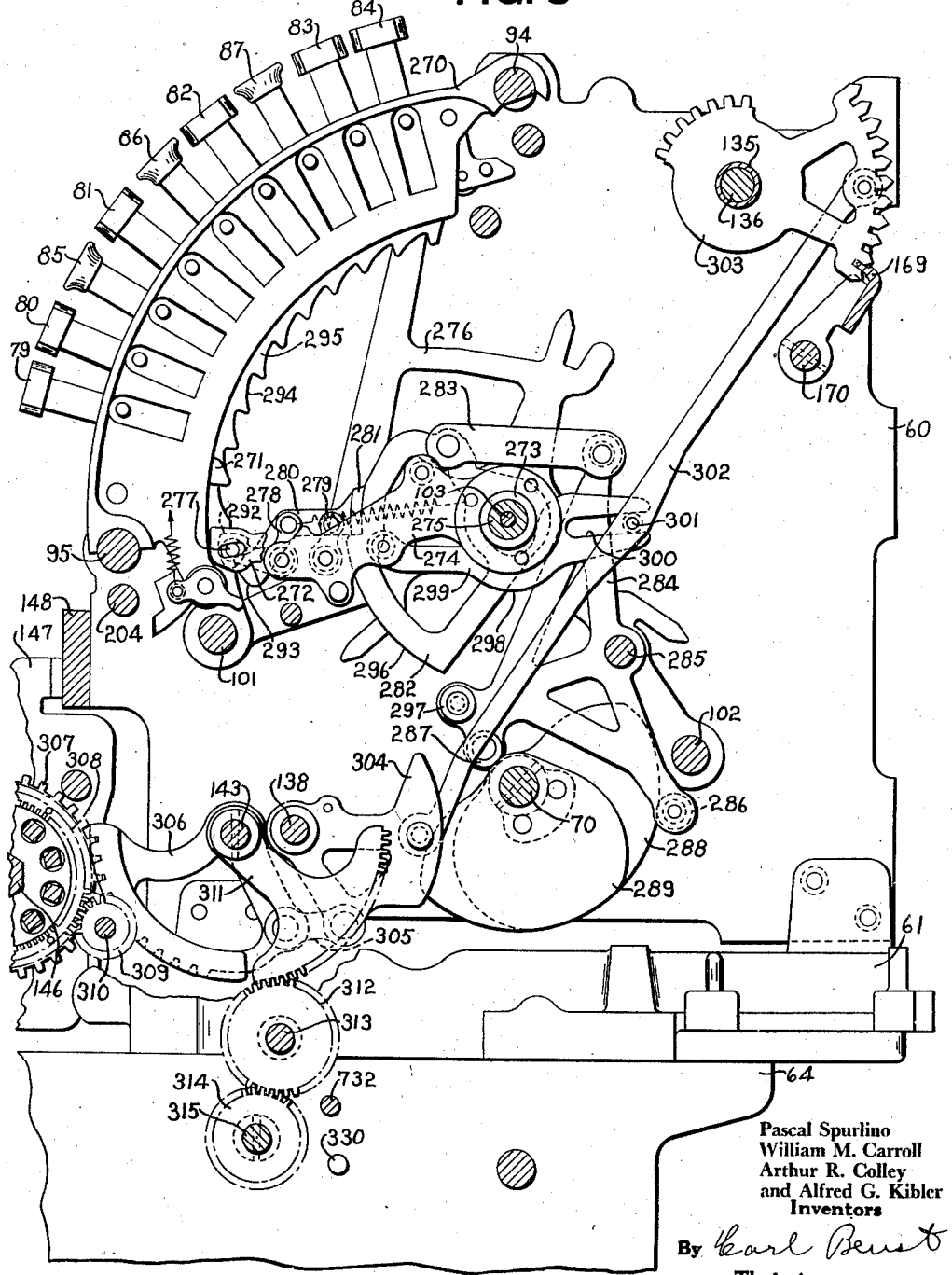
Fig. 5 is a sectional view taken to the right of the transaction bank, showing the mechanism associated therewith.

All of the transaction keys, with the exception of the Overdraft key 86 (Fig. 1) and the Release Lock Proof key 87, control the positioning of the transaction differential mechanism shown in Fig. 5. However, only the Deposit key 81, the Deposit Correction key 80, the Check key 82, and the Check Correction key 83 are effective in check-posting operations to select their corresponding sides of the two add-subtract totalizers on the No. 2 totalizer line. As previously explained, the two adding totalizers on the No. 2 totalizer line for storing the total new balances plus and minus are not engaged with the amount actuators in check-posting operations, but are only engaged therewith in new balance operations to store the amount of the new balance. The transaction differential mechanism controlled by the transaction keys, in addition to selecting the totalizers on the No. 2 line corresponding to said keys and the proper side of the balance totalizer for engagement with the amount actuators, also controls the positioning of type wheels for recording characters representative of the type of operation being performed adjacent the amount recorded.

Depression of any one of the transaction keys, with the exception of the keys 86 and 87 (Fig. 5), rocks a zero stop pawl 271 out of the path of the forward end of a spider 272, rotatably supported on a hub 273 on a transaction differential arm 274, said hub 273 in turn being rotatably supported by a stud 275 extending between two identical support plates 276 (only one here shown), mounted on the rods 101 and 102.

The spider 272 has in the forward end thereof a slot, through which extends a stud 277 in a latch-operating arm 278 pivotally mounted on the differential arm 274, and which, in cooperation with a companion arm 279 also pivoted on the arm 274, supports a transaction differential latch 280 for shifting movement. The latch 280 has a foot-shaped extension 281, normally maintained in engagement with a shoulder on a transaction differential operating segment 282 free on the stud 275 by a spring. The segment 282 is connected by a link 283 to a cam lever 284 free on a stud 285 supported by the plate 276. The lever 284 carries rollers 286 and 287, which cooperate respectively with the peripheries of companion plate cams 288 and 289 secured on the main shaft 70.

Depression of any one of the transaction keys, with the exception of the keys 86 and 87, moves the lower end of said key into the path of a rounded extension 292 of the latch arm 278 at the same time the zero stop pawl 271 is moved out of the path of the spider 272. Operation of the machine causes the cams 288 and 289 to rock the lever 284 and the differential operating segment 282 first in a clockwise direction, according to the time given in space 2, Fig. 47. The shoulder on the segment 282, in cooperation with the extension 281, carries the latch 280 clockwise in unison therewith until the rounded surfaces 292 engages the stem of the depressed key to rock the arm 278 counter-clockwise to disengage said extension 281 from the shoulder of the segment 282 and to engage a rounded extension 293 on the forward end of said latch 280 with a corresponding notch 294 in an alining plate 295 supported by the rod 101 and the plates 276. This positions the differential arm 274 in proportion to the depressed transaction key. Continued clockwise movement of the segment 282 causes an arcuate surface 296 thereon, in cooperation with the sole of the foot-shaped extension 281, to lock latch 280 in set position.

When the lever 284 (Fig. 5) nears the terminus of its initial movement clockwise, a roller 297 carried thereby engages a rounded surface 298 on a differential beam 299 pivotally mounted on the arm 274 and forces an arcuate surface on the upper edge of said beam into contact with an undercut portion of the hub 273 to position said beam in proportion to the depressed transaction key. The beam 299 is bifurcated to embrace a stud 301 in a link 302, the upper end of which is pivotally connected to a segment 303 secured to one of the tubes 135 on the shaft 136 and the lower end of said link is pivotally connected to a segment 304 free on the shaft 138 and connected by a link 305 to a gear sector 306 secured on the shaft 143. The gear sector 306 meshes with the external teeth of an external internal gear 307 rotatably mounted on a disk in turn supported by the shaft 146, and said gear 307 has secured thereto a ring gear 308, which meshes with a pinion 309 secured on a shaft 310 journaled in the brackets 147. Other pinions 309 (Fig. 6), secured on the shaft 310, drive other internal-external gears similar to the gear 307, which position transaction type wheels located in the different columnar positions of the record material, so that a character indicative of the transaction being performed will be recorded on said record material. Also secured on the shaft 143 (Fig. 5) is a gear sector 311, which meshes with gear 312 free on a stud 313 secured in the base plate 61. The gear 312 meshes with a gear 314 secured on a shaft 315 journaled in the printer framework, said shaft 315 in turn positioning selecting disks which control the operation of the printing hammers and the movement of the combined statement and ledger slip table. The selecting disk mechanism will be described more fully later herein in connection with the table-positioning mechanism.

The tube 135 (Fig. 5), which is driven by the gear segment 303, is connected to another segment (not shown), which in turn is connected by a link to the totalizer line-positioning cams 268 and 269 (Fig. 17) to cause said cams to be positioned in relation to the depressed transaction key.

The numbers from 0 to 9 inclusive, opposite the horizontal lines in the diagrammatic views of the totalizer selecting cams 268 and 269 (Figs. 1 and 17), correspond to the various transaction keys and the positions of the transaction differential. For example, the zero position corresponds to the automatic position indicated at zero, and this position is automatically selected when the balance totalizer contains a negative amount and the Overdraft key 86 is used in conjunction with the New Balance key 74 to clear the balance totalizer, to record the negative new balance, and to simultaneously transfer said negative new balance to the total new balance minus totalizer 222 (TNB—). In a like manner, the ninth position of the cams 268 and 269 is an automatic position, which is selected when the balance totalizer contains a positive amount and the New Balance key 74 is used alone to clear this positive amount out of said balance totalizer and to simultaneously transfer said amount to the total new balance plus totalizer 221 (TNB+) (Fig. 17) on the No. 2 totalizer line. The Overdraft Pick-Up key 79 likewise selects the first position of the cams 268 and 269, but, inasmuch as this key does not cause the No. 2 totalizer line to receive engaging and disengaging movement, the total new balance minus wheels 222 are not engaged with the amount actuators. The same thing applies to the Balance Pick-Up key 84, which likewise selects the ninth position of said cams 268 and 269, but, inasmuch as the Balance Pick-Up key does not cause the No. 2 totalizer line to receive engaging and disengaging movement, the total new balance plus wheels are not engaged with the amount actuators when this key is used.

In other words, it is necessary to depress the New Balance key to select either of the total new balance totalizers for engaging and disengaging movement with the actuators, and when the New Balance key 74 is depressed alone, this selects the total new balance plus wheels 221, and when said New Balance key is used in conjunction with the Overdraft key 86, when the balance totalizer contains an ovedraft, this causes the total new balance minus wheels 222 to be automatically selected for engaging and disengaging movement with the amount actuators.

In other words, when the total new balance plus totalizer is selected by depression of the New Balance key 74, this automatically positions the engaging cams 268 and 269 to ninth position, which position selects the plus side of the No. 1 or balance totalizer for clearing operation and at the same time selects the total new balance plus totalizer 221 for adding operation to transfer the plus total from said balance totalizer thereto. Likewise, when the total new balance minus totalizer is selected by depression of the New Balance key 74 and the Overdraft key 86, this positions the engaging cams 268 and 269 at zero to select the minus side of the balance totalizer for a clearing operation and to simultaneously select the total new balance minus totalizer 222 for addition to transfer the minus total from the balance totalizer thereto.

The Deposit key 81 (Figs. 1 and 17) corresponds to the fourth position of the engaging cams 268 and 269, and, when this key is depressed, it causes the engaging cam 269 to be positioned to select the plus side of the No. 3 or deposit totalizer (+3D) on the No. 2 totalizer line. Likewise, this positions the cam 268 to select the plus side of the No. 1 or balance totalizer to add the amount of the deposit therein.

When the Deposit Correction key 80 (Fig. 1) is used to correct an error in a deposit, the transaction differential positions the cams 268 and 269 in their second position, which causes said cam 269 to select the minus wheels on the No. 3 deposit totalizer (—3D) for engagement with the actuators and causes the energizing cam 268 to simultaneously select the minus wheels of the balance totalizer, so that the amount of the deposit correction will be subtracted in both totalizers.

When the Check key 82 (Figs. 1 and 17) is used in check-posting operations, the depression of this key causes the cams 268 and 269 to be positioned in sixth position, which causes said cam 269 to select the plus wheels of the No. 2 check totalizer (—2C) on the No. 2 line for the accumulation of the total amounts of checks and simultaneously causes the engaging cam 268 to select the minus side of the balance totalizer, so that the amount of the check item will be subtracted therefrom.

When it is desired to make a correction in a check entry, the Check Correction key 83 (Fig. 1) is used, and this causes the cams 268 and 269 to be located in eighth position (Fig. 17), which causes said cam 269 to select the plus side 217 of the No. 2 check totalizer (+2C) and causes the cam 268 to select the plus side of the balance totalizer, so that the amount of the check correction, which is a credit, will be added in both the No. 2 check totalizer and the balance totalizer.

While the Space Ledger key 85 (Fig. 1) causes the transaction differential mechanism and the cams 268 and 269 to be moved to their third position, this position, it will be noted by referring to Fig. 17, is a blank position, as far as the cams 268 and 269 are concerned. However, this movement of the transaction differential is used in this case to control the spacing of the statement slip table, as will be more fully explained later herein. As previously explained, the Overdraft key 86 and the Release Lock Proof key 87 are short keys and do not position the transaction differential, neither do these keys release the zero stop pawl for the transaction differential; consequently said differential remains in zero position when said keys are depressed.

Total control plate mechanism

By referring to Figs. 1 and 6, it will be recalled that the total control plate 73 is normally located in adding position, which is the proper position for adding and subtracting operations, and in such operations the transaction keys control selecting disks to select the various totalizers on the No. 1 and No. 2 totalizer lines for engagement with the amount actuators. However, in sub-total and total-printing operations, it is necessary to use the total keys 74 to 78 in order to select the various totalizer lines for engaging and disengaging movement. The use of the New Balance key 74 has been fully explained in connection with the transaction keys immediately above.

The Sub-Total New Balance key 75 (Figs. 1 and 6) positions the total control plate 73 to cause the balance totalizer to be read or sub-totalized. The Sub-Total Transaction key 76 is a non-operating key and is used in conjunction with the Check key 82 and the Deposit key 81 to select the No. 2—C and the No. 3—D add-subtract totalizers on the No. 2 totalizer line for reading or sub-total operations, and said key 76 is likewise used in conjunction with the Balance Pick-Up key 84 and the Overdraft Pick-Up key 79 for selecting the total new balance plus and the total new balance minus totalizers on the No. 2 totalizer line for reading operations.

The Clear Transaction key 77 is also a non-operating key and is used in conjunction with the Check key 82 and the Deposit key 81 for clearing the No. 2—C and the No. 3—D add-subtract totalizers, and is also used in conjunction with the Balance Pick-Up key 84 and the Overdraft Pick-Up key 79 for clearing the total new balance plus and total new balance minus totalizers on the No. 2 totalizer line. The Clear Old Balance Net Key 78 is an operating key and is used to clear the No. 1 or balance totalizer at the end of a series of balance forward operations and functions in this respect exactly like the New Balance key 74, except that said key 78 does not cause the selection of the total new balance plus or total new balance minus totalizers for transfer of total operations, as does the New Balance key 74.

It will be recalled that the Balance Forward key 88 (Fig. 1) is not an operating key and has nothing to do with the positioning of the total control plate 73 (Fig. 6), but is used in conjunction with the Balance Pick-Up key 84 and the Overdraft Pick-Up key 79 to cause the amount of the old balance to be printed in the "Balance Forward" column of the statement sheet.

It will be recalled that the manner in which the New Balance key 74 functions to cause either the total new balance plus totalizer 221 (TNB+) or the total new balance minus totalizer 222 (TNB—) to be engaged with the amount actuators in adding time during new balance operations was explained earlier herein in connection with the mechanism of Figs. 12 to 17 inclusive.

In addition to selecting the various totalizers for adding, reading, and resetting operations, positioning of the total control plate 73, under the influence of the total keys 74 to 78 inclusive, by means of the mechanism shown in Fig. 6, causes total type wheels to be positioned in proportion thereto to record identifying characters opposite the various sub-totals and totals.

The total control plate 73 (Fig. 6) is connected by a link 316 to a bell crank 317 secured on the shaft 138, and said bell crank 317 is in turn connected by a link 318 to a gear sector 319 free on the shaft 143. The gear sector 319 meshes with an internal-external gear 320 rotatably supported by a disk on the shaft 146 in exactly the same manner as the gear 144 for the amount bank shown in Fig. 4. The gear 320 has integral therewith a ring gear 321, the teeth of which mesh with a pinion 322 secured on a shaft 323 journaled in the brackets 147. The external teeth of the gear 320 mesh with and drive a total type wheel 324 free on the shaft 154, and the shaft 323, in cooperation with pinions similar to the pinion 322 and gears similar to the gears 321 and 320, simultaneously positions other total wheels in proportion to the position of the total control plate 73 to cause identifying characters to be printed in the various columns of the statement sheet.

Secured on the shaft 138 (Fig. 6) is a gear sector 325, which meshes with a gear 326 free on the stud 313, said gear 326 in turn meshing with a gear 327 free on the shaft 315. The gear 327 has secured thereto a companion gear 328, which meshes with a gear 329 secured on a shaft 330 (Fig. 4) journaled in the printer framework. The mechanism just described transmits the positioning of the total control plate 73 to the shaft 330 and positions selecting disks free on the shaft 315 in proportion to the position of said total control plate for controlling the printing mechanism and the statement sheet feeding mechanism in a manner to be more fully described later herein.

The external-internal ring gears mounted on the shaft 146 (Figs. 4, 5, and 6) and the type wheels positioned thereby are retained against displacement by an aliner 331 mounted on a shaft 332 journaled in the brackets 147, and the usual means is provided for disengaging said aliner 331 while said external-internal gears are being positioned.

Statement sheet table mechanism

A shiftable table 335 (Figs. 19 and 48), located at the front of the machine, is provided for presenting the combined statement and ledger sheets 343 and 344 (Figs. 2 and 3) to the printing mechanism. The statement sheet table is positionable to 39 lines, which is the number of lines provided on the combined statement and ledger sheets 343 and 344. The proper line for printing the first item in a posting operation is always selected by depression of the proper line-finding key or keys, after which the positioning of the table is entirely automatic and requires no further consideration from the operator. The final operation in a posting operation is always a new balance operation, and in this operation the table is automatically released and returned to starting position, so that the sheet may be removed.

When the first entry is made on the 39th or last line of the statement sheet, the table is automatically released and returned to starting position. However, if it is desirable to make further entries on this line, it is necessary to press the "39" line-finding keys to select said line for each item so entered, as the table will be returned to home position after each such item is entered.

When reference is made herein to a "posting operation," it is to be understood that such operation includes several machine or item-entering operations, in which the previous balance is picked up, debit items subtracted therefrom, credit items added thereto, and a clearing operation performed to secure a new balance.

The statement sheet table and associated mechanism will now be described in detail.

The table 335 is located conveniently at the front of the machine (Figs. 19, 20, and 48), and said table has rails 336 and 337 formed on opposite edges thereof, which rails, in cooperation with upper rollers 338 and lower rollers 339 mounted on the printer frames 62 and 63, support the table 335 for lateral shifting movement. Opposite edges of the rails 336 and 337 fit snugly between the frames 62 and 63 to prevent excessive side motion of said table 335. The table 335 has three clearance openings 340, 341, and 342 (Figs. 19 and 22) therein, so that the said printing hammers, during their impression movement, may carry the statement sheet and the inking ribbon into contact with the type wheels to record the various items thereon.

*Statement sheet locating and holding means*

The statement sheets 343 and 344, shown respectively in Figs. 2 and 3, are placed upon the table 335 between side guide members 345 and 346 (Figs. 19 and 48), and are pushed rearwardly or upwardly, as viewed in Fig. 19, into engagement with a plurality of stop blocks 347 secured to said table 335.

As the upper edge of the statement sheet is moved into engagement with the stop blocks 347 (Figs. 19, 20, and 31), said upper edge passes beneath two pressure blocks 348 and 349 mounted in pressure arms 350 and 351, each of which has two bent-over arms which fit loosely on a shaft 352 rotatably supported by two brackets 353 and 354 secured to the top of the statement sheet table 335. Secured on opposite ends of the shaft 352 are pressure block operating arms 357 and 358, which are yieldingly connected to their respective pressure arms 350 and 351 by torsion springs 359 and 360 tensioned between studs in the arms 357 and 358 and the arms 350 and 351. By referring to Figs. 20 and 21, the former being a side elevation as observed from the left of the machine and the latter a side elevation as observed from the right of the machine, it will be seen that the springs 359 and 360 urge their respective arms 350 and 351 into engagement with a top surface on the operating arms 357 and 358. Clearance openings are provided in the table 335 for the arms 350, 351, 357, and 358.

Also secured on the shaft 352 (Figs. 19 and 21) is an arm 361, which extends through an opening 362 in the table 335 and is urged clockwise by a torsion spring 363 tensioned between said arm and said table to normally maintain a roller 364 carried thereby in engagement with one end of a lever 365. The lever 365 is fulcrumed on a stud 366 in a plate 367, which forms a portion of the printer framework, and said lever is urged counter-clockwise by a spring 368 to normally maintain a roller 369 carried thereby in engagement with the periphery of a plate cam 370 secured on a shaft 371 journaled in the printer framework. The shaft 371 is driven one clockwise revolution each machine operation in a manner later to be described. It will be noted that, when the table 335 is in home position as shown in Fig. 21, the roller 364 is in contact with a shoulder formed on the plate 367 to lock the table in home position. Initial movement of the cam 370 rocks the lever 365 clockwise, which in turn rocks the arm 361 and the shaft 352 counter-clockwise against the action of the spring 363, which movement is imparted by the arms 357 and 358 and the springs 359 and 360 to the pressure arms 350 and 351 to cause the pressure blocks 348 and 349 to resiliently press the statement sheet 343 into contact with the top surface of the table 335 to hold said statement sheet against displacement.

As previously explained, the home position of the table 335 is the proper position for printing the Balance Forward item (Figures 2 and 3) in the space provided therefor just above the first line of said statement sheet. Therefore, the pressure blocks 348 and 349, under the influence of the cam 370 and the lever 365, retain said statement sheet against displacement while the balance forward is being recorded. Counter-clockwise movement of the arm 361 (Figure 21), under the influence of the cam lever 365, moves the roller 364 from contact with the shoulder on the plate 367 and into alinement with a horizontal surface 372 on the top edge of said plate 367. When the table 335 is moved rearwardly from home or Balance Forward position under the influence of the table-positioning mechanism to be described later, the roller 364 moves onto the horizontal surface 372 to retain the pressure blocks 348 and 349 in engagement with the statement sheet when said table 335 is moved to any of its different 39 line positions. When the table 335 is returned forwardly to home position at the end of new balance and certain other operations, the spring 363 (Figs. 19 and 21) urges the arm 361 and the shaft 352 clockwise to cause the roller 364 to drop back into contact with the shoulder adjacent the surface 372 to disengage the pressure blocks 348 and 349 and to lock the table 335 in home position.

*Table drive mechanism*

Referring now to Figs. 19 and 20, near each edge of the table 335 is a series of rectangular openings 373 and 374, said openings being of uniform size and equally spaced so that the webs therebetween form, in effect, rack teeth which are engaged respectively by similar gears 375 and 376 secured on a shaft 377 journaled in the printer framework. Likewise, the rack teeth formed by the perforations 373 and 374 are engaged respectively by similar gears 378 and 379 secured respectively on one end of sleeves 380 and 382 rotatably supported by studs 383 and 384 secured respectively in the frames 62 and 63. The gear 378 (Fig. 19) carries a stud 385, which is engaged by one end of a helical coil spring 386, which is coiled loosely around the circumference of the sleeve 380, the other end of said spring being arranged to engage a stud in a plate 388 free on the sleeve 380. The plate 388 has pivotally mounted thereon a ratchet pawl 389 urged counter-clockwise, as viewed in Fig. 20, into engagement with the teeth of a ratchet 391 secured on the stud 383. Similar parts, including a spring 392, a plate 393, a pawl 394, and a ratchet 395, are provided for the gear 379 (Figs. 19 and 46).

The mechanisms just described form a spring-actuated device for constantly urging the table 335 in a forward direction and are utilized to restore the table from any of its different line positions to home or normal position. The stationary ratchets 391 and 395, in cooperation with their respective pawls and plates 388 and 393, form a means for winding or tensioning the springs 386 and 392 to insure that the table 335, when released from any line position, is properly restored to normal or home position. Obviously the springs 386 and 392 also assist in maintaining the table in home position.

Table indicator

An indicator is provided for visually indicating the number of the line to which the table 335 is positioned. This mechanism includes a gear 396 (Figs. 20 and 46), which meshes with and is driven by the gear 379, said gear 396 being secured on one end of a short shaft 397 journaled in a bushing 398 secured in the frame 63. Secured on the other end of the shaft 397 is a disk 399, which is in turn secured to the face of a flanged roller type indicator 400. The flanged portion of the indicator 400 has engraved on the circumference thereof the letters "BF" and numerals from "1" to "39," which correspond to the different line positions of the table 335 and the ledger sheet. The letters BF and the numerals are visible through an aperture in a cover plate (Fig. 48) secured to the printer framework. When the table 335 is in home position, as shown in Fig. 46, the letters BF, which indicate "Balance Forward," are visible through the aperture in the cover plate.

The shaft 377 (Figs. 19 and 46), which hereinafter will be termed the main drive shaft for the table 335, has in axial alinement therewith an auxiliary table drive shaft 402 journaled in the frames 63 and 64, the positioning of the said auxiliary shaft being controlled by the line-finding keys, as will be explained later. Fast to the gear 376, which, as previously explained, is secured to the shaft 377, is a gear 403 and a bevel gear 404, which is connected by two pinions 405 to a companion bevel gear 406 in turn secured to a locating disk 407, which, together with the gear 406, is rotatably supported by the shaft 402. The pinions 405 are rotatably mounted on a stud 408 secured in the auxiliary drive shaft 402. The identical gears 404 and 406 and their connecting pinions 405 form a planetary or differential gearing for connecting the auxiliary shaft 402 to the main shaft 377.

Free on the shaft 402 (Figs. 25, 26, 27A, 27B, and 46) is a gear integral with a beveled gear 410, which is connected by a bevel pinion 411 free on a stud 412 secured in the shaft 402 to an identical bevel gear 413 in turn secured to a gear 414 free on the shaft 402. The differential gearing comprising the identical bevel gears 410 and 413 and their connecting pinion 411 form a means for transmitting the value of the depressed line-finding keys to the auxiliary shaft 402, and the positioning of said auxiliary shaft is in turn transmitted by the differential gearing, including the gears 404, 405, and 406, to the main shaft 377, to in turn position the table 335 in proportion to the value of the depressed line-finding keys.

Complementary slide for line-finding keys

The gear 414 (Figs. 25A, 25B, 27A, and 27B) meshes with rack teeth in the top edge of a main slide 417 mounted for horizontal shifting movement by means of a flat surface 418 on the bottom thereof, in cooperation with a rod 419 supported by the frames 63 and 64 and by means of a horizontal slot 420 in the forward end thereof, in cooperation with a rod 421 likewise supported by the frames 63 and 64. The slide 417 has secured thereto a plate 422 with rack teeth therein, which are engaged by a pinion 423, which also meshes with the teeth in a similar plate 424 secured to an auxiliary slide 425 supported for horizontal shifting movement adjacent the main slide 417 by means of a flat surface on the bottom thereof in cooperation with the rod 419 and by means of a slot similar to the slot 420, in cooperation with the rod 421. The pinion 423 is mounted on a stud 426, which extends through parallel slots 427 in the slides 417 and 425, and opposite ends of said stud 426 engage like slots in similar arms 428 and 429, which straddle the slides 417 and 425, said arms being secured together by a hub 430 free on a rod 431 supported by the frames 63 and 64.

Secured to the hub 430 (Figs. 25A, 25B, 27A, and 27B) and in fixed relationship to the arms 428 and 429 is a crank 432, which, in cooperation with said arm 429, supports a stud 433 free on a block or slide 434 slidably supported in a slot 435 in a pitman 436 pivotally connected to a cam lever 437 free on a rod 438 supported by the printer framework. The cam lever 437 has mounted thereon rollers 439 and 440, which cooperate respectively with the peripheries of companion plate cams 441 and 442 secured on the printer cam shaft 371. Compressible springs 443 and 444 between the blocks 434 and the ends of the slot 435 form a cushioned or shock-absorbing connection between the stud 433 and the pitman 436. The slides 417 and 425, respectively, have adjustably mounted thereon plates 445 and 446 with graduated steps 447 and 448, which cooperate with the lower ends of the stems of nine units line-finding keys 449 (Figs. 25A, 25B, 28, 29 and 30) mounted in a framework 450 supported by rods 451 and 479 supported by the printer framework.

When one of the units line-finding keys 449 is depressed, clockwise rotation of the shaft 371 and the cams 441 and 442 during machine operation causes the lever 437 to shift the pitman 436, the crank 432, and the arms 428 and 429 forwardly or clockwise according to the time given in space 12 of the chart (Fig. 47). The coupling pinion 423 for the slides 417 and 425 moves forwardly in unison with the arms 428 and 429, carrying therewith said slides 417 and 425 until the steps 447 or 448, corresponding to the depressed units key 449, contact the end of the stem of the depressed key. The other slide moves independently of the slide which has already been positioned until both slides are positioned in proportion to the depressed line-finding key. This movement of the slides 417 and 425, under the influence of the arms 428 and 429 and the pinion 423, constitute what is known as "complementary slide action."

The complementary movement of two members coupled in this manner is old in the art and is fully explained in the United States Patent No. 1,202,800 issued to Thomas Carroll on October 31, 1916. This patent explains that, while the combined movement of the two coupled members is the same, the movement of one of said members may vary in relation to the movement of the other member, and this variation in movement is utilized to transmit the values of the depressed line-finding keys to the table 335.

Movement of the slide 417 by means of the rack teeth thereon, in cooperation with the gear 414 (Figs. 25A, 25B, and 46), through the differential mechanism comprising the bevel gears 410 and 413 and their connecting pinion 411, and in cooperation with the complementary slides for the tens line-finding keys, positions the shaft 402 in proportion to the depressed line-finding keys.

In order properly to explain the functioning of the complementary slides to position the table 335 in proportion to the depressed line-finding keys, it is necessary to describe the complementary slide mechanism for the tens keys, which is shown best in Figs. 26A, 26B, 27A, and 27B.

The mechanism for the tens line-finding keys comprises a main slide 452 and an auxiliary slide 453 mounted for horizontal shifting movement in exactly the same manner as slides 417 and 425 for the units line-finding keys, by means of flat surfaces on the bottoms of said slides 452 and 453 in cooperation with the rod 419 and by means of horizontal slots 454 in the forward ends of said slides, in cooperation with the rod 421. The slides 452 and 453, respectively, have secured thereto plates 455 and 456, having opposed rack teeth, which are engaged by a pinion 457, which forms a coupling medium for said slides 452 and 453. The pinion 457 is mounted on a stud 458, which extends through slots 459 in the slides 452 and 453, and said stud likewise extends through similar slots in arms 460 and 461 connected by a hub 462 free on the rod 431. Secured to the hub 462 in fixed relation to the arms 460 and 461 is a crank 463, which, in cooperation with the arm 461, supports a stud 464, which loosely engages a block 465 free in a slot in the forward end of a pitman 467, the rearward end of which pitman is pivotally connected to a cam lever 468 free on the rod 438. The cam lever 468 carries rollers 469 and 470, which cooperate, respectively, with the peripheries of plate cams 471 and 472 secured on the printer cam shaft 371.

Compressible springs 4721 and 4731, compressed between the block 465 and the ends of the slot 466, form a cushion or shockproof connection between said block and the pitman 467. The slides 452 and 453 (Figs. 26A and 26B) have adjustably mounted thereon plates 473 and 474 having, respectively, graduated steps 475 and 476, which cooperate with the lower ends of the stems of three tens line-finding keys 477 mounted in a framework 478 supported by the rods 451 and 479.

Depression of the tens line-finding key 477 moves the lower end of the stem thereof into the path of the corresponding steps 475 and 476 on the slides 452 and 453. Rotation of the shaft 371 and the cams 472 during machine operation rocks the cam lever 468 counter-clockwise to shift the pitman 467, the crank 463, the arms 461 and 460, and the pinion 457 forwardly. Forward movement of the pinion 457 carries the slides 452 and 453 in unison therewith exactly in the same manner as explained for the units slides 417 and 425 until the steps on said slides contact the depressed key to position said slides in proportion thereto.

The differential positioning of the main slide 452, under the influence of the tens line-finding keys 477, is transmitted by the rack teeth on the top edge thereof to the gear 409 (Figs. 26A, 26B, and 46) and through the auxiliary drive shaft 402 to position said shaft in proportion to the depressed tens line-finding key 477. After printing has been effected, and near the end of machine operation, the units slides 417 and 425 and the tens slides 452 and 453 are returned to zero position, in which position said slides are shown in Figs. 25A, 25B, 26A, and 26B.

When no units line-finding key 449 (Figs. 25A and 25B) is depressed, a zero stop pawl 481 free on the rod 421, in cooperation with a stud 482 in the main slide 417, retains said slide in zero position. Consequently, operation of the pitman 436 imparts full movement to the auxiliary slide 425 while the main slide 417 remains stationary, and, as a result, no movement is imparted to the gear 414 and the shaft 402. When no tens line-finding key 477 (Figs. 26A and 26B) is depressed, a zero stop pawl 483 for these keys, in cooperation with a stud 484 in the main slide 452, retains said slide in zero position, and, as a result, forward movement of the pitman 467 during machine operation imparts full movement to the auxiliary slide 453, and, as the main slide 452 remains stationary, no movement is imparted to the gear 409 and the auxiliary table drive shaft 402. Depression of any one of the units keys 449 rocks the zero stop pawl 481 out of engagement with the stud 482, and depression of any one of the three tens keys 477 rocks the zero stop pawl 483 out of engagement with the stud 484, as will be explained fully presently.

Assuming, as an example, that one of the units line-finding keys 449 has been depressed and that no tens keys 477 have been depressed, in which case the main slide 452 and the gear 409 for said tens keys remain stationary, movement of the units slide 417 into contact with the lower end of the stem of the depressed units key will move the gear 414 in unison therewith, causing the bevel gear 413 (Fig. 46) to drive the connecting pinion 411, and, as the bevel gear 410 is held stationary, the pinion 411 will climb around said bevel gear to drive the stud 412 and the shaft 402 clockwise, as viewed in Figs. 25A, 25B, 26A, and 26B, in proportion to the value of the depressed units key 449. If a tens line-finding key 477 is depressed and no units line-finding key 449, the gear 414 is retained stationary, and in this case the tens slide 452 and the gear 409 drive the auxiliary shaft 402 clockwise in proportion to the value of the depressed tens key. When a units line-finding key 449 and a tens key 477 are depressed in one operation—for example, the 5 units key 449 and the 20 key 477—to position the table 335 to line 25, the combined movements of the main slides 417 and 452 are transmitted through the gears 414 and 409 (see also Fig. 46) and the differential gearing comprising the bevel gears 410 and 413, the pinion 411, and the stud 412 to the shaft 402 to drive said shaft in a clockwise direction in proportion to the value of the depressed units and tens keys.

The differential positioning of the auxiliary shaft 402, under the influence of the line-finding keys, is transmitted to the main shaft 377 through the differential gearing (Fig. 46) comprising beveled gears 404 and 406 and the pinions 405, and, in order to transmit this movement to said shaft, it is necessary to lock the disk 407 and the bevel gear 406 (Figs. 39 and 46) against movement in a manner to be explained presently, so that said bevel gear will act as a driving medium for the pinions 405, which are rotated about the axis of the shaft 402 by the stud 408, which, it will be recalled, is secured in said shaft 402. Retaining the bevel gear 406 stationary at this time permits the movement of the auxiliary shaft 402 to be transmitted by the pinions 405 to the bevel gear 404, the gears 403 and 376, and the main table drive shaft 377, to drive said shaft counter-clockwise, as viewed in Fig. 20, and clockwise, as viewed in Figs. 25A, 25B, 26A, and 26B, in proportion to the value of the depressed line-finding keys 449 and 477. Counter-clockwise movement of the shaft 377 (Fig. 20) and the gears 376 and 375 moves the table 335 rearwardly to the line position corresponding to the depressed line-finding keys, so that the amount set up on the amount keys will be recorded on the desired line of the statement sheet.

Table retaining ratchet

A ratchet device connected to the main shaft 377 retains the table in the position to which it has been moved under the influence of the line-finding keys, and, as previously explained, after the desired line of the statement sheet has been selected by the use of said line-finding key, the movement of said table then becomes automatic during the remainder of the posting operation, as will be explained later.

Referring now to Figs. 43, 45, and 46, the gear 403 meshes with a gear 485 secured on one end of a shaft 486 journaled in the frames 63 and 64. Also secured on said shaft 486 is a gear 487, which meshes with a gear 488, which is assembled in an integral unit with a table-retaining ratchet 489, a table feed ratchet 490, and table anti-overdrive ratchets 491 and 492, all of which are secured to a hub 493 free on the shaft 402. A retaining pawl 494 (Figs. 38, 43, and 46) free on the shaft 486 is urged clockwise by a spring 495 into engagement with the retaining ratchet 489.

When the main drive shaft 377 is positioned under the influence of the line-feeding keys, as explained above, the gear 403 drives the gear 485, the shaft 486, and the gear 487 in unison therewith in a counter-clockwise direction, which movement, by means of the gear 487, is transmitted to the gear 488 and the other parts, including the retaining ratchet 489 assembled in a unit therewith, in a clockwise direction, as viewed in Fig. 43. The teeth of the ratchet 489, cooperating with the pawl 494, prevents retrograde or return movement of the table 335 (Fig. 19) under the influence of the springs 386 and 392, and retains said table in the position to which it was moved under the influence of the line-finding keys.

The mechanism for holding the disk 407 (Figs. 39 and 46) and the bevel gear 406 stationary, so that the drive of the auxiliary shaft 402, under the influence of the line-finding keys will be transmitted to the main shaft 377 and then to the table 335, will now be explained.

The disk 407 (Fig. 39) has a V-shaped notch 496, which cooperates with the tooth on a locking pawl 497 free on a rod 498 supported by the printer framework. The pawl 497 is connected by a hub 499 to an extension 500, which is urged clockwise by a spring 501 in engagement with the tie bar 69 to normally maintain said pawl 497 disengaged from the notch 496. The extension 500 has a hook-shaped notch 502 therein, which cooperates with a stud 503 in the forward end of a pitman 504, the rearward end of which is pivotally connected to a V-shaped lever 505 free on the rod 438. The lever 505 carries rollers 506 and 507, which cooperate respectively with the peripheries of companion plate cams 508 and 509 secured on the printer cam shaft 371.

The forward end of the pitman 504 is connected by a link 510 to a selecting disk lever 511 free on a shaft 512 journaled in the printer framework. A spring 513 urges the lever 511 counter-clockwise to maintain a raised surface on the lower edge thereof in engagement with a stud 514 in an arm 515 free on the shaft 512. The lever 511 has a rounded finger 516 adapted to cooperate with the periphery of a slip feeler control segment 517 free on the shaft 315.

The arm 515 (Fig. 39) has secured thereto a companion arm 897 connected by a link 898 to a cam arm 899 free on the rod 438. A spring 900 urges the arms 515 and 897, the link 898, and the arm 899 rearwardly to normally maintain a roller 901, carried by said arm 899, in engagement with the periphery of a cam 902 secured on the printer cam shaft 371. The timing of the cam 902 is given in space 9 of the chart (Fig. 47), from which it will be seen that, immediately after the beginning of machine operations, the high part of said cam rides off the roller 901 and then off a point 903 of the arm 899 to release said arm and connected mechanism to the action of the spring 900, which immediately forces said parts rearwardly, the arm 515, through the spring 513, carrying the lever 511 in unison therewith to cause the feeler finger 516 to feel for the periphery of the segment 517.

The pitman 504 carries a stud 518 adapted to be engaged by the tooth of a latch 519 free on the shaft 512, said latch being urged clockwise by a spring 520 to normally maintain an upward extension thereof in engagement with a block 521 secured to the bottom surface of the table 335.

As long as the table 335 is in home or "Balance Forward" position, as shown in Fig. 39, the block 521 retains the tooth of the latch 519 out of engagement with the stud 518. However, when said table 335 is moved away from home position, the tooth of the latch will not obstruct movement of the lever 511; consequently the stud 503 will be engaged with the notch 502, whereupon operation of the cams 508 and 509, according to the time given in space 10 of the chart (Fig. 47) will cause the pawl 497 to be immediately engaged with the V-shaped notch 496 in the disk 407, to couple the auxiliary shaft 402 to the main shaft 377 to cause the table 335 to be positioned under the influence of the depressed line-finding keys. If the statement sheet is improperly placed upon the table or is not placed upon the table at all, a slip feeler mechanism, hereinafter described, causes the periphery of the segment 517 to move into the path of the feeler finger 516 to prevent the stud 503 from engaging the notch 502, and, as a result, the pawl 497 will remain disengaged from the V-shaped notch 496 in the disk 407, whereupon positioning of the table 335 under the influence of the line-finding keys will be prevented, and the table will remain in home position.

When the pitman 504 moves downwardly to engage the stud 503 with the notch 502, the stud 518, carried by said pitman, drops in front of an angular surface 522 on the latch 519 prior to movement of the table 335 toward the right, as viewed in Fig. 39, away from home position. Movement of the table 335 under the influence of the line-finding keys withdraws the block 521 from the upward extension of the latch 519 to permit the surface 522, under the influence of the spring 520, to resiliently engage the stud 518. After the table 335 has been positioned under the influence of the line-finding keys, the cam 902 returns the arms 897 and 515 and the lever 511 clockwise to disengage the stud 503 from the notch 502 in the extension 500 and to move the stud 518 above the latching surface of the latch 519, so that said latch, under the influence of the spring 520, will move beneath said stud 518 to block further engaging movement of the pitman 504 and the stud 503. This prevents the pawl 497 from again engaging the V-shaped notch 496 in the disk 407 during the remainder of the particular posting operation. Therefore, if, during the remainder of the particular posting operation, the line-finding keys are inadvertently or accidentally depressed, the movement of the auxiliary shaft 402 under the influence of said depressed keys will be dissipated through the idle rotation of the bevel gear 406 and the disk 407 and will not be imparted to the main shaft 377.

Statement sheet or slip feeler mechanism

A statement sheet or slip feeler mechanism, shown in Figs. 40 and 41, is provided for controlling the segment 517 (Fig. 39) to disable the positioning of the table 335 under the influence of the line-finding keys when no slip 343 is placed on said table. This mechanism includes a slip feeler 525 mounted for vertical shifting movement by means of parallel slots therein, which loosely engage the shaft 377 and the rod 498. Collars secured on the shaft 377 and the rod 498 locate the slip feeler 525 laterally upon said shaft and said rod. The slip feeler 525 carries a stud 526, which is engaged by a slot in one end of a lever 527 free on a rod 528 supported by the printer framework. A slot in the opposite end of the lever 527 engages a rod 529, which connects the segment 517 (Fig. 39), a hammer control segment 530 (Fig. 40), and other hammer or printing control segments 531 (Fig. 22), all of which are loosely mounted on the shaft 315. The segment 530 (Fig. 40) is connected by a link 532 to one arm of a cam lever 533 (see also Fig. 41) free on the rod 438. Another arm of the cam lever 533 supports a roller 534, which cooperates with the periphery of a feeler-operating cam 535 secured on the printer cam shaft 371. When the cam 535 nears home position, in which position it is shown in Fig. 41, the roller 534 rides off of an abrupt shoulder on the periphery of said cam and permits a point 536 to engage said shoulder to effect faster feeling action of the feeler 525 than would be possible with the roller 534. A spring 523 (Figs. 40 and 41) urges the cam lever 533 counter-clockwise to normally maintain the roller 534 and the point 536 in engagement with the periphery of the cam 535.

By referring to space 18 of the time chart (Fig. 47), it will be seen that, immediately after machine operation is initiated, clockwise movement of the shaft 371 and the cam 535 (Figs. 40 and 41) moves the abrupt shoulder on said cam beyond the point 536 to release the lever 533 to the action of the spring 523, which movement, through the linkage shown in Fig. 40 and described above, immediately shifts the slip feeler 525 upwardly to cause an upward extension of said slip feeler, which moves through an aperture in the table 335 to feel for the presence of a slip 343. If a slip 343 is properly placed on the table 335, full movement of the slip feeler 525 is obstructed by said slip, and, as a result, counter-clockwise movement of the segment 517 under the influence of the spring 523 is prevented.

When the upward movement of the slip feeler 525 is obstructed by a slip 343, means are provided for immediately returning said slip feeler 525 and connected parts to home positions, so that the tension of said feeler against the slip 343 will be instantly released to insure that the segment 517 (Fig. 39) is restored to normal position, as here shown, so that the arcuate surface thereon will not be engaged by the feeler finger 516.

The feeler-restoring mechanism comprises a bell crank 537 (Fig. 40) free on the shaft 315, one arm of which loosely engages the rod 529. The other arm of the bell crank 537 is connected by a link 538 to a restoring disk 539 free on the rod 438. The restoring disk 539 has a shoulder 540, which cooperates with a restoring pawl 541 pivotally mounted on one arm of a cam lever 542 and urged counter-clockwise by a spring 543. A bent-over extension 544 of the pawl 541 yieldingly engages a stud 545 in a bracket 546 supported by the rod 438 and the shaft 371 to retain said pawl 541 out of the path of the shoulder 540 when the cam lever 542 is in home position, as shown in Fig. 40. A spring 547 (Fig. 40) urges the lever 542 clockwise to maintain a roller 548 carried by said lever in yielding contact with the periphery of a plate cam 549 secured on the printer cam shaft 371, and, when said cam 549 is in home position, as here shown, the spring 547 is strong enough to overcome the action of the spring 543 and retain the pawl 541 out of the path of the shoulder 540.

When full upward movement of the slip feeler 525 and connected parts has been obstructed by the slip 343, rotation of the cam 549 rocks the lever 542 and the pawl 541 first counter-clockwise and then back to normal position, according to the time given in space 19 of the chart (Fig. 47). As the lever 542 starts its initial movement counter-clockwise, the extension 544 of the pawl 541 is withdrawn from the stationary stud 545 to permit the spring 543 to move said pawl into the path of the shoulder 540. Continued counter-clockwise movement of the lever 542 causes the pawl 541 to engage the shoulder 540 and restore the bell crank 537, the rod 529, the segment 517 (Fig. 39), and the slip feeler 525 to normal or home positions, as here shown.

When no slip 343 is on the table 335, full upward movement of the feeler 525, under the influence of the cam 535, is not obstructed, and this upward movement, through the lever 527, rocks the rod 529, the segment 517, and the bell crank 537 full distance counter-clockwise to move the arcuate surface on the segment 517 into the path of the finger 516 (Fig. 39) to obstruct counter-clockwise movement of the lever 511 to prevent the stud 503 from being engaged with the notch 502 in the extension 500. This prevents the pawl 497 from being engaged with the V-shaped notch 496 in the disk 407. Consequently, said disk and the bevel gear 406 are free to revolve, and, as a result, the positioning of the shaft 402 under the influence of the line-finding keys will not be transmitted to the table feed shaft 377, and, as a result, the table will remain in home position.

Counter-clockwise movement of the bell crank 537, when upward movement of the slip feeler 525 is not obstructed by a slip, causes said bell crank, by means of the link 538, to rock the restoring disk 539 clockwise to move the shoulder 540 on said disk beyond the pawl 541. This prevents said pawl 541 from engaging said shoulder 540 during operation of the cam 549, and consequently the slip feeler mechanism will not be restored to normal position at the beginning of the machine operation. In this case, the cam 535 (Fig. 41), in cooperation with the roller 534, restores the lever 533 and connected parts, including the segment 530, the bell crank 537, the restoring disk 539, and the slip feeler 525, to normal positions, as shown in Fig. 40. The manner in which the segments 531 (Fig. 22) obstruct the operation of the printing hammers when no slip is placed on the table 335 will be explained later in connection with the check-printing mechanism.

Line-finding key bank construction

It will be recalled, by referring to Figs. 25A and 25B, that the units line-finding keys 449 are supported in the framework 450, which is in turn mounted on rods 451 and 479 in the printer framework. Each of the units keys 449 has a projection 551, which cooperates with a plurality of wedges 552 loosely mounted on a bracket 553 supported on studs 554 and 555, in turn secured in the framework 450. The well-known method of using crowding wedges 552 for preventing more than one of a plurality of keys in one group from being depressed at a time is well known in the art, and, when one of the units keys 449 is depressed, the projection 551 crowds the wedges 552 together to prevent depression of another key in said group at the same time. Further description of this old and well-known key-locking mechanism is believed unnecessary.

It will be noted, by referring to Fig. 29, that the units line-finding keys 449 are arranged in two groups, the right-hand group containing the even-numbered keys and the left-hand group containing the odd-numbered keys. It will likewise be noted, by referring to Fig. 30, that the units line-finding keys have projections 556 on the left-hand thereof, similar in every respect to the projections 551 on the right-hand side, and that the right-hand projections 551 for the even-numbered keys and the left-hand projections 556 for the odd-numbered keys are longer than the corresponding projections for the keys in the opposite group. The long projections 551 for the even-numbered keys and the long projections 556 for the odd-numbered keys, in cooperation with compressible springs 557 mounted on fork-shaped fingers of retainers 558 secured in the frame 450, normally retain said keys 449 in upward or undepressed positions. The projections 556 on the units keys 449 cooperate with hooks 559 on a detent 560 (Figs. 28 and 31) slidably mounted by means of slots therein in cooperation with the studs 554 and 555. A spring 561 urges the detent 560 rearwardly or toward the right, as viewed in Fig. 28, to normally maintain an angular camming surface on the hooks 559 in contact with the projections 556.

Depression of one of the unit keys 449 (Figs. 25A, 28, 29, 30, and 31) causes the projection 556 thereon, in cooperation with the angular camming surface on the corresponding hook 559, to shift the detent 560 forwardly or toward the left, against the action of the spring 561. When the projection 556 moves beyond the hook 559, the spring 561 returns the detent 560 forwardly to move said hook over said projection to latch the depressed key in depressed position. It will be noted that these keys are not flexible keys; that is, a previously-depressed key cannot be released by depression of another key, and so on, because of the wedges 552, which prevent the depression of more than one key 449 at a time. At the end of the machine operation, the detent 560 (Figs. 28 and 31) is shifted rearwardly automatically to release the depressed units line-finding key. Manual means is also provided for shifting the detent 560 rearwardly to release the depressed key 449 prior to machine operation in case the wrong key has been depressed. This means will be explained presently.

The short projections 551 of the odd-numbered keys 449 (Figs. 28 and 30) cooperate with angular camming surfaces on projections 562 on a control bar 563 mounted to shift horizontally by means of slots therein in cooperation with the studs 554 and 555, and the short projections 556 on the even-numbered keys 449 cooperate with similar camming surfaces on similar projections 564 of a similar control bar 565 also mounted to shift horizontally by means of slots therein in cooperation with said studs 554 and 555. Similar springs 566 (Fig. 28) urge the control bars 563 and 565 forwardly to maintain the rearward or right-hand ends of the horizontal slots therein in contact with the studs 554 and 555. The similar control bars 563 and 565 (Figs. 28 and 25A) have downward extensions 567 and 568, which cooperate with a stud 569 in the units zero stop pawl 481, which is urged counter-clockwise by a spring 570 into engagement with a stop stud 571 to normally maintain the hook on said stop pawl 481 in the path of the square stud 482 in the main units slide 417.

Depression of one of the keys 449 (Figs. 25A and 28) causes the projection 551 or 556 on said key, in cooperation with the angular camming surface on the projection 562 or 564 of the corresponding bar 563 or 565, to shift said slide rearwardly against the action of the spring 566 to cause the projection 567 or 568 thereon, in cooperation with the stud 569, to rock the zero stop pawl 481 clockwise against the action of the spring 570 to move the hook of said stop pawl out of the path of the square stud 482 to release the main slide 417 for forward movement, so that said slide may be positioned by the depressed key 449. When the depressed key 449 is released near the end of machine operations, the control bar 563 or 565 is returned forwardly under action of the spring 566 to release the zero stop pawl 481 so that it may engage the stud 482 to position the main slide 417 in zero position in subsequent machine operations.

The detent 560 has a depending finger 573 (Figs. 25A, 25B, 27A, 27B, 28, and 30), which cooperates with a stud 574 in a release bar 575 slidably mounted by means of parallel slots 576 and 577 therein, in cooperation with the rods 419 and 421. A link 578 connects the bar 575 to a cam arm 579 free on the rod 438 and carrying a roller 580 which cooperates with the periphery of a key release cam 581 secured on the printer cam shaft 371. A spring 582 urges the cam arm 579 clockwise to normally maintain the roller 580 in contact with the periphery of the cam 581 and to maintain the bar 575 in its rearward position, as here shown. Revolution of the cam shaft 371 in a clockwise direction during machine operations causes a node 583 on the cam 581, in cooperation with the roller 580, to rock the arm 579 counter-clockwise, according to the time given in space 17 of the time chart (Fig. 47). Counter-clockwise movement of the cam arm 579 shifts the release bar 575 forwardly, during which movement the stud 574 engages the finger 573 and shifts the detent 560 forwardly or toward the left, as here viewed, to disengage the hook 559 from the projection of the depressed key 449 to release said key to the action of its spring 557, which immediately restores said key upwardly to normal position.

Manual means is also provided for shifting the bar 575 to release the depressed units key 449.

Referring to Figs. 25A and 27A, a slot in the forward end of the release bar 575 engages a stud 584 in an arm 585 free on a stud 586 secured in the frame 64, and said arm 585 is flexibly connected, by a spring 588, to a companion arm 587 also free on said stud 586. A projection 589 on the arm 587 cooperates with a downward extension 590 on a slide 591 mounted to shift vertically by means of vertical slots therein, in cooperation with studs 592 secured in a plate 593, in turn secured to the frames 63 and 64. Secured to the top edge of the slide 591 is a release bar 594 conveniently located in front of the keys 449 and 477. Depression of the release bar 594 against the action of a spring 595, which normally retains said bar and the slide 591 in upward position, as here shown, shifts said parts downwardly, causing the extension 590 to engage the projection 589 and rock the arms 587 and 585 counter-clockwise to shift the release bar 575 forwardly to cause the stud 574 to engage the finger 573 and shift the detent 560 also forwardly to release the depressed units key 449. The spring 588 forms a cushioning device to prevent injury to the bar 575 or the detent 560 in case the release bar 594 is struck a sharp blow.

Means operated by the detent 560 (Figs. 25A, 28, and 31) is provided for locking the machine against release when one of the units line-finding keys 449 is partially depressed. As explained earlier herein, when one of the keys 449 is partially depressed, the projection 556 on said key, in cooperation with the angular camming surface on the corresponding hook 559, shifts the detent 560 forwardly against the action of the spring 561. This forward movement of the detent 560 causes a vertical wall in the forward end of a notch in said detent, in cooperation with a stud 596 in a crank 597 secured on a shaft 598 journaled in the printer framework, to rock said crank and said shaft clockwise. Secured on the shaft 598 is another crank 599, which moves clockwise in unison therewith, and, by means of a link 600, rocks a bell crank 601, free on a stationary support 602, clockwise. The bell crank 601 carries a stud 603, which cooperates with a foot-shaped extension of a link 604 having therein a slot which engages a stationary stud 605, the upper end of said link being pivotally connected to a crank 606 secured on a shaft 607 journaled in the left frame 60. Also secured on said shaft 607 is a crank 608 connected by a link 609 to a latch 610 free on a stud 611 in the left frame 60. A spring 612 urges the link 604 downwardly to normally maintain a latching surface 613 on the latch 610 out of the path of a latch stud 614 in a machine release lever 615 secured to the key lock shaft 69.

Clockwise movement of the bell crank 601 shifts the link 604 upwardly to rock the crank 606, the shaft 607, and the crank 608, which movement, by means of the link 609, rocks the latch 610 also clockwise, to move the latching surface 613 into the path of the stud 614 to block clockwise releasing movement of the lever 615 and the key lock shaft 69, to prevent operation of the machine when one of the keys 449 is partially depressed. Full depression of any one of the units line-finding keys 449 permits return movement rearwardly of the detent 560 under action of the spring 561 to permit the spring 612 to rock the latch 610 counter-clockwise to move the surface 613 out of the path of the stud 614 to permit releasing of the machine for operation.

*Anti-overdrive mechanism*

Mechanism under control of the line-finding keys is provided for preventing overdrive of the paper table 335 when said table is moved to first printing position by the mechanisms shown in Figs. 25A, 25B, 26A, and 26B. The control bar 563, which is actuated by the odd-numbered keys 449 (Fig. 28), has in the rear end thereof a slot which embraces a stud 617 in an extension of a yoke 618 free on the shaft 598. The yoke 618 has a bent-over portion 619, which, when the bar 563 is in forward position, as shown in Fig. 28, underlies an extension of an overdrive control pawl 620 (Fig. 42) free on the shaft 486. Depression of one of the odd-numbered keys 449 shifts the control bar 563 rearwardly (Fig. 28) to rock the yoke 618 counterclockwise to move the bent-over extension 619 out of the path of the pawl 620 and into the path of a companion overdrive-preventing pawl 621 also free on the shaft 486.

The pawl 620 cooperates with the overdrive-preventing ratchet 491 (Figs. 42 and 46), which has a plurality of ratchet teeth therein corresponding to the odd-numbered lines of the table 335 and the statement sheet 343 (Figs. 2 and 19), and the pawl 621 cooperates with the ratchet 492 having therein teeth corresponding to the even-numbered lines on said table 335 and said statement sheet 343. Downward extensions of the pawls 620 and 621 have similar slots 622, which cooperate with a stud 623 in the forward end of a link 624, the rearward end of which is pivotally connected to a cam arm 625 free on the rod 438. A spring 626 urges the cam arm 625 clockwise to normally maintain a roller 627 carried thereby in contact with the periphery of a plate cam 628 adjustably connected to a drive disk 629 secured on the shaft 371. Similar springs 630 (Fig. 42) urge the pawls 620 and 621 counter-clockwise to maintain the forward ends of the slots 622 in contact with the stud 623.

The timing of the cam 628 is given in space 11 of the chart (Fig. 47), and, comparing this timing with that of the cams 441 and 442 (Figs. 25A and 25B), which operate the slides 417 and 425 to move the table 335 to the line position corresponding to the depressed key 449, it will be seen that, just prior to the time when the table arrives in the selected line position, a point on the cam arm drops off of an abrupt shoulder on the cam 628 to permit the said arm 625 to shift the link 624 rearwardly to release the pawls 620 and 621 to the action of their springs 630, which immediately moves whichever pawl is not obstructed by the bent-over extension 619 of the yoke 618 into engagement with the teeth of the corresponding ratchet 491 or 492. This engaging of the selected pawl 620 or 621 with the corresponding ratchet 491 or 492 immediately stops the rotation of said ratchet, which is revolved in a clockwise direction by the gearing shown in Fig. 46 and including the gears 488 and 487, the shaft 486, and the gears 485 and 403, which, it will be recalled, are driven by the shaft 371, which positions the table 335 to stop said table in the selected line position.

This anti-overdrive mechanism is particularly essential or effective when the table is moved to one of the higher line positions—for example, line 39—as, during such a long feed, quite a bit of momentum is generated, which might cause said table to be positioned beyond the selected line. When none of the odd-numbered keys 449 (Fig. 28) is depressed, the yoke 618 remains in the position shown in Fig. 42 to obstruct movement of the pawl 620. Consequently, the pawl 621 is effective in this case and in cooperation with the ratchet 492, which, as previously explained, corresponds to the even-numbered lines to prevent overthrow or overfeed of the table 335. When one of the odd-numbered keys 449 is depressed, the yoke 618 is rocked counter-clockwise to move the extension 619 into the path of the pawl 621 and to free the pawl 620. Consequently, said pawl 620 is effective upon machine operation and in cooperation with the teeth of the ratchet 491, which teeth correspond to the odd-numbered lines of the table 335, prevents overdrive of said table.

By referring to Figs. 26A, 26B, and 29, it will be recalled that the keys 477 are used in conjunction with the units keys 449 for positioning the table 335 to lines beyond the ninth line position. Of course, when the tenth line is selected, only the "10" key is depressed, and the same holds true for the "20" key and the "30" key. The tens keys 477 are slidably mounted in the key frame 478, which is mounted adjacent to the units bank 450 on the rods 451 and 479. As the tens bank 478 is similar in construction to the units bank 450, the description of this bank will not be so much in detail as the description of the units bank.

Each of the tens keys 477 (Figs. 26A, 29, and 30) has a projection 633, which, in cooperation with a compressible spring 634 mounted on forked-shaped extensions of a retainer plate 635 secured in the frame 478, normally maintain said keys in their upward position, as here shown. Depression of one of the keys 477 causes the projection 633 thereon, in cooperation with an angular camming surface on a corresponding hook 636 on a detent 637 slidably mounted by means of horizontal slots therein, in cooperation with studs 638 and 639 in the frame 478, to shift said detent 637 forwardly against the action of a spring 640. When the projection 633 moves beyond the hook 636, the spring 640 returns the detent 637 rearwardly to cause said hook to move over the projection 633 to latch the key 477 in depressed position. Forward movement of the key release slide 575 near the end of machine operation, under the influence of the cam 581 (Figs. 25A and 25B), causes the stud 574 to engage an extension 641 of the detent 637 to shift said detent forwardly against the action of the spring 640 to disengage the hook 636 from the projection 633 of the depressed tens key 477 to release said key to the action of its spring 634 (Fig. 30), which immediately returns said key upwardly to normal position. Forward movement of the slide 575 under the influence of the manual release bar 594 also causes the stud 574 to shift the detent 637 forwardly to release the depressed tens key 477.

Depression of the "10" key 477 (Figs. 26A and 29) causes the projection 633, in cooperation with an angular camming surface on an upward extension 642 of a control bar 643 slidably mounted in the frame 478 by means of slots therein, in cooperation with the studs 638 and 639, to shift said control bar 643 rearwardly. Rearward movement of the control bar 643 by means of a downward extension thereof, in cooperation with a stud 645 in the zero stop pawl 483 for the "10" key 477, rocks said pawl clockwise against the action of a spring 646 to move the latching surface on said pawl out of the path of the square stud 484 in the main slide 452 for the tens keys. Depression of the "30" key 477 (Fig. 26) by means of the projection 633, in cooperation with an angular camming surface on an upward projection 647 on the control bar 643, also shifts said control bar rearwardly to release the zero stop pawl 483 in the manner described above. Depression of either the "20" or the "30" key 477 causes the projection 633 thereon, in cooperation with angular camming surfaces on upward projections 648 and 649 of a control bar 650, shiftably mounted in the framework 478 by means of slots therein, in cooperation with the studs 638 and 639, shifts said control bar rearwardly. Rearward movement of the control bar 650 causes a downward extension 651 thereon, in cooperation with the stud 645, to move the zero stop pawl 483 out of the path of the stud 484 to permit positioning of the main slide 452, as explained earlier herein.

Depression of the "10" key 477 moves the extension 633 into the path of a projection 655 of the control bar 650 to obstruct rearward movement of said bar, thereby causing the projections 648 and 649 to obstruct the depression of the "20" and the "30" keys 477. Likewise, depression of the "20" key 477 moves the extension 633 thereof into the path of a projection 652 on the control bar 643 to obstruct the rearward movement of said control bar, thereby causing the projections 642 and 647 thereon, in cooperation with the extensions 633 of the "10" and the "30" keys 477, to obstruct depression of said keys. Depression of the "30" key 477 causes the extension 633 thereon, in cooperation with the camming surfaces on the projections 647 and 649, to shift the control bars 643 and 650 rearwardly to move the projection 652 of the control bar 643 beneath the extension 633 of the "20" key 477 to obstruct depression of said key and to move the projection 655 beneath the extension 633 of the "10" key 477 to obstruct depression of said key.

When the detent 637 (Figs. 26A and 31) is shifted forwardly under the influence of a partially-depressed key 477, a slot in a rearward extension thereof engages a stud 653 in a crank 654 secured on the shaft 598 and rocks said crank and said shaft clockwise to move the latch 610 (Fig. 31) into the path of the stud 614 to obstruct releasing movement of the key lock shaft 69. When the key 477 is fully depressed, the detent 637 is returned rearwardly by the spring 640 to permit the spring 612 to rock the latch 610 out of the path of the stud 614, so that the machine may be released.

The three tens keys 477 (Fig. 29) all select even-numbered lines, and, as a result, depression of these keys has no influence upon the yoke 618 (Fig. 42). When any one of the keys 477 is used alone to select lines 10, 20, or 30, the pawl 621 is effective, and, in cooperation with the ratchet 492 for the even-numbered lines, prevents overdrive of the table in the manner explained above. The same thing applies when the keys 477 are used in conjunction with the units keys 449 for the even-numbered lines. When the tens keys 477 are used in conjunction with the odd-numbered keys 449, depression of one of the odd-numbered keys rocks the yoke 618 counter-clockwise to render the pawl 621 ineffective and to simultaneously render the pawl 620 effective, which, in cooperation with the ratchet 491 for the odd-numbered lines, prevents overdrive of the table 335 in the manner explained above.

*Automatic positioning of the slip table*

By referring to Fig. 39, it will be recalled that it is necessary to engage the pawl 491 with the notch 486 in the disk 407 to hold said disk and the bevel gear 406 stationary so that the positioning of the auxiliary shaft 402 under the influence of the line-finding keys will be transmitted to the main shaft 377, which in turn positions the table 335 (Fig. 19). It will likewise be recalled that the movement of the table 335 away from home or normal position, under the influence of the line-finding keys, causes the latch 519 to move beneath the stud 518 to prevent the pawl 497 from holding the disk 407 and the gear 406 stationary, thereby preventing transmission of the positioning of the shaft 402 to the shaft 377. This prevents further positioning of the table 335 by means of line-finding keys and turns the positioning of said table over to mechanism which is automatic in operation and which is controlled by the transaction keys and the total keys, as will be explained presently.

The automatic or consecutive line-spacing of the table 335 is controlled by the line-spacing ratchet 490 (Figs. 43, 44, 45, and 46), which, it will be recalled by referring to Fig. 45, is a part of an assembly comprising the retaining ratchet 489, the gear 488, and the overdrive-preventing ratchets 491 and 492, secured in fixed relationship to each other on the hub 493, which is rotatably supported by the shaft 402. Cooperating with the teeth of the drive ratchet 490 is a drive pawl 656 pivotally mounted on a bell crank 657 free on the shaft 402. A spring 658 urges the pawl 656 clockwise to normally maintain said pawl in engagement with the teeth of the ratchet 490. The bell crank 657 is connected by a link 659 to a cam arm 660 free on the rod 438 and urged clockwise by a spring 661 to normally maintain a point thereon in contact with the periphery of a table feed cam 662 secured on the shaft 377. When rearward movement of the link 659 is not obstructed, rotation of the shaft 377 and the cam 662 causes the point of the arm 660, under the influence of the spring 661, to drop off of an abrupt shoulder 663 formed in a camming recess in the cam 662, according to the time given in space 13 of the time chart (Fig. 47). This clockwise movement of the arm 660 shifts the link 659 rearwardly to rock the bell crank 657 counter-clockwise to back-up the feed pawl 656 one tooth space on the ratchet 490. It is to be remembered that the retaining pawl 494 (Fig. 3), in cooperation with the teeth of a retaining ratchet 489, which is integral with the feed ratchet 490, prevents retrograde movement of said feed ratchet when the feed pawl 656 is being backed up, as explained above.

Continued rotation of the cam 662 causes a camming surface formed in the recess 663, in cooperation with the point of the arm 660, to rock said arm counter-clockwise against the action of the spring 661 to return the link 659 forwardly to cause the feed pawl 656 to advance the feed ratchet 490 one tooth space in a clockwise direction. The gear 488 (Figs. 43, 45, and 46), which is fast to and moves in unison with the ratchet 490, drives the gear 487 and the shaft 486 counter-clockwise, thus causing the gear 485, which is fast on said shaft 486, to drive the gear 403, the shaft 377, and the table drive gears 375 and 376 (Fig. 19) clockwise to advance the table 335 one line-space.

The rearward movement of the link 659 (Fig. 43) is controlled by various mechanisms to effect the proper line-spacing of the table 335. For example, the total control plate 73 must be in adding position before the link 659 is free to shift rearwardly to operate the feed pawl 656, and, as a result, the feed pawl 656 never works when said total control plate 73 is out of adding position. Likewise, depression of certain of the transaction keys prevents operation of the link 659 and the pawl 656, and means is also provided for preventing operation of the link 659 when the table 335 is being moved to the selected line under the influence of the line-finding keys and their associated mechanisms.

Referring to Fig. 43, an angular extension of the link 659 carries a stud 664, which cooperates with a notch 665 in a total control disk 666 free on the shaft 325. The control disk 666 has secured thereto a gear 667, which meshes with a gear 668 secured to the shaft 330, which, it will be recalled by referring to Fig. 6, is rotated by the train of gearing here shown, by the total control plate 73, in proportion to the depressed total keys 74 to 78 inclusive (Fig. 1).

When the total control plate 73 is in adding position, the control disk 666 is positioned as shown in Fig. 43, so that the notch 665 therein is opposite the stud 664. Consequently, the link 659 is free to move back and forth under the influence of the cam 662 to operate the table-positioning ratchet 490. When the total control plate 73 is moved away from adding position under the influence of the total key in sub-total and total-printing operations, the periphery of the disk 666, in cooperation with the stud 664, obstructs rearward movement of the link 659 to prevent operation of the pawls 656 and the ratchet 490.

The link 659 (Figs. 43 and 44) has a bent-over extension 669, which cooperates with a pawl 670 free on a stud 671 secured in a bracket 672 in turn secured to the machine framework. The pawl 670 is secured to a cam arm 673 urged counter-clockwise by a spring 674 to normally maintain a roller 675 carried thereby in contact with the periphery of a cam 676 secured on the shaft 315. A bent-over ear 677 on the arm 673 is adapted to be engaged by a latching surface on a latch 678 fast to a hub 679 free on the shaft 330. Also secured to the hub 679 is a cam lever 680 having thereon a V-shaped camming surface adapted to cooperate with a stud 681 secured in the cam 662.

By referring to Fig. 5, it will be seen that the shaft 315, which carries the cam 676, is connected by the gearing here shown to the differential mechanism of the transaction bank 270, and consequently said shaft 315 is positioned in proportion to the depressed transaction keys. It will likewise be noted that the cam 676 is divided into ten spaces numbered "0" to "9" inclusive, which spaces correspond to the ten positions of the transaction differential mechanism.

Considering for the moment that the latch 678 (Fig. 44) is disengaged from the ear 677, it will be seen that the high portions of the cams 676, corresponding to the differential positions 0, 1, 5, and 9, in cooperation with the roller 675, retain the pawl 670 in the path of the bent-over extension 669 to prevent operating movement of the link 659. Consequently, when the transaction differential is positioned at zero (Figs. 1 and 5)—for example, when no key is depressed in the transaction bank, or when the Overdraft Pick-Up key 79, which occupies position "1," is depressed, or when the Overdraft key 86, which occupies position "5," is depressed, or when the Balance Pick-Up key 84, which occupies position "9," is depressed—a high portion of the periphery of the cam 676 will be positioned opposite the roller 675 to hold the pawl 670 in the path of the bent-over extension 669 to prevent operation of the automatic table-positioning mechanism. When either the Deposit Correction key 80, the Space Ledger key 85, the Deposit key 81, the Check key 82, the Release Lock Proof key 87, or the Check Correction key 83, which keys correspond, respectively, to positions 2, 3, 4, 6, 7, and 8 of the cam 676, is depressed, the transaction differential mechanism will position said cam 676 so that the low portion of the periphery thereof is opposite the roller 675, thus permitting the spring 674 to rock the pawl 670 out of the path of the extension 669 to permit feeding movement of the link 659.

The latch 678 and associated mechanism are provided for holding the pawl 670 in the path of the extension 669 (Figs. 43 and 44) during the first of a series of posting operations, in which the slip table 335 is moved to the selected position under the influence of the line-finding keys.

It will be recalled that the first operation in a series of check-posting operations is a balance pickup or an overdraft pickup operation (Figs. 1, 2, and 3), in which the previous balance is picked up and entered in the balance totalizer, but this old balance ordinarily is not printed upon the statement slip unless said balance is being forwarded from an old statement slip to a new one, in which case the Balance Forward key 88 is used in conjunction with the Balance Pickup key 84 or the Overdraft Pickup key 79 to cause said balance forward to be printed in the space provided therefor, just above the first line on the statement slip. After the balance pickup operation, the proper line-finding keys are depressed to select the next available line on the statement sheet, the amount is set up on the amount key 71, and the transaction key corresponding to the item to be entered upon the statement sheet is depressed.

Invariably, the transaction key used in this second operation is one which selects a low portion of the periphery of the cam 676, and, were it not for the latch 678, the pawl 670 would move out of the path of the extension 669 and permit the link 659 to operate the automatic line-spacing mechanism. The latch 678, being effective during this second posting operation, prevents such disengaging of the pawl 670; consequently, the link 659 remains inoperative. Near the end of the machine operation, the stud 681, in cooperation with the V-shaped camming projection on the end of the lever 680 rocks said lever, the hub 679, and the latch 678 counter-clockwise against the action of the spring 674 to disengage said latch from the ear 677, so that said spring 674 may immediately rock the arm 673 and the pawl 670 counter-clockwise out of the path of the extension 669 and into contact with the low portion of the periphery of the cam 676.

When the high portion opposite the fifth position of the cam 676 (Fig. 44) passes the roller 675, which occurs, for example, when performing a deposit posting operation, which selects position 4 of the cam, after a check-posting operation, which selects position 6 of said cam, when the pawl 670 and the arm 673 are restored by said high portion opposite the fifth position, the latch 678 again engages the ear 677, and, as a result, obstructs feeding movement of the link 659 in the next succeeding operation. However, this does not interfere with the proper operation of the machine, as the check and the deposit items are always posted on the same line of the statement slip when shifting from one item to the other in this manner. The same holds true of positions 2 and 8 of the cam 676, which are, respectively, Deposit Correction position and Check Correction position. As previously explained, a new balance operation is invariably performed at the end of each series of posting operations, and depression of the New Balance key 74 automatically selects either the "0" or the "9" position of the cam 676, and, as these positions are opposite a high portion of the periphery of said cam, the pawl 670 is restored to effective position, as here shown, to obstruct operation of the link 659 and to restore the latch 678 and the lever 680 to effective positions, as here shown.

By referring to Fig. 43, it will be noted that the cam 662 has a slight rise 685 on the periphery thereof, which imparts a slight overfeed to the ratchet 490, after which the pawl 656 is backed up slightly from the tooth of said ratchet. This is to insure that the ratchets 490 and 489 are advanced far enough to permit the retaining pawl 494 to properly engage the corresponding tooth of said ratchet 489.

Mechanism which functions immediately after the overfeeding of the ratchets 489 and 490, as explained above, is provided for yieldingly urging said ratchet in a retrograde direction, or counter-clockwise as viewed in Fig. 43, to insure that the teeth of said ratchets 489 and 490 are in engagement with their respective pawls 494 and 656, to accurately locate the table 335 in selected line position prior to operation of the impression mechanism. The mechanism for restoring the ratchets 489 and 490 into engagement with their respective pawls 494 and 656 comprises a ratchet 683 (Figs. 23 and 24) adjustably connected to a spider 684 secured on an extension of the shaft 377 which extends beyond the left frame 62. An operating arm 686 for the ratchet 683 is rotatably supported by a stud 687 mounted in axial alinement with the shaft 377 on a bracket 688 supported by a plurality of studs 689 secured in the frame 62. The arm 686 carries a ratchet pawl 690 urged counter-clockwise by a spring 691, and said arm likewise carries a stud 692, which engages a slot 693 in the forward end of a link 694, the rearward end of which is pivotally connected to one arm of a cam lever 695 free on the rod 438. The cam lever 695 carries rollers 696 and 697, which cooperate respectively with the peripheries of companion plate cams 698 and 699 secured on the printer cam shaft 371. Spring 700 (Fig. 23), tensioned between the stud 692 and a stud in the link 694, forms a yielding connection between the arm 686 and said link 694. When the mechanism is in home position, as here shown, an extension 701 of the pawl 690, in cooperation with a stud 702 secured in the frame 62, retains said pawl out of engagement with the teeth of the ratchet 683.

After the feed pawl 656 (Fig. 43) has completed its feeding and return movement under the influence of the cam 662, the companion plate cams 698 and 699, which operate according to the time given in space 6 of the time chart (Fig. 47), rock the lever 695 counter-clockwise to shift the link 694 rearwardly to rock the arm 686 counter-clockwise to cause the pawl 690 to move into engagement with the teeth of the ratchet 683, and continued movement of said cam lever 695 and said link 694 causes the spring 700 to yieldingly urge said arm 686 and pawl 690 and the ratchet 683 in a counter-clockwise direction to force the teeth of the ratchets 489 and 490

(Fig. 43) into engagement with their respective pawls 494 and 656 to insure that the table 335 is accurately located in the line position to which it has been fed.

Figure 7:
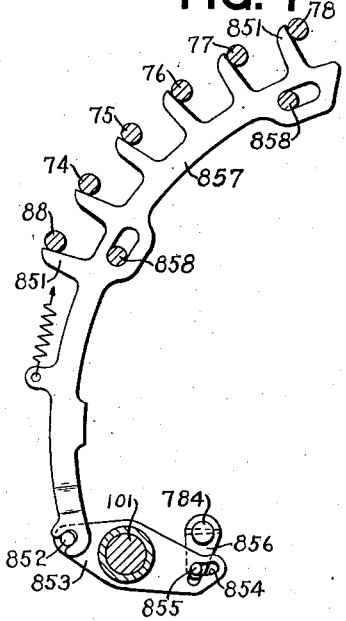
Fig. 7 is a detail view of a control plate operated by the total keys for rendering the automatic check-counting mechanism inoperative during total or sub-total printing operations.

The printer drive shaft 371 (Figs. 23 and 46) makes one clockwise revolution during each machine operation, as explained earlier herein, and said printer drive shaft is connected to the main shaft 70 by a gear train similar to and functioning exactly like the gearing shown in Fig. 7 of the Arnold Patent No. 2,141,332. In adding operations, the printer drive shaft 371 moves in synchronism with the main shaft 70. However, the main shaft 70, it will be recalled, makes two revolutions in sub-total and total-printing operations, and, as it is necessary that the printer drive shaft 371 make only one revolution in such operations, a clutching device is provided between the main shaft 70 and the gearing connecting said shaft to the printer shaft 371, said clutching device being automatically disconnected at the beginning of the first cycle of sub-total and total-printing operations, so that the movement of the main shaft 70 will not be imparted to the printer shaft 371 during said first cycle. At the beginning of the second cycle of operation, the clutching mechanism is rendered effective to connect the main shaft to the printer shaft, so that said printer shaft will be driven one revolution in unison with said main shaft during the last cycle of subtotal and total-printing operations.

Table release mechanism

Mechanism illustrated best in Fig. 38 is provided for disengaging the table feed and retaining pawls 656 and 494 from their respective ratchets 490 and 489, so that the springs 386 and 392 (Fig. 19) will return the table 335 to starting position. This pawl-releasing mechanism includes a releasing cam 703 (Figs. 38, 45, and 46) free on the hub 493 and located between the ratchets 489 and 490. The cam 703 has release lugs 704 and 705, which cooperate respectively with the teeth of the pawl 656 and 494. The cam 703 has a gear teeth, which mesh with similar gear teeth in a segment 706 secured on a shaft 707 journaled in the frames 63 and 64. Also secured on the shaft 707 is a crank 708 having pivoted thereto one end of a release cam operating pitman 709 with an L-shaped slot 710, which cooperates with a stud 711 in one arm of a two-armed lever 712 free on the rod 438. Each of the arms of the lever 712 carries a roller 713 and 714 cooperating respectively with the peripheries of companion plate cams 715 and 716 secured on printer cam shaft 371.

The pitman 709 carries a square stud 717 adapted to be engaged by a latch 718 secured on a shaft 719 journaled in the frames 63 and 64. Also secured on the shaft 719 is an arm 720 adapted to cooperate with a stud 721 extending downwardly from the table 335. A spring 722 (Fig. 38) urges the latch 718 counter-clockwise to normally maintain a stud 724 carried thereby in contact with the periphery of a latch control cam 723 secured on the shaft 315, which, it will be recalled, is positioned by the differential mechanism of the transaction bank in proportion to the depressed key in said bank. The cam 723 is divided into ten spaces corresponding to the ten positions of the transaction differential, said spaces being numbered from "0" to "9" inclusive. The cam 723 has a low portion which corresponds to positions 2 to 8 inclusive of the transaction bank, and said cam has a high portion which corresponds to the 0, the 1, and the 9 positions of said transaction bank. By referring to Fig. 1, it will be noted that the positions 2 to 8 inclusive correspond to the keys 80, 85, 86, 82, 87, and 83 and that the positions 1 and 9 correspond to the automatic key position and to the Overdraft Pickup key 79 and the Balance Pickup key 84.

When the low portion of the cam 723 is positioned opposite the stud 724, the spring 722 maintains the latching surface of the latch 718 beneath the square stud 717 to retain the substantially horizontal branch of the L-shaped slot 710 in alinement with the stud 711, and, when said slot is in this position, the cam arm 712 works idly back and forth during rotation of the cams 715 and 716 without imparting any movement to the pitman 709. When the high portion of the cam 723, corresponding to the 0, 1, and 9 positions, is moved opposite the stud 724, the latch 718 is rocked clockwise to disengage the latching surface thereon from the square stud 717 to release the pitman 709 to the action of a spring 725, which urges said pitman downwardly. Initial movement forwardly of the cam lever 712, upon rotation of the cams 715 and 716, and according to the time given in space 15 of the chart (Fig. 47) moves the stud 711 into alinement with the substantially vertical branch of the L-shaped slot 710, and the spring 725 immediately rocks said pitman 709 downwardly to engage said vertical branch of the slot 710 with the stud 711. Return movement clockwise of the cam lever 712 causes the stud 711, in cooperation with the vertical branch of the slot 710, to shift the pitman 709 rearwardly to rock the crank 708, the shaft 707, and the segment 706 clockwise, causing said segment 706 in turn to rock the release cam 703 counter-clockwise. Counter-clockwise movement of the cam 703 causes the camming lugs 704 and 705 to engage the teeth of the ratchet pawls 656 and 494 and rock said teeth out of engagement with the teeth of their corresponding ratchets 490 and 489. This immediately releases the table 335 (Fig. 19) to the action of the springs 386 and 392, which restores said table to home position.

In the succeeding operation, after the cams 715 and 716 have moved the lever 712 counter-clockwise, a stud 726 (Fig. 38) carried by the cam 715 engages a flat surface 727 on the pitman 709 and lifts said pitman upwardly to move the substantially horizontal branch of the L-shaped slot 710 opposite the stud 711. If, in this succeeding operation, the latch 718 is still retained in the position shown in Fig. 38 by the high portion of the cam 723, the pitman 709 moves downwardly under the influence of the spring 725 as the stud 726 rides off of the flat surface 727 to again engage the vertical portion of the slot 710 with the stud 711, and in this case the cam 703 will again disengage the pawls 656 and 494 to restore the table 335 to home position. However, if, in this succeeding operation, the cam 723 is so positioned that the low portion thereon is opposite the stud 724, the spring 722 immediately returns the latch 718 counter-clockwise to move the latching surface thereon beneath the square stud 717, and in this case the horizontal branch of the slot 710 will be retained in alinement with the stud 711 when the stud 726 moves beyond the flat surface 727, and in this case return movement clockwise of the lever 712 will impart no movement to the pitman 709, and consequently the pawls 656 and 494 will remain in engagement with their corresponding ratchets. If the latch 718 should move from its disengaged position, as shown in Fig. 38, to engaging position under the influence of the cam 723 and the spring 722, when the pitman 709 is in its downward position, a flat surface on the nose of said latch 718 will come to rest on the left side of the stud 717, and the latching surface of said latch 718 will snap beneath said stud 717 when the pitman 709 is restored upwardly by the stud 726, as explained above.

It will be noted that the stud 726 always restores the pitman 709 upwardly immediately after the lever 712 has received its initial movement counter-clockwise. However, if the latch 718 is in disengaged position, the pitman 709 moves downwardly as the stud 726 rides off of the flat surface 727 to again engage the vertical branch of the slot 710 with the stud 711.

Means is also provided for rendering the table-releasing means effective after the first item has been printed on the 39th line, so that the table 335 will be restored to home position immediately thereafter. This mechanism includes the stud 721, which is located with relation to the arm 720 so as to engage and rock said arm, the shaft 719, and the latch 718 clockwise when the table 335 is advanced to the 39th line position by the feed pawl 656. This moves the latching surface on the latch 718 from beneath the stud 717 and permits the vertical portion of the L-shaped slot 710, under the influence of the spring 725, to latch over the stud 711 at the end of the initial movement counter-clockwise of the arm 712. It will be noted that the cams 715 and 716 have long dwelling surfaces thereon, and during this dwell, in which the lever 712 remains stationary in its counter-clockwise position, the printing mechanism functions to record the first item on the 39th line (see space 8 of the time chart, Fig. 47). After the recording has been completed, the cams 715 and 716 return the lever 712 and the pitman 709 clockwise and rearwardly, respectively, to cause the lugs 704 and 705 to disengage the pawls 656 and 494 from their respective ratchets 489 and 490 to permit the table 335 to be returned to home position under the influence of the springs 386 and 392 (Fig. 19).

In case it is desired to print another item on the 39th line, it is necessary to depress the "39" line-finding keys—that is, the tens key "30" and the units key "9"—in order to again have the table 335 move to the 39th line position under influence of said line-finding key mechanism. The mechanism shown in Fig. 38 and described above functions every time the table 335 is moved to 39th or last line position, and, as a result, the table 335 will be restored to home position after each item is entered on the statement sheet.

*Alternate line-spacing of table in check-posting operations*

By referring to Figs. 2 and 3, it will be seen that the Debit section of the combined statement and ledger sheet has two columns for the listing of two check items side by side, after which the table feeds automatically to the next line if there are more checks to be listed. Likewise, it will be noted that the Credit section of the statement sheet has one column for the listing of only one credit item or deposit on each line of the statement sheet. Consequently, when there are more than one credit item to be posted, it is necessary for the table to feed the statement slip after each such credit item is posted. The automatic mechanism for controlling this alternate feeding of the table 335 is under control of the Check and Deposit keys 82 and 81 and the Check Correction and Deposit Correction keys 83 and 80 and will now be described in detail.

Referring to Figs. 32, 34, 35, 43, and 46, the stud 664 in the link 659, in addition to cooperating with the control disk 666 (Fig. 43), which, as previously explained, is controlled by the total control plate 73, also cooperates with a control disk 728 (Fig. 32), which controls the alternate feeding of the table 335 during check-posting operations. The control disk 728 has integral therewith a gear 729 and a ratchet 730, all of which are free on the shaft 315. The gear 729 meshes with a gear 731 secured on an alternate feed shaft 732 journaled in the frames 63 and 64, and also secured on said shaft 732 is a gear 733 (Fig. 35), which meshes with a companion gear 734 integral with a ratchet 735 free on the shaft 315. A feed pawl 763 (Figs. 32, 34, and 46) cooperates with the teeth of the ratchet 730, said pawl being pivoted on a stud 764 in an arm 736 free on the shaft 315. A spring 737 urges the pawl 763 counter-clockwise into yielding engagement with the teeth of said ratchet 730. The stud 764 is embraced by a slot in one arm of a lever 738 free on the shaft 330, the other arm of said lever having a slot which embraces a stud 739 in a cam lever 740 free on the rod 438 and carrying a roller 741 yieldingly maintained in engagement with the periphery of a plate cam 742 secured on the shaft 371 by a spring 743.

The cam lever 738 carries a stud 744 (Fig. 33), which cooperates with a control disk 745 secured on the shaft 315, which, it will be recalled, is positioned under the influence of the transaction keys. The selecting disk 745 has notches 746 and 747 corresponding, respectively, to the "6" and the "8" positions of the transaction differential. Consequently, when either the Check key 82, which occupies the sixth position, or the Check Correction key 83, which occupies the eighth position, is depressed, the notches 746 and 747 will be positioned by their respective keys opposite the stud 744, thereby permitting operation of the lever 738 and the feed pawl 763 by the cam 742. A retaining pawl 748 free on the shaft 330 is urged counter-clockwise into engagement with the teeth of the ratchet 730 by a spring 749. The control disk 728 has six equally spaced notches 750 therein, and the feed ratchet 730 has twelve teeth. Consequently, as said ratchet is rotated counter-clockwise tooth by tooth by the cam 742, according to the time given in space 14 of the chart (Fig. 47), a notch 750 and a solid section of the disk 728 between two notches will alternately be brought opposite the stud 664.

The ratchet 735 (Fig. 35), which is geared to the ratchet 730, has a mechanism for advancing it tooth by tooth, which is similar in every respect to the advancing mechanism for the ratchet 730, just explained. This mechanism includes an arm 751 free on the shaft 315 and carrying a stud 752 on which is pivoted a feed pawl 753 urged counter-clockwise by a spring 754 into engagement with the teeth of the ratchet 735. The stud 752 is straddled by a slot in one end of a lever 755 free on the shaft 330, said lever 755 having another slot which embraces a stud 756 in one arm of a lever 757 free on the rod 438. A spring 758 urges the lever 757 counter-clockwise to normally maintain a roller 759 carried thereby in contact with the periphery of a plate cam 760, which is similar in every respect to the cam 742

(Fig. 32) and actuates the advancing mechanism, including the lever 755, in synchronism with the advancing mechanism for the ratchet 730. The lever 755 (Fig. 36) carries a stud 761 arranged to cooperate with a control disk 762 secured on the shaft 315, which, as previously explained, is positioned under control of the transaction keys. The control disk 762 has low spots corresponding to the positions 0, 1, 2, 3, 4, and 9 of the transaction differential, and said disk has high portions on the periphery thereof corresponding to the positions 5, 6, 7, and 8 of the transaction differential mechanism.

It will be noted, by referring to Fig. 35, that the ratchet 735 has six teeth, which correspond to the six notches 750 in the control disk 728, and is in such relation to said control disk 728 that each time said ratchet 735 is advanced one tooth space by the mechanism shown in Fig. 35, a notch 750 is brought opposite the stud 664 in the feed ratchet operating link 659. It will be noted, by referring to Fig. 1, that the low spots on the control disk 762 (Fig. 36) correspond to the transaction keys 79, 80, 85, 81, and 84, and it will likewise be noted that, when said disk 762 is effective to control the operation of the lever 755 to advance the ratchet 735, the control disk 745 is so positioned that the periphery thereof obstructs the stud 744, thus preventing feeding movement of the lever 738 to drive the ratchet 730 (Fig. 32).

When the disk 762 (Fig. 36) controls the operation of the ratchet 735, one of the notches 750 in the disk 728 (Fig. 32) is invariably brought opposite the stud 664, so that, when said disk 762 is effective, the link 659 is free to operate back and forth under the influence of the mechanism shown in Fig. 43 and explained earlier herein to cause the pawl 656 to advance the ratchet 490 one tooth space each machine operation to line-space the table 335 and the statement sheet. Likewise, it will be seen that, when the control disk 745 (Fig. 33) is effective to control the operation of the ratchet 730, the high portions and the notches 750 of the control disk 728 will be brought alternately opposite the stud 664 to render the link 659 effective every other machine operation to advance the ratchet 490 one tooth space to feed the table 335 and the statement sheet.

By referring to Fig. 1, it will be recalled that, in posting an account, the Balance Pickup key 84 will be used first to pick up the old balance, and this key causes the transaction differential to position the control disks 745 and 762 so that a high portion of said disk 745 is opposite the stud 744 and a low portion or a notch in the disk 762 is opposite the stud 761. Consequently, the ratchet 730 having twelve teeth will not operate in this case, and the ratchet 735 having six teeth will operate to cause one of the notches 750 in the control disk 728 to be brought opposite the stud 664. However, in this case, the link 659 is held against operation by the cam 676 (Fig. 44), which at this time is in the "9" position, in which a high portion thereof is opposite the roller 675 to retain the pawl 670 in the path of the bent-over extension 669 to block operating movement of said link 659.

After the balance pickup operation has been performed, if there are debit items, such as checks, to be posted, the amount of the first debit item is set up on the amount keys (Fig. 1), the proper line-finding key or keys depressed to select the next available line on the statement slip, and the Check key 82 depressed to initiate the machine operation. The Check key 82 corresponds to position "6" of the cam 676 and the disks 745 and 762 (Figs. 33, 36, and 44) and positions them accordingly. Therefore, a low portion of the cam 676 will be opposite the roller 675, the notch 746 in the disk 745 will be opposite the stud 744 to render the feeding mechanism for the ratchet 730 effective, and a high portion of the disk 762 will be opposite the stud 761 to disable the feeding mechanism for the ratchet 735. The low portion of the cam 676 would ordinarily permit the pawl 670 to be moved out of the path of the extension 669. However, in this operation, in which the line-finding keys were used to select the first printing line, the latch 678 is effective to block disengaging movement of said pawl 670, in the manner explained earlier herein. It will be recalled that, in the previous balance pickup operation, the disk 728 was so positioned that one of the notches 750 was opposite the stud 664, and, as the cam 742 works later than the cam 662 (Fig. 43), which operates the feed ratchet 490, the link 659 would be free to operate in this check-posting operation, and the table would be line-spaced were it not for the latch 678 (Fig. 43).

Near the end of this first check-posting operation, the cam 742 operates the lever 738 to advance the ratchet 730 one tooth space to move a solid portion of the disk 728 opposite the stud 664. If there is another check to be posted, using the Check key 82 to initiate the second check-posting operation will cause the cam 676 and the disks 745 and 762 to remain positioned as in the previous operation, and, as there is a high portion of the disk 728 opposite the stud 664, the link 659 is blocked against operation, and consequently no movement is imparted to the feed ratchet 490. As a result, the table remains in the same line position.

By referring to Figs. 2 and 3, it will be recalled that the Debit or Check section of the statement sheet is divided into two columns for the entering of two check items on the same line thereof, and the two impression hammers for alternately recording these debit items in the two columns are controlled by selecting disks operated by the ratchets 730 and 735 in exactly the same manner as the disk 728 to invariably print the first check items in the left-hand column of the Debit section and print the second check item in the right-hand column of said Debit section, and so on. This check hammer control mechanism will be explained presently.

After the impression has been made, the cam 742 operates the lever 738 to cause the pawl 763 to advance the ratchet 730 to move the disk 728 so that one of the notches 750 is opposite the stud 664. Therefore, if there is another check item to be entered in a succeeding operation, the link 659 will be free to operate the pawl 656 to advance the ratchet 490 one tooth space to bring the next line of the statement sheet into printing position, so that the third check item will be entered in the left-hand column of the Debit section (Fig. 2) immediately beneath the first debit item. This alternate feeding of the statement sheet will continue indefinitely, as long as the Check key 82 is used.

By referring to the drawings, it will be seen that the Check Correction key 83 operates in exactly the same manner as the Check key 82 to position the cam 676 so that a low portion thereof is opposite the roller 675, to position the disk 745 so that the notch 747 therein is opposite the stud 744, and finally to position the disk 762 so that a high portion thereof is opposite the stud 761. Consequently, the alternate feed mechanism will work in exactly the same manner as explained for the Check key 82.

Assuming that the posting of an account requires the entering of a series of deposits after the Check items have been entered, depression of the Deposit key 81 (Fig. 1) to initiate a deposit operation causes the cam 676 (Fig. 44) to be moved from the sixth position through the fifth position to the fourth position, and, as said cam moves through the fifth position, the high portion or camming lobe in said fifth position, in cooperation with the roller 675, moves the pawl 670 into the path of the extension 669 to permit the latch 678 again to engage the ear 677 to retain the pawl 670 in the path of said extension 669 when the cam moves to the fourth position, which, it will be seen, is a low position.

Positioning of the transaction differential under the influence of the Deposit key likewise moves the disks 745 and 762 so that the fourth positions thereof are opposite the studs 744 and 761 to render the operating mechanism for the ratchet 730 inoperative and to render the operating mechanism for the ratchet 735 operative.

Inasmuch as a deposit item is printed in a different section of the statement sheet from the checks, it is desirable that the first of these deposit items be entered on the same line as the last check item, and, regardless of whether a notch 750 or a solid portion of the disk 728 is opposite the stud 664, the latch 678 (Fig. 44) is effective to prevent operation of the table-feeding mechanism during this first deposit operation. In this first deposit operation, the cam 760 will operate the pawl 753 to advance the ratchet 735, and, regardless of whether one of the notches 750 or a solid portion of the disk 728 was opposite the stud 664 in the succeeding operation, movement of the ratchet 735 will bring one of the notches 750 opposite said stud 664 in the latter part of the first deposit operation. Near the end of the first deposit operation, the mechanism shown in Fig. 43 and explained earlier herein disengages the latch 678 so that the pawl 670 will move out of the path of the extension 669.

If there is a second deposit item to be posted, use of the Deposit key 81 for this second deposit operation causes the cam 676 and the disks 745 and 762 to remain positioned as in the first deposit operation. Consequently, near the end of this second deposit operation, the mechanism shown in Fig. 35 will function to advance the disk 728 so that the next succeeding notch 750 therein will be brought opposite the stud 664. However, prior to the advancing of the disk 728, as explained immediately above, the mechanism shown in Fig. 43 functions, and, inasmuch as there is a notch 750 opposite the stud 664, and as the pawl 670 (Fig. 44) no longer blocks the link 659, said link will function to advance the table 335 and the statement sheet thereon one line-space prior to operation of the impression mechanism. Therefore, the next deposit item will be printed immediately beneath the first deposit item. For each additional deposit item posted, the table and the statement sheet will be advanced in exactly the same manner as explained above.

By referring to the drawings, it will be seen that the Deposit Correction key 80 (Fig. 1) functions in exactly the same manner as the Deposit key 81 to cause the statement sheet to be line-spaced after each deposit correction entry. It is considered advisable to explain that the service charges and other debit items are entered in the Debit section of the statement sheet in exactly the same manner as explained above for checks, by using the Check key 82, and that credit items other than deposits are likewise handled in exactly the same manner as deposits, the symbol keys 90 (Fig. 1) being used to distinguish these debit and credit items.

After all the deposit or credit items have been entered, the next step in a posting operation is a new balance operation, and it will be recalled that depression of the New Balance key 74 causes the differential mechanism for the transaction keys to be positioned in ninth position, and, if the balance totalizer is overdrawn, the New Balance key is locked against depression and is unlocked by depressing first the Overdraft key 86, and in this case the differential mechanism for the transaction keys is positioned at zero. In new balance operations, the cam 676 (Fig. 44) is positioned at either 9 or 0, both of said positions bringing high portions of said cam opposite the roller 675 to move the pawl 670 into the path of the extension 669 to prevent operation of the link 659 and the table-feeding mechanism. This causes the new balance to be printed on the same line as the last deposit item, which is the result desired, as the new balance is printed in a different column of the statement sheet from the deposit items and is also simultaneously printed in the ledger section of said statement sheet.

If the posting of an individual checking account comprises two debit or check items, one credit or deposit item, and a new balance, all of these entries are made on one line, as shown in line 37 of the statement sheet 343 (Fig. 2). The two check or debit items are entered in exactly the same manner as explained hereinbefore, and movement of the cam 676 (Fig. 44) from check to deposit position for the entry of the deposit item causes the high portion opposite position "5" of said cam to restore the pawl 670, during which restoration the latch 678 becomes effective to hold said pawl in effective position when the high portion of said cam 676 moves away from said roller 675, and, as a result, the credit or deposit item will be entered on the same line as the two credit items.

Next, the depression of the New Balance key causes the cam 676 to be rotated to ninth position, in which a high portion of the periphery of said cam again moves the pawl 670 into the path of the extension 669 to obstruct feeding movement of the link 659 to cause the new balance to be printed on the same line as the two debit items and the one credit item.

It is considered advisable again to mention that the Overdraft key 79 (Fig. 1) causes the cam 676 to be moved to position "1," in which position the pawl 670 is effective to block feeding movement of the link 659, and the Balance Pickup key 84 causes said cam 676 to be moved to position "9," which likewise renders the pawl 670 effective to prevent feeding of the table and the statement sheet.

*Alining mechanism for the control disks and associated mechanism*

Mechanism shown in Fig. 37 and now to be described is provided for alining the shafts 315, 330, and 732 and the control disks positioned thereby against displacement during machine operations. This mechanism includes three identical disks or star wheels 765, 766, and 767, each having twelve V-shaped notches therein corresponding to the twelve teeth of the ratchet 730, and, naturally, every other tooth of said disks corresponds to the teeth of the ratchet 735. The disk 765 is secured on the shaft 315, which is controlled by the transaction keys; the disk 766 is free on the shaft 315 and has secured thereto a gear 768, which meshes with a gear 769 secured to the shaft 330, which is controlled by the total control plate 73; and the disk 767 is also free on the shaft 315 and has integral therewith a gear 770, which meshes with a gear 771 secured on the shaft 732, which shaft is driven by the ratchet mechanism shown in Figs. 32 and 35.

The V-shaped alining notches in the disks 765, 766, and 767 are adapted to be engaged by a V-shaped alining bar 772 secured on a bent-over portion of one arm of a lever 773 free on a stationary stud 774 and urged clockwise by a spring 775 to normally maintain a roller 776 carried thereby in contact with the periphery of a plate cam 777. After the shafts 315, 330, and 732 (Fig. 37) and their associated disks have been positioned, the cam 777 permits the spring 775 to rock the lever 773 according to the time given in space 5 of the chart (Fig. 47) to engage the alining bar 772 with the teeth of the disks 765, 766, and 767 to retain said shafts and their associated control disk mechanisms against displacement. After printing has been effected, the cam 777 disengages the alining bar 772 from the disks 765, 766, and 767.

Check-counting mechanism

A units bank and a tens bank of keys 72 and 52 respectively, located at the extreme left of the keyboard (Fig. 1) and similar in many respects to the amount banks 71 but disconnected therefrom, are provided for the automatic and the manual counting of checks. The automatic counting of checks is controlled by the Check key 82, and the depression of this key controls the zero stop pawl for the units check-counting bank, which zero stop pawl, in addition to the usual zero stop, also has a stop located in the "1" position of the units bank 72. Depression of the Check key 82 brings this second stop into the path of the differential spider for the units check-counting bank and causes "1" to be added in the check-counting wheels.

The Check Correction key 83, which is used to withdraw or cancel a check erroneously posted, also exercises control over the automatic check-counting banks 72 and 52 and causes "1" to be automatically subtracted from the check-counting wheels to compensate for the withdrawal or cancellation of a check. This subtraction of "1" in the check-counting wheels is effected by adding the complement "99" therein, and depression of the Check Correction key 83 releases the zero stop pawls for the units and the tens check-counting banks to permit the differential mechanisms for said banks to travel full distance to ninth positions to effect the subtraction.

Often it is the practice to have all the checks of a certain class or designation assembled in a bundle, and the total amount of each bundle of checks is set up on the amount keys and entered as a single item by using the Check key 82. In this case, the keys 72 and 52 of the two check-counting banks are used to set up the total number of checks in each bundle and the use of these check-counting keys disables the automatic check-counting mechanism and causes the total number of checks in the bundle to be entered in the check-counting wheels. The check-counting mechanism will now be described in detail.

The banks of check-counting keys 72 and 52 (Fig. 1), are similar in construction to the amount banks 71 (Fig. 4), and each has a differential mechanism including a spider 778 (Fig. 9) for the units keys 72 and a spider 779 (Fig. 11) for the tens keys 52, which are similar to and function in exactly the same manner as the spider 97 for the amount bank shown in Fig. 4. The spider 778 for the units check-counting bank has a stud 780 with a flat surface thereon, which cooperates with a zero stop surface 781 and a surface 782 corresponding to the "1" position of the units differential mechanism on a zero stop pawl 783 free on a shaft 784 journaled in the machine framework. A torsion spring 785, which encircles the shaft 784 and opposite ends of which engage a stud 786 in the stop pawl 783 and a bushing on the rod 101, urges said stop pawls clockwise to normally maintain a tail 787 thereon in contact with the bushing on said rod 101.

The differential spider 779 for the tens check-counting keys 52 carries a stud 788 with a flat surface, which cooperates with a zero stop surface 789 on a zero stop pawl 790 free on the shaft 784 and urged clockwise by a torsion spring 791, which encircles the shaft 784, opposite ends of said spring engaging respectively a stud 792 in the pawl 790 and the bushing on the rod 101 to normally maintain a tail 793 on said pawl 790 in contact with the bushing on the rod 101. The stud 786 carried by the zero stop pawl 783 for the units check-counting bank overlies and cooperates with a lever 795 secured in fixed relationship to a finger 796 by a hub 797 free on the rod 101. The finger 796 (Fig. 9) cooperates with a stud 798 in an upward extension of an arm 799 free on a stud 800 in the key bank framework. The arm 799 has an extending finger 801, which cooperates with a rod 802 supported by a plurality of cranks 803 secured on the zero pawl throwout shaft 204 (see also Fig. 4).

Figure 11:
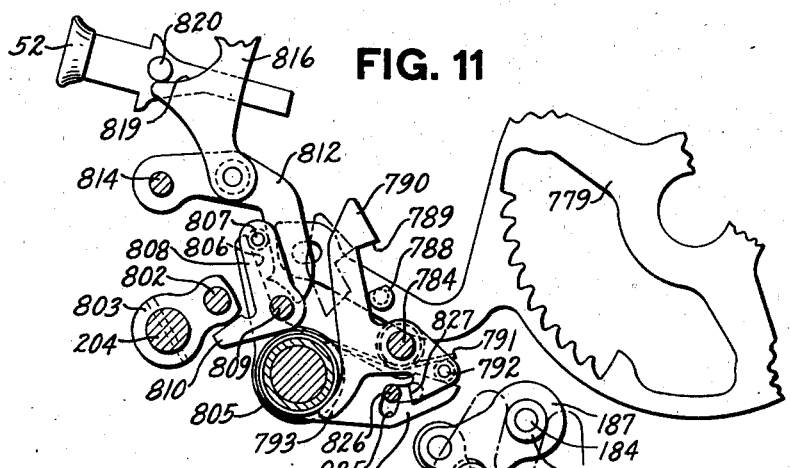
Fig. 11 is a detail view of one of the keys in the tens check-counting bank and a portion of the mechanism associated therewith.

Mechanism similar to that just described for the units check-counting keys is also provided for the tens check-counting keys 52 (Fig. 11). The stud 792 in the zero stop pawl 790 overlies and cooperates with an arm 804 connected by a hub 805 free on the rod 101 to a finger 806, which cooperates with a stud 807 in an upper extension of an arm 808 free on a stud 809 in the tens key frame. An extending finger 810 of the arm 808 cooperates with the rod 802 in the same manner as the finger 801 for the arm 799 (Fig. 9). The studs 798 and 807 (Figs. 9 and 11) in the arms 799 and 808 also cooperate with similar camming surfaces on corresponding levers 811 and 812 pivoted respectively on studs 813 and 814 secured respectively in the units and tens key frames. Loosely connected to the lever 811 is a lever-operating bar 815, the upper end of which is linked in a similar manner to the key frame, so that said bar may be shifted. The bar 815 has a plurality of camming surfaces 817 thereon, which cooperate respectively with studs 818 in each of the units keys 72.

Depression of one of the units keys 72 causes the stud 818, in cooperation with the camming surface 817, to shift the bar 815 downwardly to rock the lever 811 clockwise. Clockwise movement of the lever 811 causes the camming surface thereon, in cooperation with the stud 798, to rock the finger 796, the hub 797, and the lever 795 counter-clockwise. Counter-clockwise movement of the lever 795 is transmitted through the stud 786 to the zero stop pawl 783 to rock said pawl to the second position shown in dot-and-dash lines, to move both the "0" surface 781 and the "1" surface 782 out of the path of the stud 780, so that the spider 778 and the associated differential mechanism will be positioned under the influence of the depressed key 72.

The lever 812 for the tens check-counting bank 52 is loosely connected to the lower end of the control bar 816, similar in every respect to the control bar 815 and having thereon a plurality of camming surfaces 819, which cooperate with studs 820 in each of the tens check keys 52. Depression of any one of the keys 52 rocks the lever 812, which in turn rocks the zero stop pawl 790 for the tens bank counter-clockwise against the action of the spring 791 to the position shown in dot-and-dash lines in Fig. 11 to move the zero stop surface 789 of said pawl out of the path of the stud 788, so that the spider 779 and its associated differential mechanism will be positioned under the influence of the depressed tens check key 52.

In total and sub-total printing operations, the shaft 204 (Fig. 9) is rocked clockwise in the manner explained in connection with Fig. 12, which movement is imparted to the cranks 803 and the rod 802, causing said rod to engage the fingers 801 and 810 of the arms 808 and 799 (Figs. 9 and 11) to rock said arms counter-clockwise. Counter-clockwise movement of the arms 799 and 808, by means of the studs 798 and 807, rocks the fingers 796 and 806 and the levers 795 and 804 counter-clockwise in unison therewith. Counter-clockwise movement of the levers 795 and 804 is transmitted through the studs 786 and 792 to the respective zero stop pawls 783 and 790 to rock said pawls to ineffective positions as explained above, so that the spiders 778 and 779 are free to be positioned by the check-counting wheels, so that the total number of checks may be recorded, as will be explained more fully later.

Figure 8:
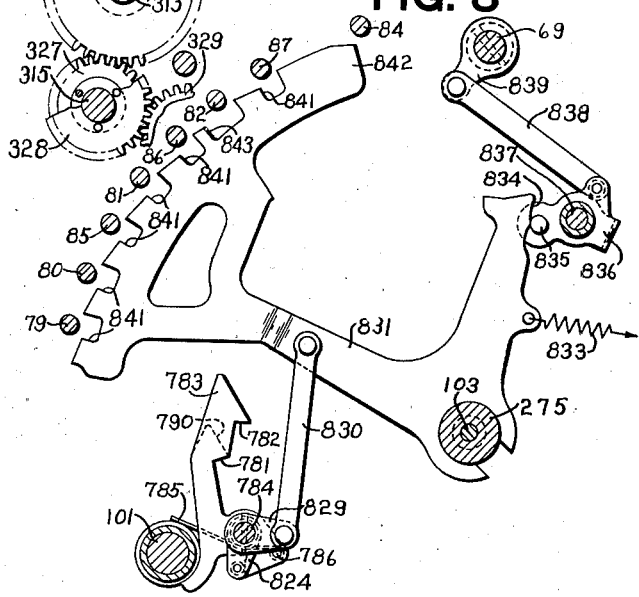
Fig. 8 is a detail view of a control plate associated with the transaction keys for controlling the automatic check-counting mechanism.

The lever 795 (Fig. 9) for the units check-counting keys has an L-shaped slot 821, through which extends a stud 822, said stud also adapted to cooperate with a projection 823 on the zero stop pawl 783. The stud 822 (Figs. 9 and 10) is secured in a crank 824 secured on the shaft 784. The lever 804 (Figs. 10 and 11) has an L-shaped slot 825, through which extends a stud 826, which also cooperates with a projection 827 on the zero stop pawl 790 for the tens check keys 52, and said stud 826 is secured in a crank 828 in turn secured to the shaft 784. The shaft 784, which, it will be recalled, extends the full length of the machine, has secured near the right-hand end thereof a crank 829 connected by a link 830 to a control segment 831 for the transaction keys, said segment rotatably supported on a bushing 832 similar to and in axial alinement with the bushing 99 (Fig. 4) for the amount bank here shown. A spring 833 urges the segment 831 clockwise to maintain a camming surface 834 thereon (Figs. 8 and 10) in contact with a stud 835 in one arm of a yoke 836 free on a rod 837 supported by the key bank support plates. The yoke 836 is connected by a link 838 to a crank 839 secured to the key lock shaft 69.

Clockwise movement of the key lock shaft 69 (Fig. 8) when the machine is released for operation, as explained in connection with Fig. 4, through the link 838, rocks the yoke 836 counter-clockwise to move the stud 835 away from the raised portion of the cam surface 834 to permit the spring 833 to yieldingly urge the segment 831 in a clockwise direction. Each of the transaction keys 79, 80, 85, 81, and 87 has therein a stud (Figs. 1 and 8), which, when any one of said keys is depressed, is adapted to move into a corresponding notch 841 in the peripheral surface of the segment 831 to obstruct clockwise movement of said segment by the spring 833 when the key lock shaft 69 is rocked clockwise upon release of the machine for operation.

The transaction key 84 has therein a stud, which moves into the path of a shoulder 842 on the right-hand end of the peripheral portion of the segment 831 to obstruct clockwise movement of said segment 831. Consequently, when any one of the keys just named is depressed, the segment 831 will be rendered inoperative. The Check key 82 has therein a stud adapted to cooperate with a notch 843 in the peripheral surface of the segment 831, said notch 843 being substantially larger than the notches 841, thus providing enough clearance between the left-hand or lower wall of said notch and the stud in the Check key 82 to permit partial movement of the segment 831 under the influence of the spring 833 when the key lock shaft 69 is rocked at the beginning of machine operation. This partial clockwise movement of the segment 831 through the link 830 rocks the crank 829, the shaft 784 (Figs. 8, 9, and 10), the crank 824, and the stud 822 counter-clockwise a sufficient distance to cause said stud 822, in cooperation with the extension 823 of the zero stop pawl 783, to rock said pawl counter-clockwise against the action of the spring 785 to move the "0" stop surface 781 thereon out of the path of the stud 780 and to move the "1" stop surface 782 into the path of said stud, so that, upon machine operations, when the Check key 82 is depressed, the differential mechanism for the units check-counting keys 72 and including the spider 778 will be moved to "1" position under the influence of the surface 782 instead of being stopped in zero position. This permits "1" to be counted automatically in the check-counting wheels.

A transfer mechanism between the units and the tens counting wheels effects the transfer of the tens digit to the tens accounting wheel when the units wheel passes through zero. The check-counting wheels are mounted on the No. 1 or balance totalizer line (Fig. 4), and, as this is an add-subtract totalizer and is adapted to be shifted laterally to bring either the plus or the minus side thereof into engaging relationship with the amount actuators, it is necessary to provide two wheels in each order of the check-counting banks to take care of this condition. The two wheels in each order of the check-counting banks are not geared together for reverse rotation, as are the wheels of the balance totalizer, but instead are secured in fixed relationship to each other, and in effect function the same as one adding wheel. This makes it possible to add checks in the check-counting wheels when the balance totalizer is in subtract position under the influence of the Check key 82 and also makes it possible to take a sub-total or a total of the check-counting wheels when either the plus or the minus side of the balance totalizer is sub-totalized or totalized.

When the shaft 784 is moved a partial distance by depression of the Check key 82, as explained above, the crank 828 (Figs. 10 and 11) and the stud 826 for the tens check-counting keys 52 are moved in unison therewith. However, it will be noted, by referring to Fig. 11, that sufficient clearance is provided between said stud 826 and the extension 827 on the zero stop pawl 790 for the tens keys and that no movement is imparted to said zero stop pawl 790, and, as a result, the stop surface 789 remains in the path of the stud 788 and positions the differential mechanism for the tens check-counting bank at zero.

The Check Correction key 83, as previously explained, is used for correcting a check or debit item which was erroneously entered in a previous operation, and, as this previously-entered check, which is being cancelled in the present operation, was automatically counted by the check-counting mechanism, it is necessary to subtract "1" from the check-counting wheels when a Check Correction operation is performed.

By referring to Fig. 10, it will be noted that the Check Correction key 83 has no stud, as have the other transaction keys, and no notch is provided therefor in the periphery of the segment 831. Consequently, depression of the Check Correction key permits full clockwise movement of the segment 831 upon release of the machine for operation, and this full movement is imparted to the shaft 784, the crank 824, and the stud 822 (Figs. 9, 10, and 11) to rock the zero stop pawl 783 for the units check-counting keys 72 full distance to move both surfaces 781 and 782 out of the path of the stud 780. Full movement of the shaft 784, the crank 828, and the stud 826 causes said stud 826, in cooperation with the extension 827, to move the zero stop pawl 790 full distance counter-clockwise to move the zero stop surface 789 thereon out of the path of the stud 788. This frees the differential mechanism for both the units and the tens check-counting banks for full movement to the "9" position to cause the complementary figure "99" to be added in the check-counting wheels, which in effect is the same as subtracting "1" from said wheels.

At times, the Check key 82 (Fig. 1) is used in connection with the amount keys 71 to post items other than checks, and in this case it is desirable to render the automatic check-counting mechanism inoperative. One such debit item, and probably the most commonly used in connection with checking accounts, is the "service charge" for handling the depositors' checking accounts, and when this item is posted, the automatic check-counting mechanism is disabled by depression of the "SC" symbol key 90, which is always used to designate service charge items. At times, it is desirable not to have the automatic check-counting mechanism function in connection with the posting of checks or other debit items, and depression of the "NC" symbol key 90 disables the automatic check-counting mechanism, so that these items will not be counted.

Secured on the shaft 784 (Fig. 10) is a crank 844 connected by a link 845 to a control segment 846 for the symbol keys 90, said segment being pivoted on the bushing 832 adjacent the control segment 831. A spring 847 urges the segment 846 clockwise to maintain a camming surface 848 on an extension thereof in engagement with the stud 835 in exactly the same manner as explained for the segment 831. The "service charge" symbol key 90 (Figs. 1 and 10), designated by the letters "SC," and the "non-count" symbol key, designated by the letters "NC," each has therein a stud adapted to cooperate with corresponding projections 849 and 850 formed on the peripheral surface of the segment 846.

The manner in which the segment 846 is linked to the shaft 784 causes said segment to be operated in unison with the segment 831 when the key lock shaft 69 (Fig. 8) is rocked clockwise by the initiation of machine operation. Depression of either the "service charge" symbol key 90 or the "non-count" symbol key 90 moves the stud carried by the depressed key into the path of the corresponding projection 849 or 850 to block clockwise movement of the segments 846 and 831 to prevent operation of the automatic check-counting mechanism, even if the Check key 82 is depressed. The depression of either of these keys likewise causes an identifying character to be printed opposite the corresponding amount on the statement sheet.

Inasmuch as the Check key 82 (Fig. 1) is used in conjunction with the Sub-Total key 76 and the Clear key 77 either to read or to clear the check totalizer on the No. 2 line, it is necessary to provide means under control of the Sub-Total and the Total keys 76 and 77 and the other total keys to prevent operation of the automatic check-counting mechanism at this time.

Referring now to Figs. 1, 7, and 10, a total row control bar 857 is mounted for circular shifting movement by means of slots therein in co-operation with two studs 858 in the total key framework. The bar 857 has a plurality of camming projections 851, which cooperate respectively with studs in each of the control keys 74 to 78 inclusive and the Balance Forward key 88. The lower end of the bar 857 has a slot, which embraces a stud 852 in a latch 853 free on the rod 101 and having an L-shaped slot 854 in a right-hand extension thereof, through which extends a stud 855 in a crank 856 secured on the shaft 784.

Depression of one of the control keys 74 to 78 inclusive or of the Balance Forward key 88 causes the stud therein, in cooperation with the corresponding camming projection 851, to shift the control bar 857 downwardly to rock the latch 853 counter-clockwise to cause the vertical branch of the L-shaped slot 854 to latch over the stud 855 to secure the crank 856 and the shaft 784 against movement to prevent the automatic check-counting mechanism from functioning. When none of the total control keys is depressed, the horizontal branch of the L-shaped slot 854 is opposite the stud 855, as shown in Fig. 7, and permits unobstructed operation of the shaft 784.

Depression of any one of the units check-counting keys 72 (Fig. 9) causes the stud 818 therein, in cooperation with the camming surface 817 on the control bar 815, to rock the lever 811 clockwise, causing the camming surface thereon, through the stud 798 and the finger 796, to rock the lever 795 counter-clockwise to move the vertical branch of the L-shaped slot 821 in said arm over the stud 822 to block movement of the shaft 784, thereby disabling the automatic check-counting mechanism when a units check-counting key 72 is depressed. Similar mechanism, illustrated in Fig. 11 and explained hereinbefore, is provided for the tens check-counting keys 52, and, when any one of these keys is depressed, the arm 804 therefor is rocked counter-clockwise to move the vertical branch of the L-shaped slot 825 over the stud 826 to lock the shaft 784 against movement, thereby disabling the automatic check-counting mechanism when any one of the tens check-counting keys 52 is depressed, even though the Check key 82 (Fig. 1) is used to initiate machine operation.

An example of the necessity of the latching mechanism described above to prevent operation of the shaft 784 when the check-counting keys 72 and 52 are depressed is the setting up of the number "20" on the check-counting keys. In this case, the "2" key in the tens check-counting row is depressed, and no key is depressed in the units row. Inasmuch as the Check key 82 is used to initiate an operation of this type, the "1" surface 782 of the zero stop 783 for the units bank would in this case be moved into the path of the stud 780 to cause "1" to be automatically added in the units order of the check-counting wheels were it not for the latch mechanism shown in Fig. 11, which latches the shaft 784 against movement, so that the "0" surface 781 of the zero stop pawl 783 will remain in the path of the stud 780 to position the differential for the units check-counting bank at zero.

The latching of the slots 821 and 825 over the studs 822 and 826 upon operation of the throw-out shaft 204 and the rod 802 in sub-total or total-printing operations is purely incidental, due to the construction of the mechanism, and performs no essential function, as depression of any one of the total control keys 74 to 78 inclusive or the Balance Forward key 88 has already latched the shaft 784 against movement before the shaft 204 receives sufficient clockwise movement to latch said shaft 784 against movement.

*Alternate control of check-printing mechanism*

By referring to Figs. 2 and 3, it will be remembered that debit items or checks are printed in two columns of the Debit section of the combined statement and ledger sheet, and for this reason it is necessary to alternately control the two check-printing hammers so that one is effective during one operation and the next one is effective during the next operation, and so on. Fig. 22 shows the alternate control mechanism for controlling the printing movement of the hammer which prints in the left-hand column of the Debit section of the statement sheet, and, as this mechanism is substantially duplicated for the right-hand column, it is believed that a description of the mechanism shown in Fig. 22 will be sufficient.

The alternate feed control shaft 732 is operated by the ratchet mechanism shown in Figs. 32, 34, and 35 in the manner explained above, and this shaft 732 has secured thereon a gear 859 (Fig. 22), which meshes with another gear 860 fast to an alternate control disk 861 free on the shaft 315. The disk 861 has six notches 862, which are equally spaced from each other in exactly the same manner as the notches 750 in the control disk 728 (Fig. 32.) The total control shaft 330, which is controlled by the total control keys in the manner explained earlier herein, has secured thereto a gear 863, which meshes with a similar gear (not shown) secured to a total control disk 864 free on the shaft 315. The disk 864 has a notch 865 corresponding to the adding position of the total control plate 73, said disk 864 being similar in every respect to the disk 666 (Fig. 43) in that the notch 865 corresponds to the adding position of the total control plate 73. Secured on the shaft 315, which, it will be recalled, is positioned by the transaction keys, is the control disk 866 having two notches (not shown), which correspond respectively to positions "6" and "8" of the transaction differential. It will be recalled that positions "6" and "8" are the Check and the Check Correction positions, respectively.

The three control disks 861, 864, and 866 (Fig. 22) have cooperating therewith three of the four upper feeler fingers 867, and, in addition, the total control disk 864 has cooperating therewith a lower feeler finger 868, said fingers being assembled in a unit and pivoted on a stud 869 carried by a crank 870 connected by a hub free on the shaft 512 to a companion arm 871. A spring 872 urges the arm 871 into engagement with a stud 873 in an operating arm 874 free on the shaft 512 and secured to an operating arm 875, which is operated by a cam mechanism the movement of which is shown in space 7 (Fig. 47), said cam mechanism not being here shown, but similar to that disclosed in the Arnold Patent No. 2,141,332. A link 876 connects the arm 871 to a pitman 877 having in the forward end thereof a stud 878, which is adapted to be engaged with a notch 879 in a hammer-operating lever 880 free on the rod 498. The lever 880 has in the upper end thereof a stud 881 free in one end of a toggle link 882, the upper end of which is pivotally connected to a check-printing hammer 883 free on the shaft 528. The printing hammer 883 carries a printing block 884, which when the hammer is operated, is moved upwardly through one of the openings 340 in the table 335 and carries the statement sheet 343 and a superimposed inking ribbon 885 into engagement with the amount type wheels 153 for the first or left-hand column of the Debit section of said statement sheet. An eccentric adjustment 886 between the lever 880 and the link 882 is provided for adjusting the impression block 884 in relation to the amount type wheels 153, so that the proper impression may be secured. The rearward end of the operating pitman 877 is pivotally connected to an arm 887 connected by a hub 888 free on the rod 438 to a companion arm 889. The arms 887 and 889 carry, respectively, rollers 890 and 891, which cooperate with the peripheries of companion plate cams 892 and 893 fast on the printer shaft 371, said cams operating according to the time given in space 8 of the time chart (Fig. 47).

Counter-clockwise movement of the arms 875 and 874, under the influence of their cam mechanism, through the spring 872, carries the arm 871 in unison therewith to cause the feeler fingers 867 and 868 to feel the control disks 861, 864, and 866. Inasmuch as the periphery of the control disk 864 is always opposite the feeler finger 868, this finger never engages a notch and therefore is always effective to prevent operation of the hammer mechanism unless three notches in the disks 861, 864, and 866 are opposite the corresponding three fingers 867 to permit the arm 871 to receive sufficient movement to engage the stud 878 with the notch 879, whereupon operation of the cams 892 and 893 causes the hammer mechanism to function.

The fourth feeler finger 867 cooperates with an arcuate surface on the segment 531 (Fig. 22), which, it will be recalled, is controlled by the slip feeler mechanism shown in Fig. 40 and explained earlier herein. Consequently, when no slip is placed upon the table 335, the arcuate surface of the segment 531 moves in front of the corresponding feeler finger 867 to prevent the stud 878 from being engaged with the notch 879, and, as a result, the impression hammer will not function. As the notches in the transaction control disk 866 correspond to the Check and Check Correction keys, it is necessary to depress one of these keys to bring the corresponding notch opposite the corresponding feeler finger 867 before the stud 878 can be engaged with the notch 879. Likewise, it is necessary that the total control plate 73 be in adding position to bring the notch in the total control disk 864 opposite the corresponding finger 867 before the stud 878 can be connected to the notch 879.

Inasmuch as the finger 868 is always prevented from moving inwardly by the total control disk 864, it is necessary that all four feeler fingers 867 be unobstructed before the stud 878 can be connected to the notch 879 to render the hammer 883 operative. The control disk 861 (Fig. 22) is so geared to the alternate drive shaft 732 that, each time a balance pickup or an overdraft pickup operation is performed, the ratchet 735 (Fig. 35), which is effective at this time, brings one of the notches 862 in said disk 861 opposite the corresponding feeler finger 867, and said notch remains thus positioned in front of the corresponding feeler finger long enough in the succeeding check operation to permit the feeler arm 871 to function, and, inasmuch as the feeler fingers 867 are all free to move inwardly, the stud 878 will be connected to the notch 879, and consequently the cams 892 and 893 will operate the printing hammer 883 to print the amount of the first debit item or check in the first or left-hand column of the debit section of the statement slip.

After printing has been effected, the ratchet 730 (Fig. 32), which has been rendered effective by depression of the Check key 82, is advanced one tooth space to move the notch 862 out of the path of the corresponding feeler 867 and to move the solid portion of the periphery of the control disk 861 into the path of said feeler. Consequently, in the next check-posting operation, the hammer mechanism shown in Fig. 22 will be renderd inoperative, as the upper feeler fingers 867 will be blocked against inward movement, and consequently the stud 878 will not be engaged with the notch 879. It will be noted that the stud 878 in the forward end of the pitman 877 moves along a camming surface 894 on the lever 880 to rock said lever clockwise when the pitman 877 is moved upwardly, to move a raised surface on the forward edge of said lever into engagement with the tie bar 66 to rock the hammer 883 downwardly, as here shown, so that the impression block 884 is beneath the table 335.

From a comparison of spaces 7, 8, and 14 of the time chart (Fig. 47), it will be seen that the cams in space 7 control the feeling movement of the arm 871 to engage the stud 878 with the notch 879, the cams in space 8 control the movement of the pitman 877 to operate the printing hammer 883, and space 14 shows the timing of the cam 742 (Fig. 32) to operate the ratchet 730. From this comparison it will be seen that the cams (spaces 7 and 8) which control the feeler action of the arm 871 (Fig. 22) and the operation of the hammer 883 function before the cam 742 (space 14), which actuates the advancing mechanism for the ratchet 730. Consequently, the notch 862 in the control disk 861 (Fig. 22), which was moved opposite the corresponding feeler finger 867 in the balance pickup or overdraft pickup operation just preceding the first check-posting operation, by the ratchet mechanism shown in Fig. 35, will remain opposite said finger 867 until after the printing mechanism functions.

The printing mechanism for the second or right-hand column of debit items or checks in the Debit section of the statement sheet (Fig. 2) is exactly like the mechanism just explained for the first row of said checks, with this exception, that the alternate feed control disk for the right-hand hammer, which disk is in every respect like the disk 861 and has six notches therein, is located in relation to the alternate feed shaft 732, so that, when one of the notches 862 in the disk 861 is opposite the corresponding feeler 867, a solid portion of the control disk for the right-hand hammer will be opposite the corresponding feeler finger for the right-hand printing mechanism. This staggering of the disks controlled by the alternate feed shaft 732 for the right- and left-hand check-printing hammers causes said hammers to work alternately as long as either the Check key 82 or the Check Correction key 83 is used for posting debit or debit correction items.

Inasmuch as this is substantially the only difference between the printing mechanisms for the left-hand and the right-hand Check columns in the Debit section, and inasmuch as it can readily be seen that staggering the disks for the two hammers for said columns in relation to each other will cause said hammers to operate alternately, it is believed that illustration and further description of the hammer mechanism for the right-hand Check column are unnecessary

MODE OF OPERATION

It is believed that a full understanding of the operation of the machine embodying the present invention will have been otbained from a study of the preceding specification; however, a brief outline of operation will be given, using the plan view of the keyboard shown in Fig. 1, and the combined statement and ledged sheets shown in Figs. 2 and 3, as a basis.

In the majority of banking institutions, all active checking accounts are usually balanced or posted once each day. This balancing or posting takes place on a combined statement and ledger sheet or slip similar to those shown in Figs. 2 and 3, and at the end of the month the ledger portion of the statement sheet is separated from the statement portion and retained by the bank as a record, while the statement portion of said sheet is given to the depositor whose account it contains. The posting of checking accounts includes the picking up of the previous or old balance, the subtracting of debit items, such as checks, service charge, etc., from said old balance, the adding of credits, such as deposits, interest due, etc., to said old balance, and the taking of a new balance.

Assuming that John Doe's account for the previous month of December, 1939, has just been completed and that it is desired to carry the balance forward from this old statement sheet to the new statement sheet shown in Fig. 2 for the month of January, 1940, the operator places the new statement sheet 343 on the table 335 (Fig. 19) between the guides 345 and 346 and forces the upper edge of said statement sheet into contact with the stop blocks 347 to properly locate said sheet in relation to the printing mechanism. Next, the amount of the previous balance is obtained from the old statement sheet and is set up on the amount keys 71 (Fig. 1), and the Balance Forward key 88 is depressed, after which the Balance Pickup key 84 is depressed, if the balance is a positive one, or the Overdraft Pickup key 79 is depressed, if the balance is a negative one, and, as said keys 79 and 84 are operating keys, operation of the machine is initiated by depression thereof.

Depression of the Balance Forward key 88 in conjunction with the keys 79 and 84 renders the printing mechanism effective to cause the Balance Forward—in this case, $5,000.00— to be printed in the proper columns of the Balance sections of the statement and ledger portions of the sheet 343. At the same time that the Balance Forward is printed, the date, January 1, 1940, is printed in the Balance section of the statement and ledger portions of the sheet 343. Depression of the Balance Forward key 88 causes the symbol "F," which indicates a balance forward operation, to be printed just to the right of the amount of the previous balance. It will be noted that the balance forward is printed in a space provided therefor just above the first line of the combined statement and ledger sheet. It will likewise be noted that, during this balance forward operation, the statement sheet is not advanced.

Next, the amount of the first debit item, $25.00, is set up on the amount keys 71 and the "1" line-finding key 449 (Fig. 29) is depressed, after which the Check key 82 is depressed to initiate machine operation. During this machine operation, the mechanism under control of the line-finding keys and shown in Figs. 25A, 25B, 26A, and 26B causes the table 335 to position the statement sheet 343 so that the first line thereon is opposite the printing mechanism, after which the printing mechanism functions to record the amount of the check, $25.00, on line "1" and in the left-hand or first column of the Debit section of said statement sheet. Also in this operation, the amount of the check, $25.00, is added in the Check totalizer on the No. 2 line and is subtracted from the old balance of $5,000.00, which was entered in the plus side of the No. 1 or balance totalizer during the Balance Forward operation.

The second check item of $25.00 is set up on the amount keys 71, and the Check key 82 depressed to initiate machine operation, during which the amount of the check is deducted from the amount in the balance totalizer and is simultaneously printed on line "1" and in the right-hand or second column of the Debit section of the statement sheet. The alternate control mechanism shown in Fig. 22 causes the left-hand and the right-hand hammers to operate alternately to print the two check items of $25.00 in the right-hand and the left-hand columns of the Debit section of the statement sheet, and the alternate control mechanism for the table feed, shown in Figs. 32, 35, and 43, controls the automatic table-feeding mechanism to cause both of said check items to be printed upon line "1" of the statement sheet.

The amount of the third check, $50.00, is next set up on the amount keys 71, and the Check key 82 is depressed to initiate operation of the machine, during which the alternate control mechanism for the table feed causes the table 335 and the statement sheet 343 to be advanced to line 2, after which the left-hand check hammer functions to print the amount of the check, $50.00, on line 2 and in the left-hand column of the debit section of the statement sheet, and the amount of the check, $50.00, is subtracted from the amount in the balance totalizer simultaneously.

The next item in this particular posting operation is a deposit of $100.00, the amount of which the operator sets up on the amount keys 71, after which the Deposit key 81 is depressed to initiate operation of the machine, during which the amount of the deposit, $100.00, is printed on line 2 and in the Credit section of the statement sheet and is simultaneously added to the amount in the balance totalizer and added in the deposit totalizer on the No. 2 line. The alternate feed control mechanism causes the credit or deposit item of $100.00 to be printed on the same line (line 2) as the last check item of $50.00, in the manner explained in connection with Figs. 32 to 36 inclusive and Figs. 43 and 44.

The three checks and the one deposit constitute all the items to be posted on this particular day, and the posting operation is completed by the operator's depressing the New Balance key 74 (Fig. 1) to initiate a new balance operation, during which the No. 1 or balance totalizer is cleared, and the amount therein, in this case $5,000.00, is printed on line 2 in the Balance section of both the statement and the ledger portions of the sheet. During the printing of the new balance of $5,000.00, the date, January 2, 1940, which has previously been set up manually on the dating device, is printed at the same time as the new balance. Inasmuch as depression of the New Balance key 74 causes the differential mechanism for the transaction row to be automatically positioned in ninth position, the cam 676 (Fig. 44) blocks operation of the line-feeding mechanism; consequently, the new balance is printed upon the same line (line 2) as the last check and deposit. An identifying characteristic is printed to the right of the new balance on both the Balance sections of the statement and ledger portions of the sheet.

The automatic check-counting mechanism, shown best in Figs. 9, 10, and 11, causes "one" to be added in the check-counting wheels each time a debit item is posted. During a new balance operation, the check-counting wheels, which are mounted on the No. 1 line, are reset, and the total number of the checks therein, in this case three, is printed between the date and the new balance on the ledger portion of the statement sheet. At the end of the new balance operation, the mechanism shown in Fig. 38 releases the table 335 to spring action, which immediately restores said table to home position, in which it is shown in Fig. 19.

The next posting of John Doe's account takes place on January 3, and, as before, John Doe's statement sheet 343 is properly placed on the table 335 and the amount of the previous balance $5,000.00, is set up on the amount keys 71 (Fig. 1), and, as this is a positive balance, the Balance Pickup key 84 is depressed to initiate machine operation, during which the balance of $5,000.00 is added into the previously-cleared balance totalizer, and, as the Balance Forward key 88 was not used in conjunction with said Balance Pickup key, the old balance of $5,000.00 is not printed upon the combined statement and ledger sheet.

Next, the first item, a $100.00 deposit, is set up on the amount keys 71, after which the Deposit key 81 is depressed to cause the deposit item to be added to the amount in the balance and deposit totalizers and simultaneously recorded in the Credit column of the statement sheet. After posting the first deposit item of $100.00, the operator discovers that a mistake has been made and that said item should not have been posted. To rectify this mistake, the amount of the erroneously-posted deposit, $100.00, is again set up on the amount keys 71, after which the Deposit Correction key 80 is depressed to initiate machine operation, during which the amount of the erroneous deposit, $100.00, is subtracted from the amount in the balance totalizer and simultaneously subtracted from the deposit totalizer on the No. 2 line. Depression of the Deposit Correction key 80 also causes the amount of the erroneously-entered deposit, $100.00, to again be printed in the Credit section of the statement sheet and also causes the symbol "EC," meaning "Error Correction," to be printed to the left of this amount.

Next, the amount of another deposit, $300.00, is set up on the amount keys, and the Deposit key 81 is depressed to initiate machine operation, during which said deposit is added in the balance and deposit totalizers and is simultaneously recorded in the Credit section of the statement sheet. As the $300.00 deposit is the last item to be posted on January 3, the operator next depresses the New Balance key 74 to initiate a new balance operation, during which the balance totalizer is cleared, and the amount therein and the date, January 3, are printed in the Balance columns of both the statement and ledger portions of the sheet.

A correction of an erroneously-entered debit or check is shown in line 6 (Fig. 2), and in this case the amount of the erroneously-entered check is set up on the amount keys, and the Check Correction key 83 is depressed to initiate machine operation, during which the amount of the erroneously-entered check, $35.00, is added in the balance totalizer and subtracted from the check totalizer on the No. 2 line.

It will be recalled that there are two add-subtract totalizers on the No. 2 totalizer line, one for the storing of a total of checks and the other for the storing of a total of deposits. As the debit items are posted and subtracted from the balance totalizer, they are simultaneously added in the check totalizer, and, as the credits or deposits are added in the balance totalizer, they are simultaneously added in the deposit totalizer. In a deposit correction operation, the amount of the deposit being corrected is subtracted from the deposit totalizer on the No. 2 line at the same time that it is being subtracted from the balance totalizer, and, in the correction of checks, the amount of the corrected check is subtracted from the check totalizer on the No. 2 line at the same time that it is being added in the balance totalizer.

Line 37 of the statement sheet 343 (Fig. 2) shows how two debits or checks, one deposit, and the new balance are all printed on one line of the statement sheet when these are the only items to be listed in the posting of an account.

It will be recalled, by referring to Fig. 38, that when the table 335 moves to last or 39th line position, the stud 721 rocks the latch 718 out of engagement with the stud 717 to render the pawl-releasing mechanism effective, and, after the first item has been entered on the 39th or last line, this mechanism functions to release the table 335 to the action of the table return springs, which immediately return said table to home position. This condition is illustrated in line 39 of the statement sheet 343. In the posting of John Doe's account for January 27, the operator picks up the previous balance of $4,500.00 in the usual manner and sets up the amount of the first debit item, $100.00, on the amount keys, depresses the proper line-finding keys to select the 39th line of the combined statement and ledger sheet, and releases the machine for operation by depressing the Check key 82. The table 335, in moving to the 39th line position, causes the stud 721 to rock the latch 718 to ineffective position, as explained above, and in the latter part of the machine operation, after the $100.00 check item has been recorded, the mechanism shown in Fig. 38 releases the pawls 656 and 494 to permit return of the table and the statement sheet to home position.

In this case, before starting a new statement sheet for John Doe, the operator again depresses the proper line-finding key to select the 39th line and depresses the Sub-Total New Balance key 75 (Fig. 1) to initiate a sub-total operation, in which the balance totalizer is sub-totalized, and a sub-total of the balance therein, $4,400.00, is recorded on the 39th line in the Balance sections of the statement and ledger portions of the sheet. Use of the Sub-Total New Balance key 75 causes the differential mechanism for the transaction row to be positioned at zero, which position, it will be recalled by referring to Fig. 38, causes the high portion of the cam 723 to disengage the latch 718 to cause the table 335 to be released and returned to home position at the end of such sub-total operations. In the recording of the sub-total on the 39th line, the stud 721 also functions as before to release the latch 718.

In the sub-total operation explained above, the letter "S" is recorded to the right of the amounts of the sub-total on the statement and ledger portions of the sheet. After the table and the statement sheet 343 have been returned to home position at the end of the sub-total operation mentioned above, the operator removes this filled statement sheet from the table and places a new sheet 344 (Fig. 3) thereon and again depresses the Sub-Total New Balance key 75 to cause a sub-total of the previous balance, $4,400.00, to be printed in the space above the first line of the Balance sections of the combined statement and ledger sheet. The entries on lines 1 and 2 of the statement sheet 344 show how an overdraft is handled.

The entries on line 38 of the statement sheet 343 show how the posting of a bundle of checks is handled. In this case, there are 36 checks in one bundle, and the total amount of the checks is $544.00. This amount is set up on the amount keys 71 (Fig. 1), the "LS" symbol key 90 is depressed to identify this as a "list check" operation, and the number of checks in the bundle, 36, is set up on the check-counting keys 52 and 72, after which the Check key 82 is depressed to initiate machine operations. During this operation, the total amount of the list of checks, $544.00, is subtracted from the balance, and the total number of checks, 36, in the bundle or list is simultaneously entered in the check-counting wheels. In the new balance operation which follows, the balance totalizer is cleared, and the amount therein is printed in the Balance sections of the statement and ledger, and the total number of checks, 36, is simultaneously printed in the column provided therefor in the ledger portion of the sheet. It will be recalled that use of the check-counting keys 52 and 72 for setting up the number of checks in a bundle disables the automatic check-counting mechanism, which, if permitted to work at this time, would cause an error in the total number of checks counted.

All the postings on the combined statement and ledger sheets, including balance forwards, debit items, credit items, debit item count, and new balances, are duplicated upon a journal strip 906, a fragment of which is shown in Fig. 18. This duplicate record, in addition to being retained for reference purposes, is also used in proving the correctness of totals at the end of a periodical posting run.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, having means to record items on multi-lined record material, the combination of positionable means to present the record material to the recording means; means including a main shaft and an auxiliary shaft to drive the positionable means; means to connect the auxiliary shaft to the main shaft; means to control the operation of the auxiliary shaft to position the positionable means to select any desired line of the record material for the recording of the first item; means to render the connecting means ineffective after the positionable means is positioned by the auxiliary shaft; and means to control the operation of the main shaft to position the positionable means for the recording of subsequent items.

2. In a machine of the class described, having means to record items on multi-lined record material, the combination of a positionable table to present the various lines of the record material to the recording means; means including a main shaft to drive the table; an auxiliary shaft; means to connect the auxiliary shaft to the main shaft; manually controlled means to operate the auxiliary shaft to position the table to select any desired line of the record material for the recording of the first item; means to render the connecting means ineffective after the positioning means has been positioned by the auxiliary shaft; and automatically controlled means effective after the first item has been recorded to operate the main shaft to position the table for the recording of subsequent items.

3. In a machine of the character described, having means to record items on multi-lined record material, the combination of a positionable table having a home position and various line positions to present the different lines of the record material to the recording means; a main shaft to drive the table; an auxiliary shaft; means rendered effective when the table is in home position to connect the auxiliary shaft to the main shaft; a plurality of line selecting keys; means, including complementary slides, positioned by the keys to operate the auxiliary shaft to move the table from home position to any of its line positions to select any desired line of the record material for the recording of the first item; and automatically controlled means effective after the first item has been recorded and the connecting means is no longer effective to operate the main shaft to position the table for the recording of subsequent items.

4. In a machine of the class described, having means to record various items on multi-lined record material, the combination of means to initiate operation of the machine when a certain item is to be recorded; means to initiate operation of the machine when another item is to be recorded; a positionable table to present the various lines of the record material to the recording means; means to position the table to select the desired line of the record material for the recording of the first item; means effective after the first item has been recorded to advance the table line by line, beginning with the selected line; means controlled by the first initiating means to cause the advancing means to advance the table one line every other or second machine operation; and means controlled by the other initiating means to cause the advancing means to advance the table every machine operation for the recording of subsequent items.

5. In a machine of the class described, having means to record various items on multi-lined record material, the combination of means to initiate machine operation when a certain item is to be recorded; means to initiate machine operation when another item is to be recorded; a positionable table to present the record material to the recording means; means to position the table to select any desired line of the record material for recording the first item; means including a ratchet device effective after the first item has been recorded to advance the table line by line from the previously selected line to record subsequent items; means controlled by the first initiating means to cause the ratchet device to operate every other or second machine operation to line space the table and record material accordingly; and means controlled by the second initiating means to cause the ratchet device to operate every machine operation to line space the table and record material accordingly for the recording of subsequent items.

6. In a machine of the class described, having means to record various items on multi-lined record material, the combination of a positionable table having a home position and various line positions to present the various lines of the record material to the recording means; a main shaft to drive the table; an auxiliary shaft; a differential device to connect the auxiliary shaft to the main shaft; means rendered effective when the table is in home position to cause the differential device to transmit movement of the auxiliary shaft to the main shaft; depressible line selecting keys; means rendered effective by the depressed line selecting keys to operate the auxiliary and the main shafts to position the table to select the desired line of the record material for recording the first item; means including a ratchet device effective after the first item has been recorded on the selected line and the differential device is no longer effective, to operate the main shaft to advance the table and record material line by line from said selected line to record subsequent items; and automatic means to control the operation of the ratchet device to cause the table to be line-spaced every other machine operation when items of a certain classification are being recorded, and to cause the table to be line spaced every machine operation when items of another classification are being recorded.

7. In a machine of the class described, having means to record various items on the various lines of record material, the combination of a plurality of control keys to effect the recording of various items; a table having a home position and various line positions to present the record material to the recording means; a main shaft to position the table; line selecting keys; an auxiliary shaft; means to transmit the value of the line selecting keys to the auxiliary shaft; a differential device intermediate the main and auxiliary shafts, said device having a normally idle portion which when held stationary causes said differential device to transmit movement of the auxiliary shaft to the main shaft; means rendered effective when the table is in home position to hold the idle portion of the differential device against movement to cause the table and the record material to be moved from home position to the line corresponding to the effective line selecting keys for the recording of the first item, said holding means being rendered ineffective after said table is positioned under influence of the line selecting key; means including a ratchet device connected to the main shaft to retain the table in set position; means to operate the ratchet device to advance the table line by line from the position to which it was set under influence of the line selecting keys for the recording of subsequent items; means rendered effective by certain of the control keys to cause the ratchet device to line-space the table every other or second machine operation; means rendered effective by certain other of the control keys to cause the ratchet device to line-space the table every machine operation; yieldable means to return the table to home position; and means to render the ratchet device ineffective to permit the yieldable means to return the table to home position.

8. In a machine of the character described, having means to record various items on multi-lined record material, the combination of a table having a home position and various line positions to present the multi-lined record material to the recording means; a main shaft to drive the table; an auxiliary shaft; line selecting keys; slides adapted to be positioned by the keys; a differential device to connect the slides to the auxiliary shaft to transmit the value of the effective keys to said auxiliary shaft; a differential device to connect the auxiliary shaft to the main shaft; means rendered effective when the table is in home position to effectuate the latter differential device to cause the table and the record material to be moved to the line position corresponding to the effective key for the recording of the first item; and automatic means effective after the first item has been recorded to advance the table line by line beginning with the line selected by the keys for the recording of subsequent items.

9. In a machine of the character described, having means to record items on multi-lined record material, the combination of a movable table having a home position and a plurality of line positions to present the record material to the recording means; yieldable means to urge the table from line position to home position; a main shaft to drive the table; an auxiliary shaft; means to connect the auxiliary shaft to the main shaft; a plurality of line-selecting keys; means to transmit positioning of the line-selecting keys to the auxiliary shaft; means effective when the table is in home position and when the record material is properly placed on said table to cause the connecting means to become effective to cause the table to be positioned to the line corresponding to the effective line-selecting key; a device including a plurality of ratchets operatively connected to the main shaft, one of said ratchets adapted to retain the table in selected position; means controlled by the line-selecting keys and rendered effective upon machine operation to cooperate with certain of the ratchets to prevent overdrive of the table under influence of the line-selecting key; control keys for initiating machine operations to record a certain item; other control keys for initiating machine operations to record other items; means to operate one of the ratchets to advance the table line by line after said table is positioned by the line-selecting keys; means controlled by the first-named control keys to cause the ratchet operating means to line-space the table every other machine operation; means controlled by the second-named control keys to cause the ratchet operating means to line-space the table every machine operation; and means to disable the ratchet operating means and the ratchet retaining means to permit the yieldable means to return the table to home position.

10. In a machine of the class described, having means to record items on multi-lined record material, the combination of a table movable from an initial position to any one of a plurality of line positions to present the various lines of the record material to the recording means; yieldable means to urge the table to initial position; a shaft to drive the table; selectively controlled means to operate the shaft to cause the table to be positioned to any desired line for the recording of the first item; a device including a retaining ratchet, a drive ratchet, and an overdrive-preventing ratchet operatively connected to the main shaft, said retaining ratchet effective to hold the table in selected position against the action of the yieldable means; means controlled by the selectively controlled means to render the overdrive-preventing ratchet effective to prevent overdrive of the table when positioned by said selectively controlled means; automatic means effective after the table has been positioned by the selectively controlled means to line-space the table for the recording of subsequent items; and means to render the retaining ratchet and the operating means for the driving ratchet ineffective to permit the yieldable means to return the table to initial position.

11. In a machine of the class described adapted to record items in the various columns of multi-lined record material, the combination of a table for presenting the record material to the recording means, said table movable from an initial position to any one of a plurality of line positions; means to alternately record a certain class of items in two columns but on the same line of the record material; means to record another class of items in another column of the record material; means to initiate machine operation for the recording of said certain class of items; means to initiate machine operation for the recording of said other class of items; manually controlled means to position the table to any desired line for the recording of the first item; means effective after the initial positioning of the table to line-space said table for the recording of subsequent items; means rendered effective by the first-named initiating means to cause the line-spacing means to line-space the table every other machine operation, which, in cooperation with the alternate recording means, causes two of said items of a certain class to be recorded on the same line but in different columns of the record material; and means rendered effective by the second-named initiating means to cause the line-spacing means to line-space the table every machine operation, which, in cooperation with the recording means for said items of another class, causes one of said items to be recorded on each line of the record material.

12. In a business machine having means to record items on multi-lined record material, the combination of a positionable table to present the record material to the recording means; means, including a shaft, to position the table; means to control operation of the shaft to cause any desired line of the record material to be selected for the recording of the first item; a ratchet device to operate the shaft to line-space the table and the record material for the recording of subsequent items; means, including a mutilated disk, to control operation of the ratchet device; means, effective when items of a certain classification are recorded, to position the disk to cause the ratchet device to alternately line-space the table and the record material for the recording of said items; and means effective when items of another classification are recorded to position the disk to cause the ratchet device to continuously line-space the record material for the recording of said items.

13. In a business machine having means to record items on multi-lined record material, the combination of a table movable from an initial position to any one of a plurality of line positions to present any desired line of the record material to the recording means; a shaft to position the table; line selecting keys; means governed by the line selecting keys to operate the shaft in proportion to the value of said keys to move the table from initial position to any desired line position for the recording of an item; a ratchet having teeth corresponding to the even numbered lines of the table and the record material; a ratchet having teeth corresponding to the odd numbered lines of the table and the record material, both of said ratchets operatively connected to the shaft; means adapted to cooperate with each of the ratchets as the table nears the selected line position to interrupt movement of said table to prevent overthrow thereof; and means operated by the odd numbered line selecting keys to render the overthrow presenting means for the ratchet for the even numbered lines ineffective and to simultanously effectuate the overthrow preventing means for the ratchet for the odd numbered lines.

14. In a business machine having means to record items on multi-lined record material, the combination of a table movable from an initial position to any one of a plurality of line positions to present any desired line of the record material to the recording means; a shaft to drive the table; line selecting keys; means governed by the line selecting keys to rotate the shaft in proportion to the value of said keys to move the table from initial position to any desired line position for the recording of an item; a ratchet having teeth corresponding to the even numbered lines of the table and the record material; a ratchet having teeth corresponding to the odd numbered lines of the table and the record material, both of said ratchets operatively connected to the shaft; a pawl for each of the ratchets; means to engage the pawls with the teeth of the ratchets as the table nears the selected line position to interrupt movement of said table to prevent overthrowing thereof; means normally effective to prevent engagement of the pawl with the ratchet for the even numbered lines; and means operated by the odd numbered line selecting keys to move the preventing means out of cooperative relationship with the pawl for the ratchet for the even numbered lines and into cooperative relationship with the pawl for the ratchet for the odd numbered lines.

15. In a machine of the class described having means to record debit and/or credit items on multi-lined record material, the combination of a table movable from an initial position to a plurality of line positions to present the record material to the recording means; means effective when the table is in initial position to move said table from said initial position to any desired line position for the recording of the first of a series of items; means to line-space the table after the recording of the first item for the recording of subsequent items; means including a mutilated disk to control operation of the line-spacing means; means effective when debit items are recorded to impart a certain increment of movement to the disk for each such item recorded to cause the line-spacing means to function once for every two debit items recorded; and means effective when credit items are recorded to impart a different increment of movement to the disk for each such item recorded to cause the line-spacing means to function once for each such item recorded.

16. In a business machine adapted to perform a sequence of operations to balance an account, said sequence of operations including a balance pickup operation, item-entering operations, and a new balance operation, said machine having means to record the items and the balances on multi-lined record material, the combination of a table movable from an initial position to a plurality of line positions to present the multi-lined record material to the recording means; yieldable means to urge the table to initial position; a shaft to position the table; line selecting keys; means controlled by the line selecting keys to rotate the shaft in proportion thereto to move the table from initial position to the line position corresponding to the effective line selecting keys to select any desired line of the record material for the recording of the first item; a ratchet device to line space the table and record material for the recording of subsequent items; means to release the ratchet device to permit the table and record material to be returned to initial position by the yieldable means; means to block operation of the ratchet device to prevent line spacing of the table; a plurality of control keys for initiating old and new balance operations and item-entering operations; and means, including a shaft and a plurality of control elements thereon, positioned by the control keys for governing the operation of the blocking means and the ratchet releasing means to prevent operation of the ratchet device when the table is being positioned under influence of the line-selecting key, to prevent operation of the ratchet device when changing from the entering and recording of one class of items to the entering and recording of another class of items, and to release the ratchet device when a new balance operation is performed.

17. In an accounting machine adapted to perform a series of operations to balance an account, said operations including item-entering operations, said machine having means to record the items on multi-lined record material, the combination of a plurality of depressible control keys for initiating item entering operations; a differential mechanism positioned by the control keys; a table movable from an initial position to any one of a plurality of line positions to present the multi-lined record material to the recording means; means to move the table from initial position to any desired line position for the recording of the first item; means effective after the first item has been recorded to line space the table for the recording of subsequent items; a control element to control operation of the line-spacing means; means to advance the control element one increment of movement each machine operation to cause the line-spacing means to function every other machine operation; means to advance the control element two increments of movement each machine operation to cause the line-spacing means to function every machine operation; a shaft positioned by the differential mechanism for the control keys; instrumentalities on the shaft cooperating with both of the advancing means and effective when any one of the control keys for a certain class of items is depressed to effectuate the first advancing means to cause the line-spacing means to function every other machine operation for the recording of said certain class of items, said instrumentalities effective when any one of the control keys for another class of items is depressed to effectuate the second advancing means to cause the line-spacing means to function every machine operation for the recording of said items.

18. In a business machine adapted to perform a series of operations to balance an account, said series of operations including a balance pickup operation, item entering operations, and a new balance operation, said machine having means to record the items and the balances on multi-lined record material, the combination of a table movable from an initial position to a plurality of line positions to present the multi-lined record material to the recording means; yieldable means to urge the table to initial position; means including a shaft to drive the table; line selecting keys; means controlled by the line selecting keys to rotate the shaft to move the table from initial position to any desired line position; means effective when the carriage is in initial position to connect the moving means to the shaft; two ratchet devices operatively connected to the table drive shaft, one of said devices effective to retain the table in moved position against the action of the yieldable means, the other ratchet device effective after the table has been positioned under influence of the line selecting keys to advance said table line by line; means to release both of the ratchet devices to permit the yieldable means to return the table to initial position; means including a mutilated disk to control the operation of the ratchet device for line spacing the table to cause said table to be line spaced every other machine operation or every machine operation; means to block operation of the ratchet device for line spacing the table; means to impart one increment of movement to the disk each machine operation; means to impart two increments of movement to the disk each machine operation; a plurality of control keys to initiate balance pickup, item-entering and new balance operations; a differential mechanism positioned by the control keys; a control shaft positioned by the differential mechanism; an element on the control shaft to render the blocking means effective in balance pickup operations to prevent movement of the table from initial position by the line-spacing ratchet; other means to render the blocking means effective in the first item-entering operation to cause the table to be positioned under influence of the line selecting keys; elements on the control shaft to render the first imparting means effective when items of a certain class are entered to cause the table to be line spaced every other machine operation, and to render the second imparting means effective when items of another class are entered to cause the table to be line spaced every machine operation; and an element on the control shaft to effectuate the releasing means to permit the yieldable means to return the table to initial position near the end of a new balance operation.

19. In a machine of the class described, having means to record one or more items on each line of a multi-lined record material to form a plurality of columns of recorded items, the combination of positionable means to present the record material to the recording means; means to control the positioning of the positioning means to select any desired line of the record material for the recording of the first item; other means effective after the desired line has been selected for the first recording to move the positioning means into position to present the record material for receiving a record on the next line; means settable into effective and ineffective positions which when set to an effective position arrests operation of the last-named means to suppress the last-named means after the first item has been recorded so that multiple items may be recorded on the selected line; automatic means to selectively set the settable means into effective or ineffective positions to determine the number of successive operations during which the suppressing means is in an effective position so that the positioning means may be moved to present a new line on the record material for receiving records after the said multiple items have been recorded on the first selected line; and a plurality of differentially settable control devices to control the operation of the automatic means.

20. In a machine of the class described, having means to record one or more items on each line of a multi-lined record material to form a plurality of columns of recorded items, the combination of positionable means to present the record material to the recording means; means including line selecting keys to control the positioning of the positionable means to select any desired line of the record material for the recording of the first item; other means effective after the desired line has been selected for the recording of the first item, to move the positioning means to select another line of the record material for receiving multiple items; automatic means including a control member settable into effective and ineffective positions to suppress the last-named means so that a plurality of items may be recorded on one line of the record material during successive machine operations; means to set the control member into said effective or ineffective positions; and differentially controlled devices to control the operation of the last-named means.

21. In a machine of the class described, having means to record one or more items on each line of a multi-lined record material to form a plurality of columns, the combination of a positionable table to present the record material to the recording means; manually controlled means to position the table to select any desired line of the record material for the recording of the first item; automatic step-by-step feeding means for the table; other automatic means including a control member settable into effective and ineffective positions to suppress the feeding means so that multiple items may be recorded on one line during successive machine operations; means to set the control member into said effective or ineffective positions; and differentially controlled devices to control the operation of the last-named means.

22. In a machine of the character described, having means to record one or more items on the same line of a multi-lined record material for columnar recording, the combination of positionable means to present the record material to the recording means; means including a shaft to drive the positionable means; manually controlled means to operate the shaft to position the positionable means to select any desired line of the record material for recording the first item; automatically controlled means effective after the desired line has been selected to operate the shaft to position the positionable means for the recording of subsequent items on a different line; suppressing means including a control member settable into effective and ineffective positions to suppress the automatic means so that multiple items may be recorded on the same line during successive machine operations; means to set the control member into said effective or ineffective positions; and differentially controlled devices to control the operation of the last-named means.

23. In a machine of the class described, having means to record items on multi-lined record material; and transaction control devices to enter items of different types, the combination of a table having a home position and various line positions to present the record material to the recording means; means including a main shaft to drive the table; an auxiliary shaft; means rendered effective when the table is in home position to connect the auxiliary shaft to the main shaft; selectively controlled means to operate the auxiliary shaft to select any desired line of the record material for the recording of the first item; control elements differentially settable under control of the transaction control devices; and means, automatically controlled by the control elements, effective after the first item has been recorded to operate the main shaft to linespace the table only after recording a certain number of items on a single line during successive machine operations.

24. In a machine of the class described, having means to record one or more items on the same line of a multi-lined record material to form a plurality of lines, the combination of a table to present the various lines of the record material to the recording means; selectively controlled means to position the table to any desired line position for the recording of the first item; automatic means to position the table for line-spacing the items; means to retain the table in the position to which it was moved under control of the selectively controlled means; means operating in conjunction with the retaining means to prevent the table from moving beyond the selected line position; automatically controlled means effective after the first item has been recorded, including a control member settable into effective and ineffective positions, to suppress the first-named automatic means so that multiple items may be recorded on the same line during successive machine operations; means to set the control member into said effective or ineffective positions; and differentially controlled devices to control the operation of the last-named means.

25. In a machine of the class described, having means to record items of varying classifications on multi-lined record material, and classification manipulative devices, the combination of a positionable table to present the record material to the recording means; means, including a shaft, to position the table; means to control operation of the shaft to cause any desired line of the record material to be selected for the recording of the first of a series of items; means including a control member settable into an effective position to suppress operation of the shaft to prevent line-spacing of the table and record material so that multiple items of a certain classification are recorded on one line, or settable into an ineffective position to render the suppressing means ineffective to thereby cause continuous line-spacing of said table and record material so that only one item may be recorded on one line when items of another classification are recorded; means to set the control member into said effective and ineffective positions; and control devices settable under control of the manipulative devices and effective after the first item has been recorded to control the operation of the last-named means.

PASCAL SPURLINO.
WILLIAM M. CARROLL.
ARTHUR R. COLLEY.
ALFRED G. KIBLER.